(12) United States Patent
Yeomans et al.

(10) Patent No.: US 12,483,396 B2
(45) Date of Patent: Nov. 25, 2025

(54) KEY EXCHANGE PROTOCOL FOR SATELLITE BASED QUANTUM NETWORK

(71) Applicant: ARQIT LIMITED, London (GB)

(72) Inventors: Andrew Yeomans, Hertfordshire (GB); Omar Iqbal, Hampshire (GB); Barry Childe, Sussex (GB)

(73) Assignee: Arqit Limited, London (GB)

( * ) Notice: Subject to any disclaimer, the term of this patent is extended or adjusted under 35 U.S.C. 154(b) by 205 days.

(21) Appl. No.: 18/274,852

(22) PCT Filed: Jan. 28, 2022

(86) PCT No.: PCT/GB2022/050245
§ 371 (c)(1),
(2) Date: Jul. 28, 2023

(87) PCT Pub. No.: WO2022/162392
PCT Pub. Date: Aug. 4, 2022

(65) Prior Publication Data
US 2024/0129116 A1  Apr. 18, 2024

(30) Foreign Application Priority Data

Jan. 29, 2021 (GB) .................................... 2101310
May 14, 2021 (GB) .................................... 2106979

(51) Int. Cl.
H04L 9/08 (2006.01)
(52) U.S. Cl.
CPC ............ H04L 9/0852 (2013.01); H04L 9/085 (2013.01)
(58) Field of Classification Search
CPC ... H04L 9/0852; H04L 9/0858; H04L 9/0855; H04L 63/061; H04L 9/083; H04L 9/0822;
(Continued)

(56) References Cited

U.S. PATENT DOCUMENTS 5,764,765 A * 6/1998 Phoenix ................ H04L 9/0858
380/256
6,748,083 B2 * 6/2004 Hughes ................ H04L 9/0858
380/278
(Continued)

FOREIGN PATENT DOCUMENTS

CN 107968685 4/2018
EP 3886356 9/2021
(Continued)

OTHER PUBLICATIONS

Search Report GB Application No. 2106979.4 dated Jun. 27, 2022.
(Continued)

*Primary Examiner* — Sharif E Ullah
(74) *Attorney, Agent, or Firm* — Dentons US LLP

(57) ABSTRACT

A method for performing a key exchange using a quantum key distribution protocol between a first device (D1), a second device (D2), and an intermediary device (ID), wherein: ID receives first symbol set (SS1) over first quantum channel (QC1) transmitted from D1 and sends first receiving basis information (RBI1) to D1 which withholds from ID first transmitting basis information (TBI1); ID transmits second symbol set (SS2) over second quantum channel (QC2) and second transmitting basis information (TBI2) to D2 which withholds from ID second receiving basis information (RBI2); ID generates first (IS1) and second intermediate symbol (IS2) sets based on valid SS1 and SS2; wherein ID generates third intermediate symbol (IS3) set by combining IS1 and IS2 and sends IS3 set to D1 and/or D2; wherein D1 and D2 exchange TBI1 and RBI2 and/or RBI1 and TBI2 to determine a final shared key based on SS1, SS2, and IS3 sets.

20 Claims, 13 Drawing Sheets

(58) Field of Classification Search
CPC ....... H04L 9/3226; H04L 9/0891; H04L 9/14; H04L 9/0827; H04L 2209/24; H04L 9/08; H04L 9/0819; H04L 9/088; H04L 9/0844; H04L 9/0618; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86
USPC ........ 380/278, 255, 264, 276; 726/2, 21, 36; 713/150, 160, 181
See application file for complete search history.

(56) References Cited

U.S. PATENT DOCUMENTS

| | | | | |
|---|---|---|---|---|
| 7,437,081 | B2* | 10/2008 | Mitchell | H04B 10/70 398/154 |
| 8,761,401 | B2* | 6/2014 | Sprunk | H04L 9/0844 380/278 |
| 8,782,774 | B1* | 7/2014 | Pahl | H04L 9/0841 726/4 |
| 8,855,316 | B2* | 10/2014 | Wiseman | H04L 9/0855 380/278 |
| 9,628,268 | B2* | 4/2017 | Kiang | G06F 21/6218 |
| 9,960,465 | B2* | 5/2018 | Dudley | H01M 50/204 |
| 10,057,058 | B2* | 8/2018 | Murakami | H04L 9/0858 |
| 2005/0138352 | A1* | 6/2005 | Gauvreau | H04L 9/3247 713/153 |
| 2007/0065154 | A1* | 3/2007 | Luo | H04J 14/0282 398/141 |
| 2007/0076884 | A1* | 4/2007 | Wellbrock | H04L 9/0855 380/263 |
| 2007/0195774 | A1* | 8/2007 | Sherman | H04L 69/16 370/392 |
| 2011/0206204 | A1* | 8/2011 | Sychev | H04J 14/06 380/256 |
| 2011/0213979 | A1* | 9/2011 | Wiseman | H04L 9/0844 713/171 |
| 2014/0010234 | A1* | 1/2014 | Patel | H04L 45/74 370/392 |
| 2014/0068765 | A1* | 3/2014 | Choi | H04L 63/1416 726/23 |
| 2014/0133652 | A1* | 5/2014 | Oshida | H04L 9/0897 380/255 |
| 2016/0241396 | A1* | 8/2016 | Fu | H04L 9/0836 |
| 2016/0359626 | A1* | 12/2016 | Fu | H04L 9/0858 |
| 2016/0366094 | A1* | 12/2016 | Mason | H04L 61/5038 |
| 2017/0214525 | A1* | 7/2017 | Zhao | H04W 12/0431 |
| 2017/0230173 | A1* | 8/2017 | Choi | H04L 9/0861 |
| 2018/0176091 | A1* | 6/2018 | Yoon | H04L 5/1446 |
| 2019/0036821 | A1* | 1/2019 | Levy | G06F 12/0868 |
| 2019/0349392 | A1* | 11/2019 | Wetterwald | H04L 43/0852 |
| 2020/0084222 | A1* | 3/2020 | William | H04L 63/12 |

FOREIGN PATENT DOCUMENTS

| | | |
|---|---|---|
| GB | 2586235 | 2/2021 |
| GB | 2590064 | 6/2021 |

OTHER PUBLICATIONS

Junyong Wang et al., "Modeling research of satellite-to-ground quantum key distribution constellations", Acta Astronautica, Pergamon Press, Elmsford, GB, vol. 180, Jan. 1, 2021, pp. 470-481, XP086471399, ISSN: 0094-5765, DOI: 10.1016/J.Actaastro.2020.12.039 [retrieved on Jan. 1, 2021], paragraph [0002]-paragraph [0003].

Donghai Huang et al., "Quantum Key Distribution Over Double-Layer Quantum Satellite Networks", IEEE Access, IEEE, USA, vol. 8, Jan. 13, 2020, pp. 16087-16098, XP011768438, DOI: 10.1109/ACCSS.2020.296683, p. 1-p. 6.

Jing Wang et al., "A Guide to Global Quantum Key Distribution Networks", Arxiv.Org, Cornell University Library, 201 Olin Library Cornell University Ithaca, NY 14853, Dec. 28, 2020, XP081847709, p. 1-p. 17.

Junsen Lai et al., "Draft D2.5 Technical Report on QIT4N standardization outlook and technolog maturity part 2:quantum key distribution network (output of 6th FG-QIT4N meeting)", ITU-T Draft, Study Period 2017-2020; Study Group 2, International Telecommunication Union, Geneva; CH, vol. ties/2, Nov. 16, 2020, pp. 1-62, XP044303442, Retrieved from the Internet: URL:https://www.itu.int/ifa/t/2017/sg2/docs/201218/td/ties/gen/T17-SG02-201218-TD-GEN-1240!!ZIP-E.zip TD1240-FG-QIT4N-LS14-Att4.docx [retrieved on Nov. 16, 2020] paragraph.

Facultad De Informatica: "ISG QKD 017 NW architectures", ETSI Draft; QKD(20) 029025, European Telecommunications Standards Institute (ETSI), 650, Route Des Lucioles; F-06921 Sophia-Antipolis; France, vol. ISG QKD Quantum Key Distribution, No. 0.8, Dec. 13, 2020, pp. 1-48, XP014388658, Retrieved from the Internet: URL: ftp://docbox.et al.org/ISG/QKD(20) 029025_ISG_QKD_017_NW_architectures.zip QKD-017nwkArchv008.docx [retrieved on Dec. 13, 2020] paragraph [0004]-[0006].

S. Pirandola et al., "Advances in Quantum Cryptography", Arxiv.Org, Cornell University Library, 201 Olin Library Cornell University Ithaca, NY 14853, Jun. 4, 2019, XP081373072, paragraph [0001]-paragraph [0XII].

Miralem Mehic, et al., "Quantum Key Distribution: A Networking Perspective", ACM Computing Surveys, ACM, New York, NY, US, vol. 53, No. 5, Sep. 28, 2020, pp. 1-41, XP058666929, ISSN: 0360-0300, DOI: 10.1145/3402192, paragraph [0002]-paragraph [0006].

Yu-Ao Chen et al., "An integrated space-to-ground quantum communication network over 4,600 kilometres", Nature, vol. 589, No. 7841, Jan. 14, 2021, pp. 214-219, XP037335153, ISSN: 028-0836, DOI: 10.1038/S41586-020-03093-8, p. 1-p. 3.

Robert Bedington et al., "Progress in satellite quantum key distribution", NPJ Quantum Information, vol. 3, No. 1, Aug. 9, 2017, pp. 1-13, XP055725509, DOI: 10.1038/s41534-07-0031-5, p. 1-p. 4.

International Search Report from PCT/GB2022/050245 dated Apr. 29, 2022.

Written Opinion of the ISA from PCT/GB2022/050245 dated Apr. 29, 2022.

* cited by examiner

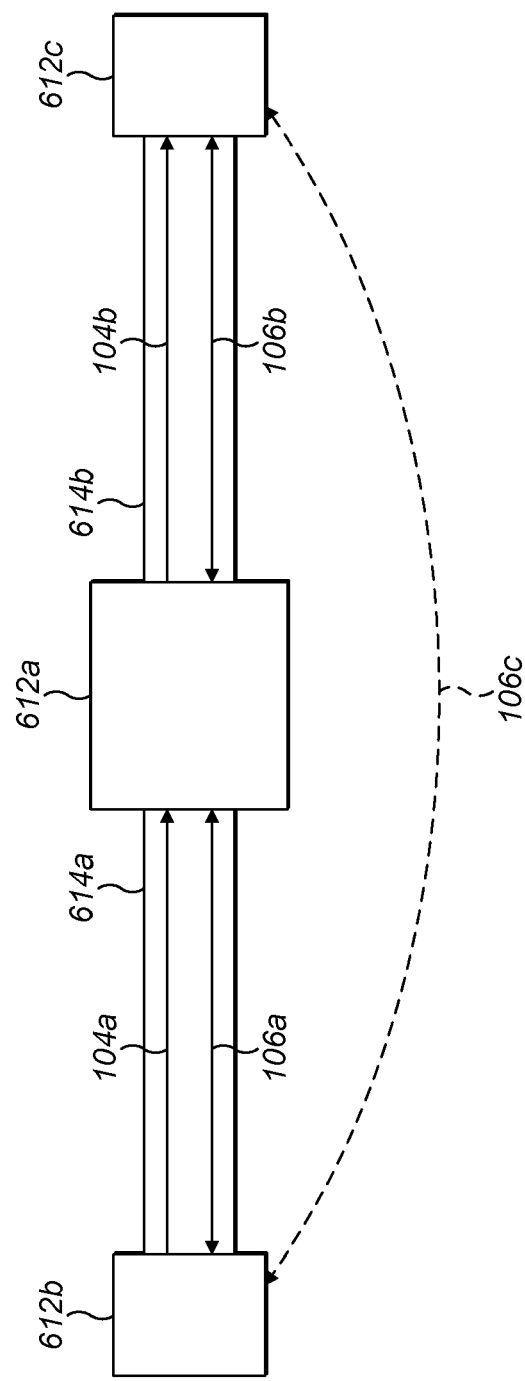

US 12,483,396 B2

KEY EXCHANGE PROTOCOL FOR SATELLITE BASED QUANTUM NETWORK

CLAIM OF PRIORITY AND INCORPORATION BY REFERENCE

This application is the National Stage filing under 35 U.S.C. 371 of International Application No. PCT/GB2022/050245, filed Jan. 28, 2022, claims the benefit of GB Application Nos. 2101310.7, filed Jan. 29, 2021 and 2106979.4, filed May 14, 2021, the contents of which are all hereby incorporated by reference herein in their entirety.

The present application claims the benefit under of U.K. patent application No.: 2101310.7 entitled "QKD SWITCHING SYSTEM" and filed on 29 Jan. 2021, the disclosure of which is incorporated herein by reference in its entirety.

TECHNICAL FIELD

The present application relates to a system, apparatus and method for key exchange between a first device and a second device via an intermediary device using a quantum key distribution protocol.

BACKGROUND

Quantum key distribution (QKD) protocols are secure communication methods that implements a cryptographic protocol involving components of quantum mechanics for distributing cryptographic keys to parties. It enables at least two parties to produce a shared random secret key, cryptographic key or shared key/final shared key known only to them. The final shared key may be used for, without limitation, for example cryptographic operations by said at least two parties and/or secure communications between said parties using the final shared key to encrypt and decrypt said communication sessions/channel and/or messages therebetween.

The BB84 QKD protocol is a well-known QKD protocol using photon polarisation bases to transmit the information. The BB84 QKD protocol uses a set of bases including least two pairs of conjugate photon polarisation bases (e.g. a set of bases including, without limitation, for example a rectilinear photon basis (e.g. vertical (0°) and horizontal (90°) polarisations) and diagonal photon basis (e.g. 45° and 135° polarisations) or the circular basis of left- and right-handedness etc.) In the BB84 protocol, QKD is performed between two parties such as a sender device or intermediary device (e.g. referred to as Alice) and a receiver or first device (e.g. referred to as Bob or Carol).

The sender device and receiver device are connected by a quantum communication channel, also referred to as a quantum channel, which allows quantum information (e.g. quantum states) to be transmitted. The quantum channel may be, without limitation, for example, an optical fibre or optical free space and/or any other channel that may transmit quantum information. Furthermore, the sender device and receiver device also communicate over a non-quantum channel or public classical channel, without limitation, for example a fibre optic channel, satellite communications channel, telecommunications channel, radio channel, broadcast radio or the internet and/or any other wireless or wired communications channel and the like.

For example, Sheng-Kai Liao, et. al. "Satellite-to-ground quantum key distribution", Nature volume 549, pages 43-47, 7 Sep. 2017, describes satellite-based QKD system using the BB84 protocol for distributing keys, where a satellite free-space optical quantum channel is produced using a 300-mm aperture Cassegrain telescope, which sends a light beam from a Micius satellite (e.g. Alice) to a ground station (e.g. Bob), which uses a Ritchey Chretien telescope for receiving the QKD photons over the satellite free-space optical quantum channel.

Although the security of the BB84 protocol comes from judicious use of the quantum and classical communication channels and authentication and the like, both the sender or the intermediary device distributing the cryptographic key and the receiver device receiving the cryptographic key know the cryptographic key or final shared key that the receiver device will eventually use. This is particularly so for when the BB84 is used to exchange a final shared key between two receiver devices via the intermediary device. This means that the sender or intermediary device distributing the cryptographic key to the receiver device has to be a trusted device in a secure location in order for the receiver device to be able to trust that they may use the resulting cryptographic key. This may be fine should both the sender/intermediary device and receiver device use the resulting cryptographic key for cryptographic operations therebetween, e.g. for encrypted communications and the like with each other. However, if the sender or intermediary device is only distributing shared keys to one or more receiver devices in which the receiver devices may use the resulting cryptographic keys/final shred keys with one or more other receiver devices, then it is often not acceptable that the sender or intermediary device has access to the resulting final cryptographic keys/final shared keys. This is an insecure system and cannot be trusted.

There is a desire for a more improved key exchange methodology using a QKD protocol that does not rely on the intermediary device being a fully trusted device by a first device and second device requiring a shared key or shared cryptographic key for cryptographic operations and/or secure communications therebetween.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

Methods, apparatus, and systems are provided for performing a key exchange using a quantum key distribution (QKD) protocol between a first device, a second device, and an intermediary device. The intermediary device receives: a first set of symbols over a first quantum channel transmitted from the first device; and sends a first receiving basis information to the first device, where the first device withholds from the intermediary device the first transmitting basis information for transmitting said first set of symbols over the first quantum channel. The intermediary device transmits: a second set of symbols over a second quantum channel transmitted to the second device; and transmits a second transmitting basis information to the second device, where the second device withholds from the intermediary device the second receiving basis information for receiving said second set of symbols over the first quantum channel. The intermediary device generates first and second intermediate sets of symbols based on the validly received first set of symbols and transmitted second sets of symbols received/transmitted over the quantum channels. The intermediary device generates a third intermediate set of symbols based on combining the first and second intermediate sets of symbols and sends the third intermediate set of symbols to the second device and/or first device. The first device and second device perform a key exchange by exchanging with themselves the first transmitting and second receiving basis information and/or first receiving and second transmitting basis information to determine a final shared key based on the first set of symbols, the second set of symbols and the third intermediate set of symbols.

In a first aspect, the present disclosure provides a computer-implemented method of key exchange between a first device and a second device, the method, performed by an intermediary device, comprising: generating a first intermediate set of symbols based on exchanging first key information with the first device, the first key information comprising data representative of a first set of symbols received from the first device on a first quantum channel, wherein the first device withholds from the intermediary device a first transmitting random basis set used by the first device for transmitting said first set of symbols over said first quantum channel; generating a second intermediate set of symbols based on exchanging second key information with the second device, the second key information comprising data representative of a second set of symbols transmitted to the second device on a second quantum channel, wherein the second device withholds from the intermediary device a second receiving random basis set used by the second device when receiving said second set of symbols over said second quantum channel; and sending, to one or more of the first device and second device, a third intermediate set of symbols based on combining the first and second intermediate sets of symbols; wherein the first and second devices securely exchange at least first transmitting and second receiving basis information with each other for determining a final shared key based on the first set of symbols, the second set of symbols and the third intermediate set of symbols.

As an option, the computer-implemented method according to the first aspect, further comprising: generating the first intermediate set of symbols further comprising exchanging first key information with the first device, the first key information comprising data representative of the first set of symbols sent from the first device over the first quantum channel and a first receiving random basis set used by the intermediary device when receiving said first set of symbols, the first receiving random basis set transmitted to the first device over a first communication channel; and generating the second intermediate set of symbols further comprising exchanging second key information with the second device, the second key information comprising data representative of the second set of symbols transmitted from the intermediary device over the second quantum channel and second transmitting random basis set used by the intermediary device when transmitting said second set of symbols, the second transmitting random basis set transmitted to the second device over a second communication channel; sending, to one or more of the first device and second device over the corresponding communication channel(s), a third intermediate set of symbols based on combining the first and second intermediate sets of symbols; wherein the first and second devices securely exchange the first and second transmitting basis information and first and second receiving basis information with each other over a third communication channel therebetween for determining the final shared key based on the first set of symbols, the second set of symbols and the third intermediate set of symbols.

As another option, the computer-implemented method according to the first aspect, wherein exchanging first key information with the first device further comprising: receiving the first set of symbols over the first quantum channel transmitted by the first device, each symbol of the first set of symbols being received using a basis state randomly selected from a set of bases, which forms a first receiving random basis set; transmitting the first receiving random basis set over a first communication channel to the first device, the first receiving random basis set comprising data representative of the randomly selected bases used to receive each symbol of the first set of symbols; and transmitting to the first device, over the first communication channel, data representative of the symbol positions of the symbols in the first set of symbols received over the first quantum channel that were successfully or validly received by the intermediary device.

As a further option, the computer-implemented method according to the first aspect, wherein generating the first intermediate set of symbols further comprising generating the first intermediate set of symbols based on discarding all the received first set of symbols except those symbols of the first set of symbols with symbol positions from the received first set of symbols that were successfully or validly received by the intermediary device.

Optionally, the computer-implemented method according to the first aspect, wherein exchanging second key information with the second device further comprising: transmitting the second set of symbols over the second quantum channel to the second device, each symbol of the second set of symbols transmitted using a basis state randomly selected from the set of bases to form a second transmitting random basis set; transmitting the second transmitting random basis set over a second communication channel to the second device, the second transmitting random basis set comprising data representative of the randomly selected bases used to transmit each symbol of the second set of symbols; and receiving, from the second device over the second communication channel, data representative of the symbol positions of the symbols in the second set of symbols received by the second device over the second quantum channel that were successfully or validly received by the second device.

As an option, the computer-implemented method according to the first aspect, wherein generating the second intermediate set of symbols further comprising generating the second intermediate set of symbols based on discarding all the transmitted second set of symbols except those symbols of the second set of symbols with symbol positions from the transmitted second set of symbols that were successfully or validly received by the second device.

As a further option, the computer-implemented method according to the first aspect, wherein said at least first transmitting basis information and second receiving basis information further comprising data representative of the first and second transmitting basis sets and the first and second receiving basis sets, and determining the final shared key, by the first and second devices, further comprising: securely exchanging, between the first and second devices over a third communication channel therebetween, the first transmitting basis set used by the first device for transmitting the first set of random symbols and the first receiving basis set used by the intermediary device when receiving said first set of random symbols; securely exchanging, between the first and second devices over the third communication channel therebetween, the second receiving basis set used by the second device for receiving the second set of random symbols and the second transmitting basis set used by the intermediary device when transmitting said second set of random symbols; determining, by the first endpoint device, a first shared key based on discarding all symbols from the transmitted first set of symbols except those symbols where the first transmitting basis equals the first receiving basis and the second transmitting basis equals the second receiving basis; determining, by the second endpoint device, a second shared key based on discarding all symbols from the decrypted first intermediate set of symbols except those symbols where the first transmitting basis equals the first receiving basis and the second transmitting basis equals the second receiving basis; exchanging, by the first and second devices over the third communication channel therebetween, a shared key based on the first and second shared keys.

Optionally, the computer-implemented method according to the first aspect, wherein sending, by the intermediary device to the second device, over a second communication channel a third intermediate set of symbols based on combining the first and second intermediate sets of symbols further comprising: generating the third intermediate set of symbols by cryptographically combining the first and second intermediate sets of symbols together; sending the third intermediate set of symbols to the second device over the second communication channel; wherein the second device decrypts the encrypted third intermediate set of symbols to retrieve the first intermediate set of symbols, wherein decrypting the third intermediate set of symbols is based on the second device deriving the second intermediate set of symbols based on the second transmitting basis set and the second set of symbols received by the second device.

As another option, the computer-implemented method according to the first aspect, wherein determining the final shared key, by the first and second devices, based on the first set of symbols, the second set of symbols and the third intermediate set of symbols, further comprising: securely exchanging, between the first and second devices over a third communication channel therebetween, the first transmitting basis set used by the first device for transmitting the first set of random symbols and the first receiving basis set used by the intermediary device when receiving said first set of random symbols; securely exchanging, between the first and second devices over a third communication channel therebetween, the second receiving basis set used by the second device for receiving the second set of random symbols and the second transmitting basis set used by the intermediary device when transmitting said second set of random symbols; determining, by the first endpoint device, a first shared key based on discarding all symbols from the transmitted first set of symbols except those symbols where the first transmitting basis equals the first receiving basis and the second transmitting basis equals the second receiving basis; determining, by the second endpoint device, a second shared key based on discarding all bits from the decrypted first intermediate set of symbols except those bits where the first transmitting basis equals the first receiving basis and the second transmitting basis equals the second receiving basis; exchanging, by the first and second devices over the third communication channel therebetween, a shared key based on the first and second shared keys.

As a further option, the computer-implemented method according to the first aspect, wherein the first and second devices perform error correction and/or privacy amplification in relation to the first and second shared keys over the third communication channel for determining the final shared key.

Optionally, the computer-implemented method according to the first aspect, wherein generating the third intermediate set of symbol string further comprising one or more from the group of: generating the third intermediate set of symbols based on performing an XOR-type operation on the first intermediate set of symbols and the second intermediate set of symbols; generating the third intermediate set of symbols based on performing one time pad encryption operation(s) using data representative of, at least in part, the first intermediate set of symbols and the second intermediate set of symbols; and generating the third intermediate set of symbols based on performing any other type of reversible operation for obfuscating the first intermediate set of symbols with the second intermediate set of symbols.

As an option, the computer-implemented method according to the first aspect, wherein the first and second device perform error detection and/or correction on the first and second common sets of sifted bits or the first and second shared keys.

As another option, the computer-implemented method according to the first aspect, wherein the first set of symbols is a random set of symbols.

As a further option, the computer-implemented method according to the first aspect, wherein the first set of symbols that are transmitted from the first device are randomly generated by the first device.

Optionally, the computer-implemented method according to the first aspect, wherein the first set of symbols that are transmitted from the first device are retrieved from an entropy store of randomly generated symbols stored on the first device.

As another option, the computer-implemented method according to the first aspect, wherein the second set of symbols is a random set of symbols.

As another option, the computer-implemented method according to the first aspect, wherein the second set of symbols that are transmitted from the intermediary device are randomly generated by the intermediary device.

As an option, the computer-implemented method according to the first aspect, wherein the second set of symbols that are transmitted from the intermediary device are retrieved from an entropy store of randomly generated symbols stored on the intermediary device.

As a further option, the computer-implemented method according to the first aspect, wherein generating the first intermediate set of symbols occurs prior to generating the second intermediate set of symbols.

Optionally, the computer-implemented method according to the first aspect, wherein generating the second intermediate set of symbols occurs prior to generating the first intermediate set of symbols.

As an option, the computer-implemented method according to the first aspect, wherein generating the first intermediate set of symbols occurs substantially concurrently to generating the second intermediate set of symbols.

As an option, the computer-implemented method according to the first aspect, wherein generating the first intermediate set of symbols occurs simultaneously to or at the same time.

As an option, the computer-implemented method according to the first aspect, wherein the first and second devices use encryption for communications over the third communication channel.

Optionally, the computer-implemented method according to the first aspect, wherein the first and second devices authenticate each other using communications over the third communication channel.

As a further option, the computer-implemented method according to the first aspect, wherein the third communication channel is independent of the first and second communication channels.

As another option, the computer-implemented method according to the first aspect, wherein the third communication channel comprises the first and second communication channels.

As an option, the computer-implemented method according to the first aspect, wherein the first communication channel is a classical communication channel.

As a further option, the computer-implemented method according to the first aspect, wherein the second communication channel is a classical communication channel.

Optionally, the computer-implemented method according to the first aspect, wherein the third communication channel is a classical communication channel.

As a further option, the computer-implemented method according to the first aspect, wherein each symbol represents 2n binary bits, for n>1.

As another option, the computer-implemented method according to the first aspect, wherein each symbol represents a binary bit for n=1.

Optionally, the computer-implemented method according to the first aspect, wherein the first or second sets of symbols are randomly generated using a random number generator is based on one or more from the group of: a cryptographic random number generator; a quantum qubit random number generator; or any suitable random number generator.

As another option, the computer-implemented method according to the first aspect, wherein the set of bases comprises at least two bases, each basis comprising at least two basis states, wherein the at least two basis states of each basis are orthogonal and the at least two basis states of said each basis are non-orthogonal to the at least two basis states of another basis of the set of bases.

As an option, the computer-implemented method according to the first aspect, wherein the set of bases comprises two bases and each basis of the set of bases comprises two basis states.

As an option, the computer-implemented method according to the first aspect, wherein the first communication channel is based on a classical communication channel formed between the intermediary device and the first device.

As another option, the computer-implemented method according to the first aspect, wherein the second communication channel is based on a classical communication channel formed between the intermediary device and the second device.

As a further option, the computer-implemented method according to the first aspect, wherein the classical communication channel is based on one or more types of communication channels from the group of: optical communication channel; free-space optical communication channel; wireless communication channel; wired communication channel; radio communication channel; microwave communication channel; satellite communication channel; terrestrial communication channel; optical fibre communication channel; optical laser communication channel; any other type of one or more optical, wireless and/or wired communication channel(s) for transmitting data between devices; and two or more optical, wireless and/or wired communication channel(s) that form a composite communication channel for transmitting data between devices.

Optionally, the computer-implemented method according to the first aspect, wherein a quantum communication channel is based on one or more types of quantum communication channels from the group of: optical quantum communications; free-space optical quantum communications; optical fibre quantum communications; optical laser quantum communications; any other type of quantum communications for transmitting data over a quantum communication channel between devices.

As an option, the computer-implemented method according to the first aspect, wherein the first and second communications channels are encrypted communication channels.

As a further option, the computer-implemented method according to the first aspect, further comprising encrypting transmission data or messages prior to transmitting said data or messages to: the first device over the first classical communication channel; or the second device over the second classical communication channel.

As another option, the computer-implemented method according to the first aspect, wherein one or more authentication protocols are used by the intermediary device and the first or second device for authenticating the intermediary, first or second devices prior to communicating over the first or second communications channels.

Optionally, the computer-implemented method according to the first aspect, further comprising authenticating the first and second device prior to transmitting data to the first and second device over the first and second communication channels, respectively.

As a further option, the computer-implemented method according to the first aspect, further comprising selecting a decoy state protocol from a set of decoy state protocols for use in transmitting data over the first or second quantum channels.

In a second aspect, the present disclosure provides an intermediary apparatus comprising a processor unit, a memory unit, and a communication interface, the processor unit connected to the memory unit and the communication interface, wherein the processor unit, memory unit and communication interface are adapted to implement the corresponding intermediary device steps of the computer-implemented method according to any of the first aspects.

In a third aspect, the present disclosure provides an apparatus comprising a processor unit, a memory unit, and a communication interface, the processor unit connected to the memory unit and the communication interface, wherein the processor unit, memory unit and communication interface are adapted to implement the corresponding steps of the computer-implemented method in relation to the first device according to any of the first aspects.

In a fourth aspect, the present disclosure provides an apparatus comprising a processor unit, a memory unit, and a communication interface, the processor unit connected to the memory unit and the communication interface, wherein the processor unit, memory unit and communication interface are adapted to implement corresponding steps of the computer-implemented method in relation to the second device according to any of the first aspects.

In a fifth aspect, the present disclosure provides a system comprising: an intermediary device comprising an apparatus configured according to any of the first or second aspects; an first device comprising an apparatus configured according to any of the first or third aspects; and a second device comprising an apparatus configured according to any of the first or fourth aspects; wherein the intermediary device, first device and second device are configured to communicate with each other for establishing a shared a cryptographic key between the first and second devices.

In a sixth aspect, the present disclosure provides a system comprising an intermediary device, a first device and a second device, wherein the intermediary device, first device and second device are configured to implement the corresponding steps of the computer-implemented method according to according to any of the first aspects.

As a further option, system according to the fifth or sixth aspects, wherein the system is a satellite quantum key distribution system comprising a plurality of satellites, each satellite including the functionality of an intermediary device, each satellite in communication with one or more ground receiving stations, and each ground receiving station including the functionality of the first and/or second devices.

In a seventh aspect, the present disclosure provides a computer-readable medium comprising computer code or instructions stored thereon, which when executed on a processor, causes the processor to perform the corresponding steps of the computer implemented method in relation to the intermediary device according to any of the first and/or second aspects.

In a eighth aspect, the present disclosure provides a computer-readable medium comprising computer code or instructions stored thereon, which when executed on a processor, causes the processor to perform the corresponding steps of the computer implemented method in relation to the first device according to any of the first aspects and/or third aspects.

In a ninth aspect, the present disclosure provides a computer-readable medium comprising computer code or instructions stored thereon, which when executed on a processor, causes the processor to perform the corresponding steps of the computer implemented method in relation to the second device according to any of the first and/or fourth aspects.

In a tenth aspect, the present disclosure provides a computer-readable medium comprising computer code or instructions stored thereon, which when executed on one or more processor(s), causes the one or more processor(s) to perform the computer implemented method according to any of the first, second, third, and/or fourth aspects.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 6b is a schematic diagram illustrating another example QKD system according to the invention;

DETAILED DESCRIPTION

Figure 1:
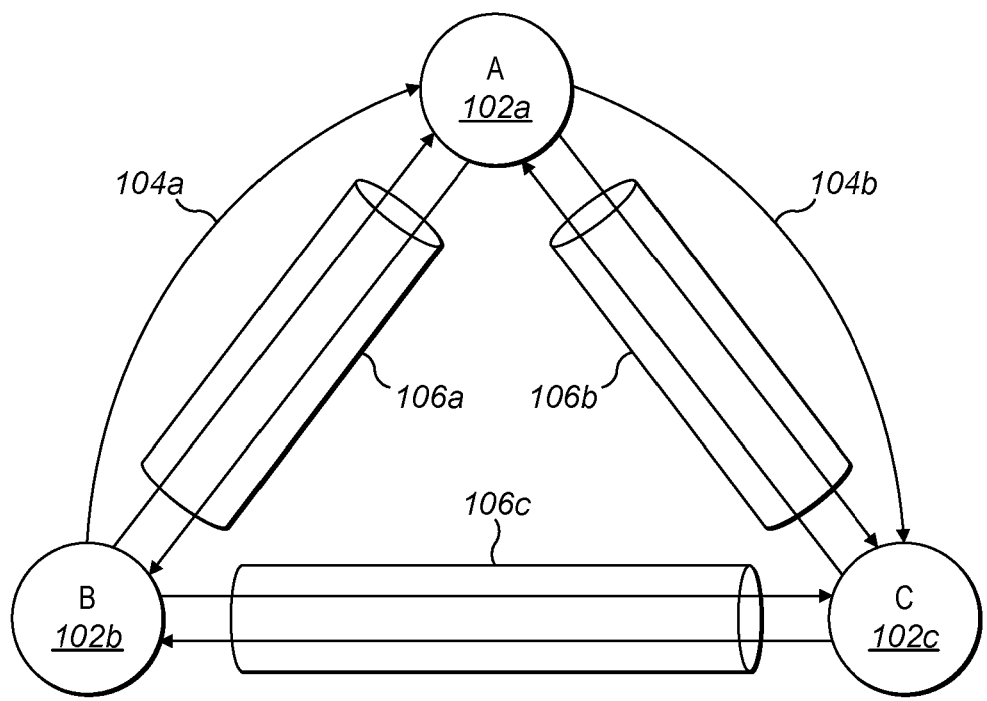
FIG. 1 is a schematic diagram illustrating an example QKD system including a first device, a second device and an intermediary device for implementing an example key exchange protocol/process for exchanging a shared key between the first and second devices according to the invention.

Embodiments of the present invention are described below by way of example only.

These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The present disclosure provides method(s), apparatus and system(s) of key exchange between a first device and a second device via an intermediary device using a quantum key distribution (QKD) protocol. The QKD protocol uses quantum channels that enable an intermediary device to receive a randomly generated first set of symbols (e.g. n bit(s) per symbol are represented by $M=2^n$ different symbols, where $n \geq 1$) from the first device and transmit a randomly generated second set of symbols (e.g. n bit(s) per symbol are represented by $M=2^n$ different symbols, where $n \geq 1$) from the second device, respectively, over respective quantum channels. The intermediary device uses a first receiving random basis set for receiving the first set of symbols and a second transmitting random basis set for transmitting the second set of symbols. The intermediary device, in turn, sends corresponding receiving basis information to the first device and corresponding transmitting basis information to the second device in relation to the first and second sets of symbols received/transmitted over the corresponding quantum channels, but in which the first and second devices withhold from the intermediary device their corresponding transmitting basis information and receiving basis information used to transmit and receive the first and second sets of symbols over the corresponding quantum channels. Further processing of the received first set of symbols and transmitted second set of symbols is performed by the intermediary device. From these, the intermediary device generates a first intermediate set of symbols based on those first set of symbols validly received over the corresponding quantum channel using the first receiving random basis set and a second intermediate set of symbols based on those second set of symbols transmitted over the corresponding quantum channel using the second transmitting random basis set. The intermediary device further generates a third intermediate set of symbols for sending to the second device and/or the first device, the third intermediate set of symbols is based on combining the first and second intermediate sets of symbols in such a way (e.g. using XOR-type operations or One-Time-Pad (OTP)-type operations and the like) that enables the second device and/or first device to derive/retrieve the first intermediate set of symbols and/or the second intermediate set of symbols based on using the corresponding receiving/transmitting basis information. Thus, the first and second devices securely exchange at least first and second transmitting basis information and/or first and second receiving basis information with each other for determining a final shared key based on the first set of symbols, the second set of symbols and the third intermediate set of symbols.

Combining of the first and second intermediate sets of symbols to generate the third intermediate set of symbols may be based on, without limitation, for example one-time-pad encryption/decryption, masking, exclusive OR (XOR) operations on bits when symbols are converted to bits, or extended XOR operations on symbols or reversible obfuscation of the intermediate sets of symbols. Thus, using the securely exchanged at least first and second transmitting basis information and/or first and second receiving basis information, the first and second device can determine a final shared key based on the first set of symbols, the second set of symbols and the third intermediate set of symbols. For example, on receiving the third intermediate set of symbols, the second device (or first device) are configured to perform a reverse set of operations to extract the first intermediate set of symbols (or second intermediate set of symbols) by deriving the second intermediate set of symbols (or first intermediate set of symbols) from the second set of symbols (or first set of symbols) and the corresponding transmitting (or receiving) basis information from the intermediary device. Using the derived second intermediate set of symbol (or first intermediate set of symbols), the second device (or first device) uses a reverse combining operation that was used to generate the third intermediate set of symbols to calculate the first intermediate set of symbols (or second intermediate set of symbols). The symbols of the first intermediate set of symbols (or second intermediate set of symbols) correspond to most of the symbols of the first set of symbols (or second set of symbols). The first and second devices perform a reconciliation operation to agree on a final shared key using the first intermediate set of symbols (or second intermediate set of symbols) and the first set of symbols (or second set of symbols).

Neither the first device or the second device send any information to the intermediary device, such as transmitting basis information used to transmit the first set of symbols and receiving basis information used to receive the second sets of symbols over the corresponding quantum channels, that will enable the intermediary device to fully derive the first and second sets of symbols. Thus, the intermediary device does not know or cannot determine exactly what the first and second devices transmitted to or received from the intermediary device. Thus, only the first and second devices fully know which symbols (or bits) of the first set of symbols (or second set of symbols) were transmitted (or received) by both the first and second devices. This information is not shared with the intermediary device. The first and second devices only share with themselves the transmitting basis information and receiving basis information they used and/or the receiving and transmitting basis information used by the intermediary device, which is used to derive, from the third intermediate set of symbols, the first or second intermediate set of symbols received by the intermediary device. From this, the first and second devices may perform symbol (or bit) sifting using the first intermediate set of symbols (or second intermediate set of symbols) and the first set of symbols (or second set of symbols) transmitted by the first device (or intermediary device) to form a first and second shared key or a common set of sifted symbols from which a cryptographic key or final shared key may be derived and agreed to by the first and second devices. The final shared key is only known to the first and second devices, thus, they can perform cryptographic operations and/or secure communications with each other. This enables the first and second devices to determine a final shared key in a quantum-safe manner even when the intermediary device is not a trusted device.

Combining a set of symbols (e.g. a bit string or symbol string) with another set of symbols (another bit string or symbol string) in a secure but reversible manner may be performed using, without limitation, for example: exclusive or (XOR) operations on these sets of symbols (e.g. converting the sets of symbols into bit strings and performing bitwise XOR); extended XOR operations on these sets of symbols (e.g. using a mathematically defined extended set of "symbol XOR" operations on symbols that preserve the mathematical properties of bitwise XOR operations); one-time-pad encryption of these sets of symbols; any other encryption operation on these sets of symbols such that a device is able to decrypt and retrieve one of the sets of symbols using the other of the sets of symbols used to encrypt both sets of symbols; modifications thereto; combinations thereof; and/or as herein described.

A quantum communication channel(s) may comprise or represent a communication channel capable of transmitting and/or receiving at least quantum information. Examples of a quantum communication channel or quantum channel that may be used according to the invention may include or be based on, without limitation, for example on one or more types of quantum communication channels associated with the group of: optical quantum communications; free-space optical quantum communications; optical fibre quantum communications; optical laser quantum communications; communications using electromagnetic waves such as, without limitation, for example radio, microwave, infra-red, gigahertz, terahertz and/or any other type of electromagnetic wave communications; communications based on electron spin and the like; any other type of quantum communications for transmitting and receiving data over a quantum communication channel between devices. It is noted that one or more types of quantum communication channel(s) may be capable of transmitting and/or receiving non-quantum or classical information.

A standard, classical or non-quantum communication channel(s) may comprise or represent any communication channel between two devices that at least is capable of transmitting and/or receiving non-quantum information. Examples of standard, classical and/or non-quantum communication channels according to the invention may include or be based on, without limitation, for example on one or more types of communication channels from the group of: any one or more physical communication channel(s); optical communication channel; free-space optical communication channel; wireless communication channel; wired communication channel; radio communication channel; microwave communication channel; satellite communication channel; terrestrial communication channel; optical fibre communication channel; optical laser communication channel; telecommunications channels; 2G to 6G and beyond telecommunications channels; logical channels such as, without limitation, for example Internet Protocol (IP) channels; any other type of logical channel being provided over any standard, classical or non-quantum physical communication channel; one or more other physical communications or carriers of data such as, without limitation, for example avian carriers, paper, sealed briefcases, courier or other delivery service and the like; any other type of one or more optical, wireless and/or wired communication channel(s) for transmitting data between devices; and/or two or more optical, wireless and/or wired communication channel(s) that form a composite communication channel for transmitting data between devices; and/or any combination of two or more standard, classical or non-quantum communication channel(s) that form a composite communication channel for transmitting and/or carrying data between devices; combinations thereof, modifications thereto, and/or as described herein and the like and/or as the application demands. It is noted that one or more types of standard, classical or non-quantum communication channel(s) may be capable of transmitting and/or receiving quantum information.

The intermediary device may comprise or represent any device or apparatus, component or system that is adapted to, configured to, includes the capability of: establishing a quantum communication channel with one or more other communication devices and/or receiving data over the quantum communication channel with the one or more other communication devices and, also, establish one of more non-quantum, standard or classical communication channels with said one or more other communication devices for transmitting/receiving data to/from said one or more other communication devices for implementing the QKD protocol according to the invention. Examples of an intermediary device as described herein and/or according to the invention may include, without limitation, for example a satellite or apparatus/components thereof, a ground station or apparatus/components thereof, a relay station, repeater, telecommunication apparatus, network apparatus, network nodes, routers, and/or any apparatus, communication device, computing device or server and the like with a communication interface configured for and/or including functionality of, without limitation, for example a non-quantum, standard or classical communication interface for communicating over non-quantum, standard or classical communication channel(s); and a quantum communication interface for communicating over quantum channel(s).

The first or second endpoint device or first or second communication device (also referred to herein as first or second device) may comprise or represent any device or apparatus with communication components/systems or communication capabilities configured to at least transmit data over a quantum communication channel and/or establish one or more non-quantum, standard or classical communication channels with an intermediary device and/or other devices for implementing the QKD protocol according to the invention. Examples of a first or second endpoint/communication devices according to the invention may include, without limitation, for example a satellite and/or apparatus/components thereof, a satellite ground receiving station and/or apparatus/components thereof, optical ground receiving station, user device, endpoint device, telecommunication apparatus, network apparatus, network nodes, routers, and/or any communication device, computing device or server and the like with a communication interface configured for and/or including functionality of, without limitation, for example a non-quantum, standard or classical communication interface for communicating over non-quantum, standard or classical communication channel(s); and a quantum communication interface for communicating over quantum channel(s).

FIG. 1 is a schematic diagram illustrating an example key exchange system 100 using a QKD protocol according to the invention. The key exchange system 100 includes an intermediary device 102a, a first device 102b and a second device 102c in communication with each other. The first and second devices 102b and 102c may require a shared key (or final shared key) that is facilitated by at least the intermediary device 102a. Each of the first device 102b and intermediary device 102a are configured to retrieve and/or generate random sets of symbols (or strings/streams). The first device 102a transmits the first set of symbols to the intermediary device 102a a first quantum communication channel 104a. The intermediary device 102a transmits the second set of symbols to the second device 102c over a second quantum communication channel 104b. The intermediary device 102a also communicates with the first and second devices 102b and 102c over first and second non-quantum or standard/classical communications channels 106a and 106b, respectively, for exchanging further key information and/or protocol data. The first and second devices 102b and 102c withhold or do not share any information associated with the first set of symbols the first device 102b transmitted and second set of symbols the second device 102c received over the respective quantum communication channels 104a and 104b. Once all the required key information and/or protocol data has been exchanged between the intermediary device 102a and the first and second devices 102b and 102c, the first and second devices 102b and 102c communicate with each other over a third non-quantum or standard/classical communications channel 106c to establish a first or second shared keys and/or a common secret set of symbols from which a final shared key may be agreed upon and/or derived and the like for use by the first and second devices 102b and 102c in, without limitation, for example cryptographic operations/secure communications between the first and second devices 102b and 102c. Using a QKD protocol ensures that the final shared key can be agreed upon such that the intermediary device 102a cannot derive even though it received the first set of symbols and transmitted the second set of symbols over the quantum channels 104a and 104b from/to each device 102b and 102c.

For simplicity, the intermediary device 102a is referred to as Alice 102a (e.g. A), the first device 102b is referred to as Bob 102b (e.g. B) and the second device 102c is referred to as Carol 102c (e.g. C). The implementation of the QKD protocol with respect to Alice 102a, Bob 102b and Carol 102c is described, without limitation, for example in four main key exchange subprocesses or portions based on the following: a first key exchange subprocess describing a first set of key exchange interactions between Alice 102a and Bob 102b; a second key exchange subprocess describes a second set of key exchange interactions between Alice 102a and Carol 102c; a third key exchange subprocess describes a third set of key exchange interactions between Alice 102a and Carol 102c (and/or Bob 102b); and a fourth key exchange subprocess describes a fourth set of key exchange interactions between Bob 102b and Carol 102c for forming the final shared key between Bob 102b and Carol 102c. The following key exchange subprocess(es) may be described, without limitation, for example in relation to Alice 102a, Bob 102b and/or Carol 102c based on the following:

In the first key exchange subprocess, Alice 102a and Bob 102b perform a first set of key exchange interactions that enables Alice 102a to generate a first intermediate set of symbols based on exchanging first key information with Bob 102b. The first key information including data representative of the first set of symbols received by Alice 102a from Bob 102b over a first quantum channel 104a, where Bob 102b withholds from Alice 102a a first transmitting random basis set used by Bob 102b for transmitting said first set of symbols over said first quantum channel 104a to Alice 102a. For example, the first intermediate set of symbols includes those symbols of the first set of symbols that Alice 102a validly receives using a first receiving random basis set used by Alice 102a for receiving said first set of symbols over said first quantum channel 104a.

In the second key exchange subprocess, Alice 102a and Carol 102c perform a second set of key exchange interactions that enables Alice 102a to generate a second intermediate set of symbols based on exchanging second key information with Carol 102c. The second key information including data representative of a second set of symbols transmitted to Carol 102c over a second quantum channel 104b, where Carol 102c withholds from Alice 102a a second receiving random basis set used by Carol 102c when receiving said second set of symbols over said second quantum channel 104b from Alice 102a. For example, the second intermediate set of symbols may include those symbols of the second set of symbols that Alice 102a transmits and that Carol 102c validly receives using the second receiving random basis set used by Carol 102c for receiving said second set of symbols over said second quantum channel 104a. Carol 102c may transmit key information such as data representative of the positions/symbol locations of those symbols of the second set of symbols that Carol 102c validly receives using the second receiving random basis set used by Carol 102c, but Carol 102c does not transmit her second receiving random basis set to Alice 102a.

In the third key exchange subprocess, a third set of key exchange interactions between Alice 102a and Carol 102c (and/or Bob 102b) is performed in which Alice 102a sends, to Carol 102c (and/or Bob 102b), a third intermediate set of symbols based on combining the first and second intermediate sets of symbols. For example, as described herein, the combining operation performed on the first and second intermediate sets of symbols to generate a third intermediate set of symbols may be based on, without limitation, for example an XOR-type operation, one-time-pad operation, and/or encryption operation and the like, where either the first intermediate set of symbols or the second intermediate set of symbols may be applied by a similar operation to the third intermediate set of symbols to output the second intermediate set of symbols or first intermediate set of symbols. For example, the third intermediate set of symbols may be based on performing an XOR on the first and second intermediate sets of symbols, where performing an XOR on the third and first intermediate sets of symbols (or second intermediate set of symbols) yields the second intermediate set of symbols (or first intermediate set of symbols).

In the fourth key exchange subprocess, a fourth set of key exchange interactions between Bob 102b and Carol 102c is performed for forming the final shared key between Bob 102b and Carol 102c. Firstly, Bob 102b and Carol 102c may securely exchange at least first transmitting and second receiving basis information with each other. This may enable Bob 102b and Carol 102c to determine a final shared key based on the first set of symbols, the second set of symbols and the third intermediate set of symbols. Carol 102c and/or Bob 102b, depending to whom Alice 102a sent the third intermediate set of symbols, may use the third intermediate set of symbols to generate either the first and/or second intermediate sets of symbols, which can be used in a reconciliation process by Carol 102c and Bob 102b using symbol sifting operations and the like on the first intermediate set of symbols and the first set of symbols to agree upon a final key. For example, Carol 102c may derive the first intermediate set of symbols from the third intermediate set of symbols, and so with Bob 102b using the first set of symbols, Carol 102c and Bob 102b may use the first and second transmitting/receiving basis information (e.g. raw first and second transmitting/receiving basis sets or logical data representative of the first and second transmitting/receiving basis sets) to determine a final shared key. In another example, Bob 102b may derive the second intermediate set of symbols from the third intermediate set of symbols, and so with Carol 102c using the second set of symbols, Carol 102c and Bob 102a may use the first and second transmitting/receiving basis information (e.g. raw first and second transmitting/receiving basis sets or logical data representative of the first and second transmitting/receiving basis sets) to determine a final shared key. The reconciliation may use symbol sifting operations, error detection and/or privacy amplification for determining the final shared key between Carol 102c and Bob 102a.

In particular, in the first key exchange subprocess of the key exchange, Alice 102a and Bob 102b perform a first set of key exchange interactions in which Alice 102a and Bob 102b exchange a first set of symbols (e.g. $S_{AB}$). Each symbol in the first set of symbols (e.g. $S_{AB}$) may represent n bit(s), so each symbol may be one of $M=2^n$ different symbols where $n \geq 1$. The first set of symbols may be randomly generated and stored by Bob 102b and subsequently retrieved. Alternatively or additionally, Bob 102b may randomly generate the first set of symbols (e.g. $S_{AB}$), or randomly generates a bit string/stream that is converted into the first set of symbols (e.g. $S_{AB}$). Bob 102b sends the first set of symbols, $S_{AB}$, (e.g. 1,000,000 bits, when n=1) to Alice 102a over the first quantum channel 104a. For each symbol in $S_{AB}$ that is sent to Alice 102a, Bob 102b randomly selects a basis from a group of bases (e.g. B) for modulating said each symbol for transmission over the first quantum channel 104a. Thus, Bob 102b forms a first transmitting random basis set (e.g. $T_{AB}$).

For example, the first quantum channel 104a may be, without limitation, a free-space optical quantum channel or a fibre optical quantum channel between Alice 102a and Bob 102b, where Bob 102b has a quantum optical transmitter and Alice 102a has a quantum optical receiver. The group of bases B includes at least two different bases. Each of the bases includes a set of basis states for representing each of the different $M=2^n$ symbols of the first set of symbols. Each set of basis states for each basis includes $M=2^n$ different basis states. The basis states for each basis may be orthogonal. The basis states for a first basis may not be orthogonal to one or more basis states of a second basis of the set of bases.

The group of bases B may include two or more bases, without limitation, for example, a rectilinear optical polarisation basis, a diagonal optical polarisation basis, angular optical polarisation basis, and/or any other suitable optical basis for converting the symbols into modulated symbols for transmission over a quantum channel. Although optical quantum channels and corresponding bases for transmitting symbols over said optical quantum channel are described, by way of example only the invention is not so limited, it is to be appreciated by the skilled person that the key exchange protocol according to the invention may be used over any type of quantum communication channel between Alice 102a and Bob 102b and/or as the application demands.

Alice 102a receives the transmitted first set of symbols over the first quantum channel 104a by demodulating each symbol of the first set of symbols, $S_{AB}$, received via the first quantum channel 104a by randomly selecting a basis from the group of bases B (e.g. Alice 102a has the same group of bases B as Bob 102b) that is used to demodulate the received symbols from the first quantum channel 104a. Thus, Alice 102a forms a first receiving random basis set, $R_{AB}$. Typically, a symbol is successfully received when the output or measurement of the demodulator of Alice 102a clearly indicates data representative of one of the basis states of the selected basis that Alice 102a randomly selected. Thus, a symbol is successfully received when the measurement output of the demodulator indicates a symbol has actually been received in relation to the basis states of the selected basis used. This means that a successfully received symbol output by the demodulator will be either: 1) a symbol that is the same symbol as the transmitted symbol because the selected basis (or basis state) used by the demodulator matches the selected basis (or basis state) used to originally modulate the transmitted symbol; and 2) a symbol that is a different symbol as the transmitted symbol because the selected basis (or basis state) used by the demodulator did not match the selected basis (or basis state) used to originally modulate the transmitted symbol. That is, a successfully received symbol is a symbol output or measurement from the demodulator in which a matching basis or an unmatched basis is used compared with the basis used for modulating and transmitting the symbol. An unsuccessfully received symbol is when the measurement output of the demodulator is below predetermined basis state thresholds indicating no symbol is received in relation to the selected basis used. This means a symbol has not been received at all in relation to the selected basis used. For example, when the measurement of the received symbol is greater than or equal to a basis state threshold corresponding to a basis state of the selected basis, then a symbol has been successfully received. For example, the measurement of the received symbol reaches a basis state threshold corresponding to a basis state of the selected basis, then the symbol has been successfully received. A symbol is not successfully received when the output or measurement of the demodulator of Alice 102a is below or does not reach a basis state threshold corresponding to a basis state of the selected basis. A symbol is valid, when the symbol is successfully received and when the basis (or basis state) used to modulate and transmit the symbol is the same as the basis (or basis state) used to demodulate the transmitted symbol. A symbol is invalid, when the symbol is successfully received and when the basis (or basis state) used to modulate and transmit the symbol is the different to the basis (or basis state) used to demodulate the transmitted symbol.

In particular, if Bob 102b and Alice 102a chose the same basis for modulating a symbol for transmission and demodulating the transmitted symbol, respectively, then quantum physics states that there is a high probability that the basis state of the symbol received by Alice 102a will be the same as the transmitted basis state used for transmitting the symbol by Bob 102b, i.e. is validly and successfully received. The symbol is valid because the basis used by Bob 102b for transmission is the same basis used by Alice 102a when receiving the transmitted symbol. If Bob 102b and Alice 102a chose a different basis for modulating a symbol for transmission and demodulating the transmitted symbol, respectively, then quantum physics states that there is a low probability that the basis state of the symbol received by Alice 102a will be correlated with the transmitted basis state used for transmitting the symbol by Bob 102b, but instead will be a random selection from the possible basis states in that basis, i.e. is successfully received, but invalid because the received/demodulated symbol is different to the original symbol that is transmitted.

Given that there may be losses in the quantum channel, including the quantum transmitter and receiver, it is to be expected that some of the symbols transmitted by Bob 102b over the first quantum channel 104a are not successfully received by Alice 102a. Thus, Alice 102a determines an indication of the symbol/bit numbers or locations within the first set of symbols (e.g. $S_{AB}$) that Alice 102a successfully receives. As part of the key information that is exchanged between Alice 102a and Bob 102b, Alice 102a then sends to Bob 102b over a first classical communication channel 104b (e.g. a bidirectional classical channel) an indication of successfully received symbols (e.g. IB) that includes, without limitation, for example data representative of the symbol numbers (e.g. bit numbers) and/or locations of the successfully received symbols (e.g. #2, #718, #2818, . . . ) Note, the symbol numbers do not indicate which basis Alice 102a used or which basis states Alice 102a actually assigned to each received symbol or even which symbols were received. Rather, the data representative of symbol numbers or locations are simply an indication that Alice 102a managed to demodulate those corresponding symbols and map them to a basis state.

For example, when n=1 bit per symbol i.e. a symbol is a bit (e.g. two symbols are used to represent the bits '0' and '1'), if Bob 102b sends a first set of symbols or bit string/stream of 1,000,000 bits over the first quantum channel 104a, then, when Alice 102a randomly selects the basis from the set of bases B for demodulating the bits of the first set of symbols, Alice 102a may only, without limitation, for example successfully receive around 1000 bits due to atmospheric losses and/or other losses of the first quantum channel 104a. So, Alice 102a may send a set of indicative values (e.g. IB) of approximately 1000 values representing the symbol/bit numbers or symbol/bit positions of the symbols/bits in the first set of symbols that Alice 102a successfully received.

Both Alice 102a and Bob 102b may discard all the other symbols (e.g. bits) from the first set of symbols (e.g. $S_{AB}$) that Alice 102a did not successfully receive. This means that Alice 102a may generate or form a first intermediate set of symbols, also referred to as a first partial key associated with Alice 102a, (e.g. $PK_{AB}$) from the first set of symbols (e.g. $S_{AB}$) that were successfully received by Alice 102a. Note, the first intermediate set of symbols (e.g. $PK_{AB}$) is not necessarily the same as the first set of symbols with the unsuccessfully received symbols discarded therefrom. This is because Alice 102a used a receiving random basis set (e.g. $R_{AB}$) to receive the first set of symbols (e.g. $S_{AB}$) transmitted over the first quantum channel 104a from Bob 102b, and it is highly unlikely or improbable that the first receiving random basis set (e.g. $R_{AB}$) used by Alice 102a is the same as the first transmitting random basis set (e.g. $T_{AB}$) used by Bob 102b when transmitting the first set of symbols (e.g. $S_{AB}$) over the first quantum channel 104a to Alice 102a.

Alice 102a also sends further key information to Bob 102b over the first classical communication channel 106a, the further key information including the first receiving basis set (e.g. $R_{AB}$), which includes basis values of each of randomly selected basis state that Alice 102a used to receive the corresponding symbol of the first set of symbols (e.g. $S_{AB}$) transmitted by Bob 102b over the first quantum channel 104a. Thus, Alice 102a has key information of: a) the first receiving basis set (e.g. $R_{AB}$); and b) the first intermediate set of symbols (e.g. $PK_{AB}$). Bob 102b has the key information of: a) the first set of symbols (e.g. $S_{AB}$); b) the first transmitting random basis set (e.g. $T_{AB}$); and c) the first receiving random basis set (e.g. $R_{AB}$); and d) a set of indicative values (e.g. IB) representing the symbol/bit numbers or symbol/bit positions of the symbols/bits in the first set of symbols that Alice 102a successfully received.

In the second key exchange subprocess of the key exchange protocol, Alice 102a and Carol 102c perform a second set of key exchange data interactions in which Alice 102a and Carol 102c exchange a second set of symbols (e.g. $S_{AC}$). Each symbol in the second set of symbols (e.g. $S_{AC}$) may represent n bit(s), so each symbol may be one of $M=2^n$ different symbols where $n \geq 1$. The second set of symbols may be randomly generated and stored by Alice 102a and subsequently retrieved. Alternatively or additionally, Alice 102a may randomly generate the second set of symbols (e.g. $S_{AC}$), or randomly generates a bit string/stream that is converted into the second set of symbols (e.g. $S_{AC}$). Alice 102a sends the second set of symbols (e.g. $S_{AC}$) (e.g. also 1,000,000 bits, when n=1) to Carol 102c over a second quantum channel 104b. For each symbol in the second set of symbols (e.g. $S_{AC}$) that is sent to Carol 102c, Alice 102a randomly selects a basis from the group of bases B for modulating said each symbol for transmission over the second quantum channel 104b. Thus, Alice 102a forms a second transmitting random basis set (e.g. $T_{AC}$).

For example, the second quantum channel 104b may be, without limitation, for example a free-space optical quantum channel or a fibre optical quantum channel between Alice 102a and Carol 102c, where Carol 102c has a quantum optical receiver and Alice 102a has a quantum optical transmitter. Carol 102c demodulates each symbol received via the second quantum channel 104b by randomly selecting a basis from the group of bases B that is used to demodulate the received symbols from the second quantum channel 104b. Carol 102c thus receives the transmitted second set of symbols over the second quantum channel 104b by demodulating each symbol of the second set of symbols, $S_{AC}$, received via the second quantum channel 104b by randomly selecting a basis from the group of bases B (e.g. Carol 102c has the same group of bases B as Alice 102a) that is used to demodulate the received symbols from the second quantum channel 104b. Thus, Carol 102c forms a second receiving random basis set, $R_{AC}$.

Given that there may be losses in the quantum channel 104b, including the quantum transmitter and receiver, it is to be expected that some of the symbols transmitted by Alice 102a over the second quantum channel 104b are not successfully received by Carol 102c. Carol 102c determines an indication of the symbol/bit numbers or locations within the second set of symbols (e.g. $S_{AC}$) that are successfully received by Carol 102c. As part of the key information that is exchanged between Alice 102a and Carol 102c, Carol 102c then sends to Alice 102a over a second classical communication channel, set up between Alice 102a and Carol 102c, an indication of successfully received symbols (e.g. $I_C$) that includes, without limitation, for example data representative data representative of the symbol numbers (e.g. bit numbers) of the successfully received symbols (e.g. #3, #141, #5926, . . . ). Note, the symbol numbers do not indicate which basis Carol 102c used or which basis states Carol 102c actually assigned to each received symbol or even which actual symbols were received. Rather, the symbol/bit numbers or locations are simply an indication that Carol 102c managed to demodulate those corresponding symbols and map them to a basis state.

For example, when n=1 bit per symbol (e.g. two symbols are used to represent the bits '0' and '1'), if Alice 102a sends a second set of symbols or bit string/stream of 1,000,000 bits over the second quantum channel 104b, then in practice, when Carol 102c randomly selects the basis from the group of bases B for demodulating the bits of the second set of symbols, Carol 102c may only, without limitation, for example successfully receive around 1000 bits due to atmospheric losses and/or other losses of the second quantum channel 104b. So, Carol 102c may send a set of indicative values (e.g. $I_C$) of approximately 1000 values representing the symbol/bit numbers or symbol/bit positions of the symbols/bits in the second set of symbols that Carol 102c successfully received.

Both Alice 102a and Carol 102c may discard all the other symbols (e.g. bits) from the second set of symbols (e.g. $S_{AC}$) that Carol 102c did not successfully receive. This means that Alice 102a may generate or form a second intermediate set of symbols, also referred to as a second partial key associated with Alice 102a, (e.g. $PK_{AC}$) from the second set of symbols (e.g. $S_{AC}$) that were successfully received by Carol 102c. Note, the second intermediate set of symbols (e.g. $PK_{AC}$) is not necessarily the same as the second set of symbols with the unsuccessfully received symbols discarded therefrom. This is because Carol 102c used a second receiving random basis set (e.g. $R_{AC}$) to receive the second set of symbols (e.g. $S_{AC}$) transmitted over the second quantum channel 104b from Alice 102a, and it is highly unlikely or improbable that the second receiving random basis set (e.g. $R_{AC}$) used by Carol 102c is the same as the second transmitting random basis set (e.g. $T_{AC}$) used by Alice 102a when transmitting the second set of symbols (e.g. $S_{AC}$) over the second quantum channel 104b to Carol 102c.

Alice 102a also sends further key information to Carol 102c over the second classical communication channel 106b, the further key information including the second transmitting basis set (e.g. $T_{AC}$), which includes basis values of each of randomly selected basis state that Alice 102a used to transmit the corresponding symbol of the second set of symbols (e.g. $S_{AC}$) transmitted by Alice 102a over the second quantum channel 104b to Carol 102c. Thus, Alice 102a has key information of: a) the second transmitting basis set (e.g. $T_{AC}$); and b) the second intermediate set of symbols (e.g. $PK_{AC}$); and c) a set of indicative values (e.g. $I_C$) representing the symbol/bit numbers or symbol/bit positions of the symbols/bits in the second set of symbols that Carol 102c successfully received. Carol 102c has the key information of: a) the second receiving random basis set (e.g. $R_{AC}$); b) the second transmitting random basis set (e.g. $T_{AC}$); and c) a set of indicative values (e.g. $I_C$) representing the symbol/bit numbers or symbol/bit positions of the symbols/bits in the second set of symbols that Carol 102c successfully received.

In the third key exchange subprocess, a third set of key exchange interactions is performed in which Alice 102a sends Carol 102c data representative of the first set of symbols (e.g. $S_{AB}$) that Alice 102a successfully received from Bob 102b. Although Alice 102a does not know which symbols of the first set of symbols (e.g. $S_{AB}$) that were validly received because Bob 102b has withheld the first transmitting basis set (e.g. $T_{AB}$), Alice 102a does know which symbols of the first set of symbols (e.g. $S_{AB}$) were successfully received using the first receiving basis set (e.g. $R_{AB}$), which is the first intermediate set of symbols (e.g. $PK_{AB}$). Thus, Alice 102a sends Carol 102c the first intermediate set of symbols (e.g. $PK_{AB}$) using a masking or encryption approach to protect the first intermediate set of symbols (e.g. $PK_{AB}$) and thus protect any of the first set of symbols (e.g. $S_{AB}$) that Alice 102a inadvertently correctly and validly received. In particular, Alice 102a generates a third intermediate set of symbols (e.g. $C_{BC}$) based on Alice 102a performing a set of combining/processing operations for combining the first intermediate set of symbols (e.g. $PK_{AB}$) with the second intermediate set of symbols (e.g. $PK_{AC}$) using one or more combining operations.

For example, the one or more combining/processing operations performed for combining the first and second intermediate sets of symbols (e.g. $PK_{AB}$ and $PK_{AC}$) may include, without limitation, for example, one or more processing operations of: when n=1, then the set of symbols may be bit strings, and the one or more symbol operations include a bitwise XOR operation performed between the first intermediate set of symbols/bits (e.g. $PK_{AB}$) and the second intermediate set of symbols/bits (e.g. $PK_{AC}$) producing a third intermediate set of symbols/bits $C_{BC}$ (e.g. $C_{BC}=PK_{AB}$ XOR $PK_{AC}$); when n>1, the first and second intermediate sets of symbols (e.g. $PK_{AB}$ and $PK_{AC}$) may be converted to bit strings and the one or more symbol operations may include a bitwise XOR operation performed between the first intermediate set of bits (e.g. $PK_{ABb}$) and the second intermediate set of bits (e.g. $PK_{ACb}$), resulting in a third intermediate bit string (e.g. $C_{BCb}=PK_{ABb}$ XOR $PK_{ABb}$), which may be re-converted into the third intermediate set of symbols (e.g. $C_{BC}$); an extended XOR operation, with equivalent properties as a bitwise XOR, may be performed directly on the corresponding symbols of the first and second intermediate sets of symbols (e.g. $C_{BC}=PK_{AB}$ extXOR $PK_{AC}$); one-time-pad (OTP) encryption operations on the first intermediate set of symbols (e.g. $PK_{AB}$) using the second intermediate set of symbols (e.g. $PK_{AC}$) as the OTP, or using an OTP or key (e.g. Kc) that was previously exchanged between Alice 102a and Carol 102c (e.g. $C_{BC}=OTP_E(PK_{AB}, PK_{AC}$ or Kc); and/or any other masking or obfuscation operation using the first and second intermediate sets of symbols (e.g. $PK_{AB}$ and $PK_{AC}$) for producing a third intermediate set of symbols (e.g. $C_{BC}$), from which Carol 102c may derive a received first intermediate set of symbols (e.g. $PK_{AB}$) using Carol's 102c received set of secret symbols and the other key information exchanged with Alice 102a. Alice 102a sends the third intermediate set of symbols (e.g. $C_{BC}$) to Carol 102c over the second classical communication channel 106b.

In a fourth key exchange subprocess, a fourth set of key exchange interactions is performed by Carol 102c and Bob 102b. In one example, Alice 102a sends Carol 102c the third intermediate set of symbols (e.g. $C_{BC}$), where Carol 102c performs a set of corresponding processing operations for retrieving or calculating the first intermediate set of symbols (e.g. $PK_{AB}$) from the received third intermediate set of symbols (e.g. $C_{BC}$) using the key exchange information exchanged with Alice 102a during the second key exchange subprocess along with the received second set of symbols and/or receiving basis information known only to Carol 102c. The key exchange information known to Carol 102c includes: the second transmitting random basis set (e.g. $T_{AC}$); and a set of indicative values (e.g. $I_C$) representing the symbol/bit numbers or symbol/bit positions of the symbols/bits in the second set of symbols that Carol 102c successfully received. Of course, Carol 102c also has knowledge of the received second set of symbols; and the second receiving random basis set (e.g. $R_{AC}$). Thus, Carol 102c is able to determine or estimate the second intermediate set of symbols (e.g. $PK_{AC}$) generated by Alice 102a using at least the received second set of symbols (e.g. $S_{AC}$), the second receiving random basis set (e.g. $R_{AC}$), the second transmitting random basis set (e.g. $T_{AC}$) and/or the set of indicative values (e.g. $I_C$) representing the symbol/bit numbers or symbol/bit positions of the symbols/bits in the second set of symbols (e.g. $S_{AC}$) that Carol 102c successfully received.

Using the determined/estimated/retrieved second intermediate set of symbols (e.g. $PK_{AC}$), Carol 102c performs the reciprocal operations that Alice 102a used to generate the third intermediate set of symbols (e.g. $C_{BC}$) to retrieve the first intermediate set of symbols (e.g. $PK_{AB}$). For example, if Alice 102a performed an XOR operation using the first and second intermediate sets of symbols (e.g. $PK_{AB}$ and $PK_{AC}$) to produce the third intermediate set of symbols (e.g. $C_{BC}=PK_{AB}$ XOR $PK_{AC}$), then Carol 102c can perform one or more corresponding XOR operation(s) on the third intermediate set of symbols (e.g. $C_{BC}$) for generating the first intermediate set of symbols (e.g. $PK_{AB}$) using the calculated/retrieved second intermediate set of symbols (e.g. $PK_{AC}$). The XOR operation(s) performed using the received third intermediate set of symbols (e.g. $C_{BC}$) and the retrieved second intermediate set of symbols (e.g. $PK_{AC}$) results in an estimate of the first intermediate set of symbols (e.g. $PK_{AB}$), e.g. $PK_{AB}=C_{BC}$ XOR $PK_{AC}=(PK_{AB}$ XOR $PK_{AC})$ XOR $PK_{AC}$. Thus, Carol 102c may use the first intermediate set of symbols whilst Bob 102b uses the first set of symbols along with corresponding transmitting and/or receiving basis information to determine a final shared key.

In another example, Alice 102a sends Bob 102b the third intermediate set of symbols (e.g. $C_{BC}$), where Bob 102b performs a set of corresponding processing operations for retrieving or calculating the second intermediate set of symbols (e.g. $PK_{AC}$) from the received third intermediate set of symbols (e.g. $C_{BC}$) using the key exchange information exchanged with Alice 102a during the first key exchange subprocess along with the first set of symbols (e.g. $S_{AB}$) and/or transmitting basis information known to Bob 102b. The key exchange information known to Bob 102b includes: the first receiving random basis set (e.g. $R_{AB}$); and a set of indicative values (e.g. IB) representing the symbol/bit numbers or symbol/bit positions of the symbols/bits in the first set of symbols that Alice 102a successfully received. Of course, Bob 102b also has knowledge of the first set of symbols (e.g. $S_{AB}$); and the first transmitting random basis set (e.g. $T_A B$). Thus, Bob 102b is able to determine or estimate the first intermediate set of symbols (e.g. $PK_{AB}$) generated by Alice 102a using at least the first set of symbols (e.g. $S_{AB}$), the second receiving random basis set (e.g. $R_{AB}$), and/or the set of indicative values (e.g. IB) representing the symbol/bit numbers or symbol/bit positions of the symbols/bits in the second set of symbols (e.g. $S_{AB}$) that Alice 102a successfully received.

Using the determined first intermediate set of symbols (e.g. $PK_{AB}$), Bob 102b performs the reciprocal operations that Alice 102a used to generate the third intermediate set of symbols (e.g. $C_{BC}$) to retrieve the second intermediate set of symbols (e.g. $PK_{AC}$). For example, if Alice 102a performed an XOR operation using the first and second intermediate sets of symbols (e.g. $PK_{AB}$ and $PK_{AC}$) to produce the third intermediate set of symbols (e.g. $C_{BC}=PK_{AB}$ XOR $PK_{AC}$), then Bob 102b can perform one or more corresponding XOR operation(s) on the third intermediate set of symbols (e.g. $C_{BC}$) for generating the second intermediate set of symbols (e.g. $PK_{AC}$) using the first intermediate set of symbols (e.g. $PK_{AB}$). The XOR operation(s) performed using the received third intermediate set of symbols (e.g. $C_{BC}$) and the retrieved first intermediate set of symbols (e.g. $PK_{AB}$) results in the second intermediate set of symbols (e.g. $PK_{AC}$), e.g. $PK_{AC}=C_{BC}$ XOR $PK_{AB}=(PK_{AB}$ XOR $PK_{AC})$ XOR $PK_{AB}$. Thus, Bob 102b may use the second intermediate set of symbols whilst Carol 102c uses the received second set of symbols along with corresponding transmitting and/or receiving basis information to determine a final shared key.

Additionally or alternatively, Alice 102a may send Bob 102b and Carol 102c the third intermediate set of symbols (e.g. $C_{BC}$). In this case, where Bob 102b performs the above set of corresponding processing operations for retrieving or calculating the first and second intermediate sets of symbols (e.g. $PK_{AB}$ and $PK_{AC}$) from the received third intermediate set of symbols (e.g. $C_{BC}$) using the key exchange information exchanged with Alice 102a during the first key exchange subprocess along with the first set of symbols (e.g. $S_{AB}$) and/or transmitting basis information known to Bob 102b. Carol 102c also performs the above set of corresponding processing operations for retrieving or calculating the first and second intermediate sets of symbols (e.g. $PK_{AB}$ and $PK_{AC}$) from the received third intermediate set of symbols (e.g. $C_{BC}$) using the key exchange information exchanged with Alice 102a during the second key exchange subprocess along with the received second set of symbols (e.g. $S_{AC}$) and/or receiving basis information known to Carol 102c. Both Bob 102b and Carol 102c may agree on whether to use the first or second intermediate sets of symbols and corresponding first and second sets of symbols when determining a final shared key.

In another example, when n>1, Alice 102a may have converted the first and second intermediate sets of symbols into bit strings in which a bitwise XOR operation is performed between the bit string of the first intermediate set of symbols and the bit string second intermediate set of symbols with the resulting bit string being converted into symbols as the third intermediate set of symbols. Thus, Carol 102c and/or Bob 102b may perform a similar set of operations as described above, by converting the received third intermediate set of symbols into a bit string of the third intermediate set of symbols perform a bitwise XOR operation using the bit string of the third intermediate set of symbols with the second intermediate set of symbols or the first intermediate set of symbols to generate or retrieve said first intermediate set of symbols or said second intermediate set of symbols, respectively.

Alternatively, Alice 102a may use one or more extended XOR operations performed on the corresponding symbols of the first and second intermediate sets of symbols to generate the third intermediate set of symbols. Carol 102c and/or Bob 102b may perform a similar set of operations as described above on the third intermediate set of symbols by performing similar one or more extended XOR operations using the second intermediate set of symbols or the first intermediate set of symbols to generate or retrieve said first intermediate set of symbols or said second intermediate set of symbols, respectively.

Alternatively or additionally, Alice 102a may have used OTP encryption operation on the corresponding symbols of the first and/or second intermediate sets of symbols to generate the third intermediate set of symbols (or an OTP on the first intermediate set of symbols using a key previously exchanged with Carol 102c and/or an OTP on the second intermediate set of symbols using a key previously exchanged with Bob 102b). For example, the third intermediate set of symbols may result from OTP operations between the first and second intermediate sets of symbols (e.g. $C_{BC}=OTP_E(PK_{AB}, PK_{AC})$). Carol 102c may perform OTP decryption operations on the received third intermediate set of symbols by deriving the second intermediate set of symbols from key information exchanged with Alice 102a in the second key exchange subprocess to retrieve the first intermediate set of symbols. Alternatively or additionally, Bob 102b may perform OTP decryption operations on the received third intermediate set of symbols by deriving the first intermediate set of symbols from key information exchanged with Alice 102a in the first key exchange subprocess to retrieve the second intermediate set of symbols.

It is noted that the first or second intermediate set of symbols (e.g. $PK_{AB}$ or $PK_{AC}$) includes only those symbols that Alice 102a considered were received/transmitted successfully, but which have not been checked as valid. Thus, there will be parts of the first intermediate set of symbols (e.g. $PK_{AB}$) that have incorrect symbol values when compared with the first sets of symbols transmitted from Bob 102b. Similarly, there will be parts of the second intermediate set of symbols (e.g. $PK_{AC}$) calculated by Carol 102c that have incorrect symbol values when compared with the second set of symbols transmitted from Alice 102a. Thus, using an XOR or some of the above operations, those invalid symbols in the retrieved first intermediate and/or second intermediate set of secret symbols (e.g. $PK_{AB}$ or $PK_{AC}$) will also be invalid or incorrect when compared with the corresponding symbols of the first and/or second sets of symbols transmitted over the corresponding quantum channels. However, there should be enough symbols in the retrieved first intermediate and/or second intermediate set of secret symbols (e.g. $PK_{AB}$ or $PK_{AC}$) that match the corresponding symbols in the first and/or second sets of symbols transmitted by Bob 102b and received by Carol 102c. That is, there will be a portion of symbols in the retrieved first and/or second intermediate sets of symbols (e.g. $PK_{AB}$ or $PK_{AC}$) that are valid and which have symbol positions that correspond to the positions of matching symbols in the first and/or second sets of symbols. These matching valid symbols of the retrieved first and/or second intermediate sets of symbols (e.g. $PK_{AB}$ or $PK_{AC}$) will be the same as the corresponding symbols of the first and second sets of symbols, respectively. Alice 102a does not know which symbols of the retrieved first and/or second intermediate sets of symbols (e.g. $PK_{AB}$ or $PK_{AC}$) are valid and match the corresponding symbols of the first and second sets of symbols (e.g. $S_{AB}$ or $S_{AC}$). This means that, should Carol receive the third intermediate set of symbols, then Carol 102c and Bob 102b may perform a further key exchange using the retrieved first intermediate set of symbols and the first set of symbols transmitted by Bob 102b along with at least the withheld transmitting/receiving basis information to agree upon a final shared key that will be unknown to Alice 102a. Similarly, should Bob 102b receive the third intermediate set of symbols, then Bob 102b and Carol 102c may perform a further key exchange using the retrieved second intermediate set of symbols and the received second set of symbols, respectively, along with at least the withheld transmitting/receiving basis information to agree upon a final shared key that will be unknown to Alice 102a. Should Alice 102a send both Bob 102b and Carol 102c the third intermediate set of symbols, then Bob 102b and Carol 102c may perform a further key exchange using the retrieved first and/or second intermediate set of symbols and the first and/or received second set of symbols, respectively, along with at least the withheld transmitting/receiving basis information to agree upon a final shared key that will be unknown to Alice 102a.

In particular, Carol 102c and Bob 102b may further exchange of sending basis information, over the classical communication channel therebetween using secure communications (e.g. encrypted communications using previously agreed keys therebetween) to prevent Alice 102a and/or any other eavesdroppers accessing, at least the transmitting and/or receiving basis information they have to each other so they can each communicate and perform a reconciliation of at least the retrieved first intermediate set of symbols and the first set of symbols respectively, assuming Alice 102a only sent Carol 102c the third intermediate set of symbols. That said, if Alice 102a sent the third intermediate set of symbols to Bob 102b, then they can each communicate and perform a reconciliation of at least the retrieved second intermediate set of symbols and the second set of symbols respectively. Alternatively, if Alice 102a sent the third intermediate set of symbols to both Bob 102b and Carol 102c, then they can each communicate and perform a reconciliation of at least the retrieved first and second intermediate set of symbols and the first set of symbols and received second set of symbols respectively, which may be advantageous as there are double the number of symbols to use when forming the final shared key.

For example, assuming the Alice 102a sent the third intermediate set of symbols to Carol 102c only (the other variations may be similarly implemented) the reconciliation by Carol 102c and Bob 102b may involve performing symbol sifting (or bit sifting) or key exchange operations with each other using a third communication channel 106c in which Alice 102a is not a party to. For example, during the first key exchange subprocess of the key exchange protocol, Bob 102b received the first receiving basis set that Alice 102a used to receive the first set of symbols over the first quantum channel 104a and already has the first transmitting basis set that Bob 102b used when transmitting the first set of symbols to Alice 102a over the first quantum channel 104a. Thus, Bob 102b may securely send basis information based on the first transmitting basis set and the first receiving basis set associated with the first set of symbols to Carol 102c over the third communication channel 106c. Similarly, during the second key exchange subprocess of the key exchange protocol, Carol 102c received the second transmitting basis set that Alice 102a used to transmit the second set of symbols over the second quantum channel 104b and already has the second receiving basis set that Carol 102c used when receiving the second set of symbols from Alice 102a over the second quantum channel 104b. Thus, Carol 102c may securely send basis information based on the second transmitting basis set and the second receiving basis set associated with the second set of symbols to Bob 102b over the third communication channel 106c.

Furthermore, Bob 102b may use the first set of symbols (or a first intermediate set of symbols determined by Bob 102b using the first transmitting and receiving basis sets and indications of validly receive symbols) and Carol 102c may use the first intermediate set of symbols that Carol 102c calculated from the third intermediate set of symbols, at least some of these symbols in the first set of symbols and first intermediate set of symbols will match, which can be determined by calculating, for each symbol, whether the corresponding basis value in the first transmitting basis set and first receiving basis set match and the corresponding basis value in the second transmitting basis set and second receiving basis set match. Thus, both Bob 102b and Carol 102c may perform this calculation on the first set of symbols and first intermediate set of symbols, respectively, which results in a first common set of symbols (or a first shared key) for Bob 102b and a second common set of symbols (or a second shared key) for Carol 102c. Bob 102b and Carol 102c may then perform error detection/correction on their corresponding first and second shared keys and/or privacy amplification as may be performed with most common QKD protocols to form a final shared key therebetween, which can be used by Bob 102b and Carol 102c in secure communications therebetween and/or any other cryptographic operation and the like.

Alternatively or additionally, the reconciliation may involve perform symbol sifting (or bit sifting) or key exchange operations with each other using a third communication channel 108 in which Alice 102a is not a party to. For example, during the first part of the QKD protocol, Bob 102b may use the first receiving basis set that Alice 102a used to receive the first set of symbols over the first quantum channel 104a and the first transmitting basis set that Bob 102b used when transmitting the first set of symbols to Alice 102a over the first quantum channel 104a to determine a first basis flag set (or list of matching bases). That is, Bob 102b forms a first basis flag set including a plurality of indications/flags corresponding to each symbol of the first set of secret symbols, where each indication/flag for a symbol includes data representative of whether that symbol was validly received by Alice 102a or not based on the comparison of first receiving and transmitting basis sets (e.g. an indication/flag of '1' indicates a validly received symbol, an indication/flag of '0' indicates a symbol not validly received).

Similarly, Carol 102c also use the second transmitting basis set from Alice 102a and the second receiving basis set Carol 102c used when receiving the second set of symbols to determine a second basis flag set (or list of matching bases) including data representative of a whether each symbol in the second set of symbols was validly received by Carol 102c or not. That is, Carol 102c forms a second basis flag set including a plurality of indications/flags corresponding to each symbol of the received second set of symbols, where each indication/flag for a symbol includes data representative of whether that symbol was validly received by Carol 102c or not based on the comparison of second receiving and transmitting basis sets (e.g. an indication/flag of '1' indicates a validly received symbol, an indication/flag of '0' indicates a symbol not validly received).

Once computed, Bob 102b sends the first basis flag set (e.g. first set of matching bases) to Carol 102c and Carol 102c sends the second basis flag set to Bob 102b using secure communications over the third communication channel 108. For example, in the above example, when n=1 (e.g. a symbol is a bit), and if Alice 102a successfully received 1000 bits of the first set of symbols transmitted from Bob 102b (some of which are valid or invalid), then the first basis flag set includes 1000 indications/flags corresponding to the 1000 bits of the received first set of symbols, each indication/flag representing whether the corresponding bit was validly received or not. Similarly, if Carol 102a successfully received 1000 bits of the second set of symbols transmitted from Alice 102a, then the second basis flag set includes 1000 indications/flags corresponding to the 1000 bits of the received second set of symbols, each indication/flag representing whether the corresponding bit was validly received or not.

On receiving the second basis flag set from Carol 102c, Bob 102b forms a first shared key (or a common set of symbols) by comparing each basis flag in the first set of basis flags with each corresponding basis flag in the received second set of basis flags from Carol 102c and discards those symbols from the first set of symbols where the corresponding basis flags from the first and received second basis flag sets do not match. The undiscarded or remaining symbols of the first set of symbols may be used to form the first shared key (or first common set of symbols) for Bob 102b. Similarly, receiving the first basis flag set from Bob 102b, Carol 102c forms a second shared key (e.g. or a second common set of symbols) by comparing each basis flag in the received first basis flag set with each corresponding basis flag in the second basis flag set and discards those symbols from the first intermediate set of symbols Carol 102c computed, where the corresponding basis flags from the received first basis flag set and second basis flag set do not match. The remaining symbols in the first intermediate set of symbols computed by Carol forms the second shared key (or second common set of symbols) for Carol 102c. For example, when n=1 i.e. a symbol is a bit, in the above example the first set of bits for Bob 102b may be, without limitation, for example around 500 bits. Thus, on average approximately half these bits may have matching basis flags between Bob 102b and Carol 102c, such that the first shared key (or first common set of bits) is approximately 250 bits.

Bob 102b and Carol 102c now have a first shared key and a second shared key, respectively (e.g. a first common set of symbols and a second common set of symbols). Although the first shared key may be the same as the second shared key, they may not necessarily be the same due to errors from transmission or measurement during demodulation and the like over the quantum channels. Thus, Bob 102b and Carol 102c may perform bit sifting, error detection and/or correction in relation to the first and second shared keys over the third communication channel 106c. For example, the error detection and correction of the first and second shared keys may be based on, without limitation, for example how error detection and correction of the first and second shared keys is implemented or performed using the standard Decoy State Protocol or the Standard BB84 Protocol and the like. However, in those cases Alice 102a knows the cryptographic key and the error detection and correction are made between Alice and Bob, and Alice and Carol rather than by Bob and Carol as in the key exchange protocol according to the present invention. Nevertheless, these types of error detection and correction can be adapted for use by Bob 102b and Carol 102c for performing error detection and correction of the first and second shared keys and result in a common shared key or a common set of symbols from which a cryptographic key, e.g. a final shared key, may be produced for Bob 102a and Carol 102c. From this common shared key, a final shared key may be derived by the Bob 102b and Carol 102c that is only known to the Bob 102b and Carol 102c, thus, they can perform cryptographic operations with each other using a quantum-safe cryptographic key (e.g. $C_F$). The key exchange protocol according to the invention enables Bob 102b and Carol 102c to determine a final shared key (or final cryptographic key) in a quantum-safe manner even when Alice 102a is not a trusted device.

For example, assuming that Bob 102b and Alice 102a randomly generated the first and second sets of symbols appropriately, then even though Alice 102a knows all the received first sets of symbols and transmitted second sets of symbols (e.g. bits when n=1) that were transmitted from Bob 102b and transmitted to Carol 102c, there is approximately a $\frac{1}{2}^n$ probability that any of those received and transmitted symbols sent will have a validly matched receiving basis in relation to the transmitting basis that Bob 102b used and the receiving basis that Carol 102c used. This means that Alice 102a can deduce almost no information on what Bob 102b and Carol 102c have shared in the fourth subprocess of the key exchange protocol according to the invention and so will not be able to derive the agreed final shared key (or final cryptographic key) determined by Bob 102b or Carol 102c.

In another modification to the QKD system 100 implementing the QKD protocol according to the invention for improving the security strength of the final shared key determined by the key exchange protocol, both Bob 102b and Alice 102a may be configured to use, without limitation, for example a Cryptographically Secure Pseudo Random Number Generator (CSPRNG) with a pre-shared initial state to generate a final shared cryptographic key based on performing OTP encryption (e.g. XOR) on the cryptographic key determined from the common sets of sifted symbols or first and second shared keys and the CSPRNG output. Alternatively or additionally, Bob 102b and Alice 102a may be configured to use their respective CSPRNG outputs to selectively throw away bits from the cryptographic key to generate the final shared key. In this example, the security strength depends on that of the CSPRNG rather than a pre-shared key or secret.

Figure 2A:
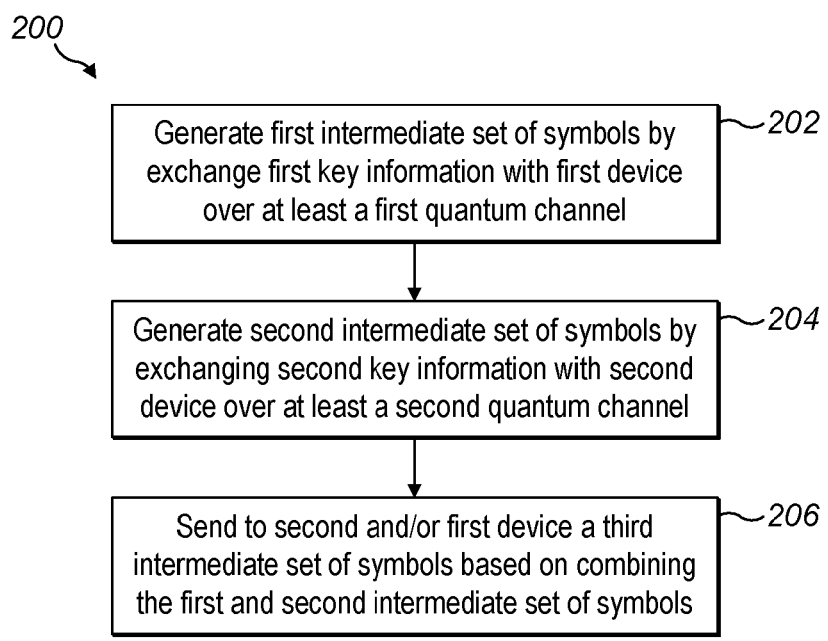
FIG. 2a is a flow diagram illustrating an example key exchange process performed by an intermediary device according to the invention.

FIG. 2a is a flow diagram illustrating an example key exchange process 200 describing the steps performed by the intermediary device for performing the key exchange process/protocol 100 as described with reference to FIG. 1 for exchanging a shared key between a first device and second device according to the invention. The key exchange process 200 is based on the key exchange process performed by the key exchange system 100 of FIG. 1. The key exchange process 200 is performed by the intermediary device and enables shared key exchange between the first device and the second device. In this example, the intermediary device is at least connected to the first device via a first quantum channel and is at least connected to the second device via a second quantum channel. The intermediary device includes a quantum receiver for receiving quantum transmissions over the first quantum channel and a quantum transmitter for receiving quantum transmissions over the second quantum channel. The first device includes a quantum transmitter for transmitting quantum information over the first quantum channel and the second device includes a quantum receiver for receiving quantum information over second quantum channels. The key exchange process 200 performed by the intermediary device includes the following steps of:

In step 202, generating a first intermediate set of symbols based on exchanging first key information with the first device. The first key information including data representative of a first set of symbols received from the first device on the first quantum channel. However, the first device withholds from the intermediary device a first transmitting random basis set used by the first device for transmitting said first set of symbols over said first quantum channel. That is, the first device does not transmit or send the first transmitting random basis set to the intermediary device. The first set of symbols may be retrieved by the first device from a randomly generated set of symbols. The first intermediate set of symbols may be calculated based on discarding all the symbols from the first set of symbols received over the first quantum channel except those symbols that were successfully or validly received by the intermediary device.

In step 204, generating a second intermediate set of symbols based on exchanging second key information with the second device. The second key information including data representative of a second set of symbols transmitted to the second device on a second quantum channel. However, the second device also withholds from the intermediary device a second receiving random basis set used by the second device when receiving said second set of symbols over said second quantum channel. That is, the second device does not transmit or send the second receiving random basis set to the intermediary device. The second set of symbols may be retrieved by the intermediary device from a randomly generated set of symbols. The second intermediate set of symbols may be calculated based on discarding all the symbols from the second set of symbols transmitted over the second quantum channel except those symbols that were successfully or validly received by the second device.

In step 206, sending, to one or more of the second device and/or first device, a third intermediate set of symbols based on cryptographically combining the first and second intermediate sets of symbols. For example, the third intermediate set of symbols may be calculated by performing an exclusive OR (XOR) type operation between the first and second intermediate sets of symbols. In another example, the third intermediate set of symbols may be calculated by performing an one-time-pad (OTP) type operation between the first and second intermediate sets of symbols.

Thus, based on the exchanged first and second key information exchanged with the intermediary device, the first and second devices securely exchange at least first and second transmitting/receiving basis information with each other for determining a final shared key based on the first set of symbols, the second set of symbols (or received second set of symbols) and the third intermediate set of symbols.

Figure 2B:
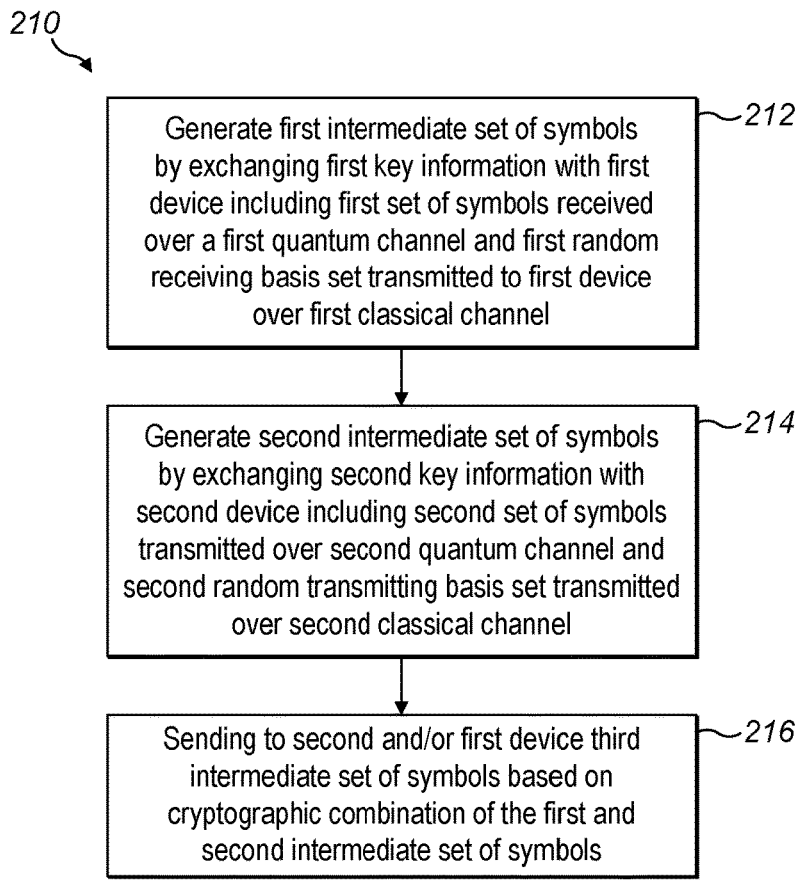
FIG. 2b is a flow diagram illustrating another example key exchange process performed by an intermediary device according to the invention.

FIG. 2b is a flow diagram illustrating an example key exchange process 210 further modifying the steps performed by the intermediary device for performing the key exchange process/protocol 200 as described with reference to FIG. 2a when exchanging a shared key between a first device and second device according to the invention. The key exchange process 210 is based on the key exchange process performed by the key exchange system 100 of FIG. 1 and the key exchange process 200 performed by the intermediary device of FIG. 2a. The key exchange process 200 is performed by the intermediary device and enables shared key exchange between the first device and the second device. In this example, the intermediary device is at least connected to the first device via a first quantum channel. The intermediary device is also connected to the first device via a first communication channel, which may be a non-quantum or classical communication channel. The intermediary device is at least connected to the second device via a second quantum channel. The intermediary device is also connected to the second device via a second communication channel, which may be a non-quantum or classical communication channel. The intermediary device includes a quantum receiver for receiving quantum transmissions over the first quantum channel and a quantum transmitter for transmitting quantum transmissions over the second quantum channel. The intermediary device also includes a classical transceiver for transmitting/receiving non-quantum transmissions or classical transmissions over the first and second communication channels. The first device includes a quantum transmitter for transmitting quantum information over the first quantum channel and the second device includes a quantum receiver for receiving quantum information over second quantum channels. The key exchange process 210 performed by the intermediary device includes the following steps of:

In step 212, generating a first intermediate set of symbols further including exchanging first key information with the first device, the first key information including data representative of the first set of symbols sent from the first device over the first quantum channel and a first receiving random basis set used by the intermediary device when receiving said first set of symbols. The first receiving random basis set is transmitted to the first device over a first communication channel. Additionally, or as an option, generating the first intermediate set of symbols may be based on discarding all the received first set of symbols except those symbols of the first set of symbols with symbol positions from the received first set of symbols that were successfully or validly received by the intermediary device over the first quantum channel.

In step 214, generating a second intermediate set of symbols further including exchanging second key information with the second device, the second key information including data representative of the second set of symbols sent from the intermediary device over the second quantum channel and second transmitting random basis set used by the intermediary device when transmitting said second set of symbols. The second transmitting random basis set is transmitted to the second device over a second communication channel.

Additionally, or as an option, generating the second intermediate set of symbols may be based on discarding all the second set of symbols except those symbols of the second set of symbols with symbol positions from the second set of symbols that were successfully or validly received by the second device over the second quantum channel. For example, the third intermediate set of symbols may be generated based on combining the first and second intermediate sets of symbols by cryptographically combining the first and second intermediate sets of symbols together, and then sending the third intermediate set of symbols to the second device over the second communication channel. The second device decrypts the encrypted third intermediate set of symbols to retrieve the first intermediate set of symbols, where decrypting the third intermediate set of symbols is based on the second device deriving the second intermediate set of symbols based on the second transmitting and receiving basis sets and the received second set of symbols transmitted from the intermediary device. Alternatively, the first device decrypts the encrypted third intermediate set of symbols to retrieve the second intermediate set of symbols, where decrypting the third intermediate set of symbols is based on the first device deriving the first intermediate set of symbols based on the first receiving basis set and the first set of symbols transmitted to the intermediary device.

In another example, the third intermediate set of symbols may be generated based on one or more operations from the group of: generating the third intermediate set of symbols based on performing an XOR-type operation on the first intermediate set of symbols and the second intermediate set of symbols; generating the third intermediate set of symbols based on performing one time pad encryption operation(s) using data representative of, at least in part, the first intermediate set of symbols and the second intermediate set of symbols; and/or generating the third intermediate set of symbols based on performing any other type of reversible operation for obfuscating the first intermediate set of symbols with the second intermediate set of symbols. The second device decrypts the encrypted third intermediate set of symbols by performing the reciprocal XOR-type, OTP-type and other cryptographic operations performed by the intermediary device to retrieve the first intermediate set of symbols, where decrypting the third intermediate set of symbols is based on the second device deriving the second intermediate set of symbols based on the second receiving anmd transmitting basis set and the received second set of symbols transmitted from the intermediary device. Alternatively, the first device decrypts the encrypted third intermediate set of symbols performing the reciprocal XOR-type, OTP-type and other cryptographic operations performed by the intermediary device to retrieve the second intermediate set of symbols, where decrypting the third intermediate set of symbols is based on the first device deriving the first intermediate set of symbols based on the first receiving basis set and the first set of symbols transmitted to the intermediary device.

In step 216, sending, to one or more of the first device and/or second device over the corresponding communication channel(s), a third intermediate set of symbols based on cryptographically combining the first and second intermediate sets of symbols. For example, the third intermediate set of symbols may be calculated by performing an exclusive OR (XOR) type operation between the first and second intermediate sets of symbols. In another example, the third intermediate set of symbols may be calculated by performing an one-time-pad (OTP) type operation between the first and second intermediate sets of symbols.

Once the first and second devices have performed the exchange of first key information and second key information with the intermediary device, the first and second devices may securely exchange the first and second transmitting basis information and first and second receiving basis information with each other over a third communication channel therebetween. The first and second devices may securely communicate over the third communication channel using previously shared keys and/or cryptographic solutions such that the intermediary device is unable to intercept and/or decrypt the secure communications between the first and second devices. The third communication channel may be a non-quantum or classical channel. For added security, the third communication channel is a separate channel that bypasses the intermediary device minimising the risk the intermediary device will intercept and attempt to decrypt the secure communications thereon. The first and second devices further use the third communication channel for determining the final shared key based on the first set of symbols, the second set of symbols/received second set of symbols and the third intermediate set of symbols.

Figure 2C:
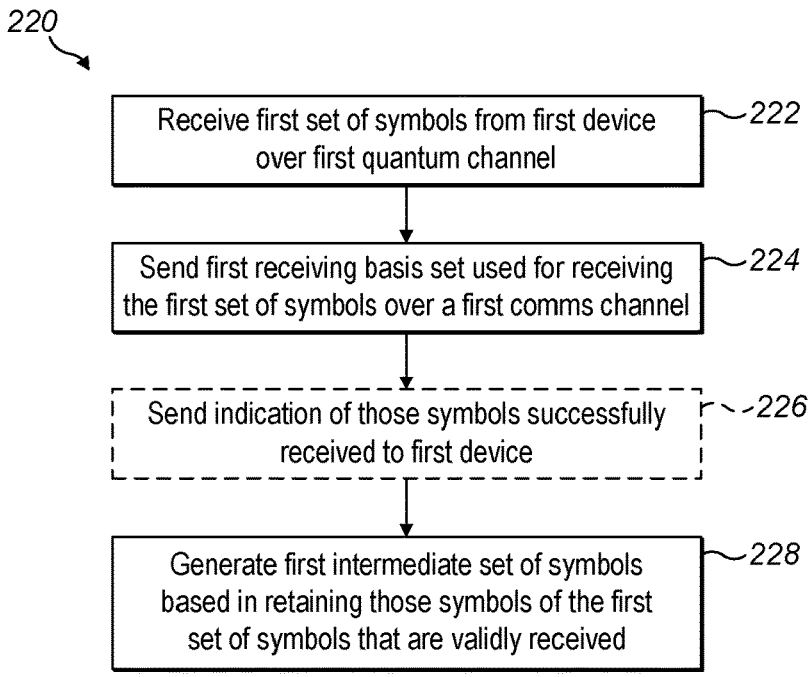
FIG. 2c is a flow diagram illustrating an example first key information exchange process performed by an intermediary device according to the invention.

FIG. 2c is a flow diagram illustrating an example first key information exchange process 220 for further modifying steps 202 and 212 of key exchange processes 200 and 210 performed by the intermediary device of FIGS. 2a and 2b. The first key information exchange process 220 includes the following steps of:

In step 222, receiving, by the intermediary device, the first set of symbols over the first quantum channel transmitted by the first device. Each symbol of the first set of symbols being received using a basis state randomly selected from a set of bases, which forms the first receiving random basis set.

In step 224, transmitting, by the intermediary device to the first device, the first receiving random basis set over a first communication channel. The first receiving random basis set including data representative of the randomly selected bases used to receive each symbol of the first set of symbols.

In step 226, as an option transmitting to the first device, over the first communication channel, data representative of the symbol positions of the symbols in the first set of symbols received over the first quantum channel that were successfully or validly received by the intermediary device.

In step 228, generating, at the intermediary device, first intermediate set of symbols based on retaining those symbols of the first set of symbols that are successfully and/or validly received over the first quantum channel.

Once this first key information has been exchanged, the first device may be able to derive the first intermediate set of symbols based on the first set of symbols, the first receiving random basis set used by the intermediary device to receive the first set of symbols over the quantum channel, and the indication of the symbol/bit positions of the symbols/bits in the first set of symbols received over the first quantum channel that were successfully or validly received by the intermediary device. Once this is derived, if the first device receives the third intermediate set of symbols from steps 206 or 216 of processes 200 and 210, then the first device may retrieve the second intermediate set of symbols from the received third intermediate set of symbols by performing reciprocal cryptographic combining operations, used by the intermediary device to generate the third intermediate set of symbols, using the derived first intermediate set of symbols.

Figure 2D:
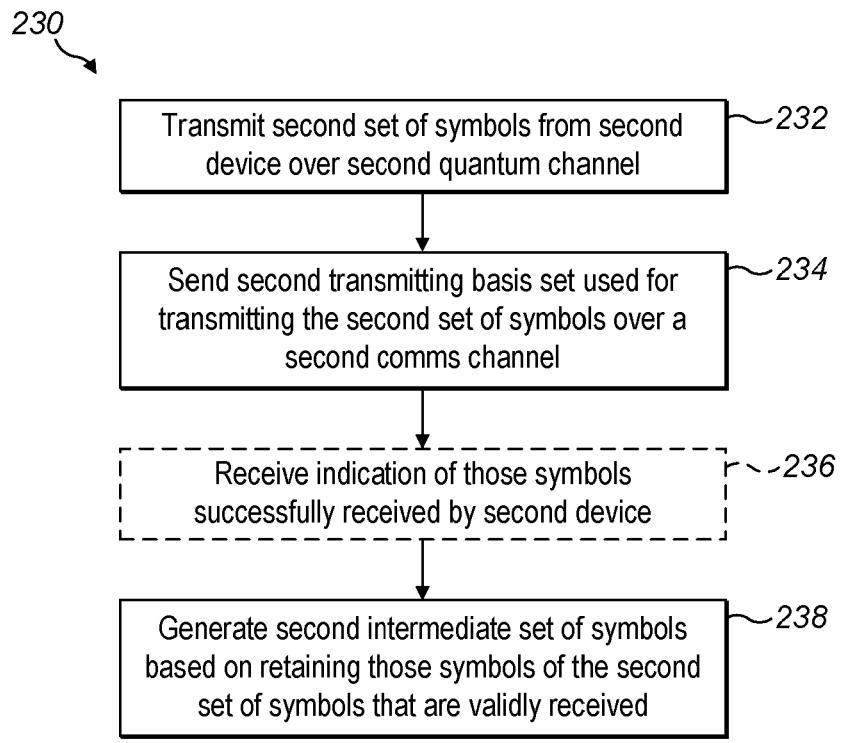
FIG. 2d is a flow diagram illustrating an example second key information exchange process performed by an intermediary device according to the invention.

FIG. 2d is a flow diagram illustrating an example second key information exchange process 230 for further modifying steps 204 and/or 214 of key exchange processes 200 and 210 performed by the intermediary device of FIGS. 2a and 2b. The second key information exchange process 230 includes the following steps of:

In step 232, transmitting, by the intermediary device, the second set of symbols over the second quantum channel for receiving by the second device. Each symbol of the second set of symbols transmitted using a basis state randomly selected from the set of bases to form a second transmitting random basis set.

In step 234, transmitting, by the intermediary device to the second device, the second transmitting random basis set over a second communication channel. The second transmitting random basis set including data representative of the randomly selected bases used to transmit each symbol of the second set of symbols.

In step 236, as an option receiving, by the intermediary device from the second device over the second communication channel, data representative of the symbol positions of the symbols in the second set of symbols received over the second quantum channel that were successfully or validly received by the second device.

In step 238, generating, at the intermediary device, second intermediate set of symbols based on retaining those symbols of the second set of symbols that are successfully and/or validly received by the second device over the second quantum channel.

Once this second key information has been exchanged, the second device may be able to derive the second intermediate set of symbols based on the received second set of symbols, the second transmitting random basis set used by the intermediary device to transmit the second set of symbols over the quantum channel, the second receiving random basis set used by the second device to receive the second set of symbols over the quantum channel, and the indication of the symbol/bit positions of the symbols/bits in the second set of symbols received over the second quantum channel that were successfully or validly received by the second device. Once this is derived, if the second device receives the third intermediate set of symbols from steps 206 or 216 of processes 200 and 210, then the second device may retrieve the first intermediate set of symbols from the received third intermediate set of symbols by performing reciprocal cryptographic combining operations, used by the intermediary device to generate the third intermediate set of symbols, using the derived second intermediate set of symbols.

Once the first device and second device have exchanged the first and second key information with the intermediary device in first and second key information exchange processes 220 and 230, the first device may securely exchange with the second device over the third communication channel data representative of first basis information based on the first random transmitting basis set, the first random transmitting basis set used by the first device to transmit the first set of symbols over the first quantum channel. The second device may also securely exchange with the first device over the third communication channel data representative of second basis information based on the second random transmitting basis set, the second random receiving basis set used by the second device to receive the second set of symbols over the second quantum channel. Furthermore, the first basis information may also include the first random receiving basis set used by the intermediary device for receiving the first set of symbols transmitted by the first device over the first quantum channel. As well, the second basis information may also include the second random transmitting basis set used by the intermediary device for transmitting the second set of symbols received by the second device over the second quantum channel.

Thus, in effect, as the first and second devices have the first and second basis information, and as the first and/or second devices also have the first and/or second intermediate set of symbols generated by the intermediary device from the received first set of symbols and the transmitted second sets of symbols, respectively, then the first and second devices may perform a reconciliation process using this data over the third communication channel to derive and/or agree on a final shared key there between.

The reconciliation process may include: a) performing symbol/bit sifting of the first and second sets of symbols in respect of the first and/or second intermediate sets of symbols derived at the first and/or second devices from the third intermediate set of symbols from which the first and second devices form first and second shared keys; b) performing error correction and/or privacy amplification on the first and second shared keys to agree upon a final set of symbols that are used to form the final shared key therebetween. Thus, the first and second devices use the third communication channel for determining the final shared key based on the first and second key information, the first set of symbols and/or the second set of symbols and the third intermediate set of symbols, which includes the first and second intermediate sets of symbols.

Figure 3A:
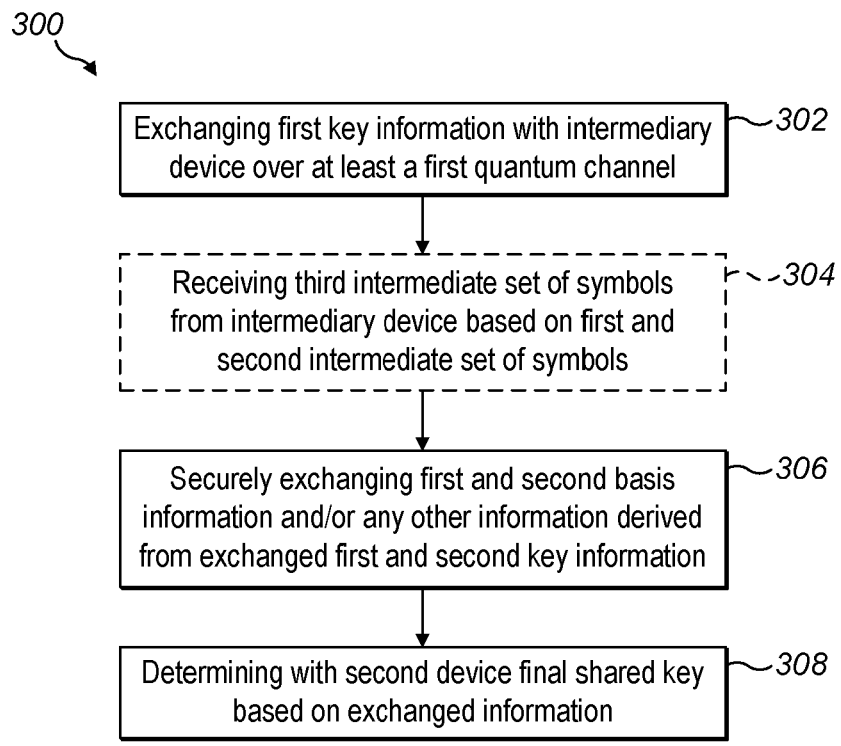
FIG. 3a is a flow diagram illustrating an example key exchange process performed by a first device according to the invention.

FIG. 3a is a flow diagram illustrating an example key exchange process 300 describing the steps performed by the first device for performing the key exchange process/protocol 100 as described with reference to FIG. 1 for exchanging a shared key between the first device and a second device whilst using an intermediary device according to the invention. The key exchange process 300 is based on the key exchange process performed by the key exchange system 100 of FIG. 1, but is from the point of view of the first device. The key exchange process 300 is performed by the first device and enables shared key exchange between the first device and the second device via the intermediary device. In this example, the first device is at least connected to the intermediary device via a first quantum channel. The second device is at least connected to the intermediary device via a second quantum channel. The intermediary device includes a quantum receiver for receiving quantum transmissions over the first quantum channel from the first device and a quantum transmitter for transmitting quantum transmissions over the second quantum channel to the second device. The first device includes a quantum transmitter for transmitting quantum information over the first quantum channel to the intermediary device. The second device includes a quantum receiver for transmitting quantum information over second quantum channel to the intermediary device. The key exchange process 300 performed by the first device includes the following steps of:

In step 302, exchanging first key information with the intermediary device to enable the intermediary device to generate a first intermediate set of symbols. The first key information including data representative of a first set of symbols transmitted from the first device over the first quantum channel to the intermediary device. However, the first device withholds from the intermediary device a first transmitting random basis set used by the first device for transmitting said first set of symbols over said first quantum channel. That is, the first device does not transmit or send the first transmitting random basis set to the intermediary device. The first set of symbols may be retrieved by the first device from a randomly generated set of symbols. The intermediary device may calculate/generate the first intermediate set of symbols based on discarding all the symbols from the first set of symbols received over the first quantum channel except those symbols that were successfully or validly received by the intermediary device.

Furthermore, the second device exchanges second key information with the intermediary device enable the intermediary device to generate a second intermediate set of symbols. The second key information including data representative of a second set of symbols transmitted to the second device over the second quantum channel. However, the second device also withholds from the intermediary device a second receiving random basis set used by the second device when receiving said second set of symbols over said second quantum channel. That is, the second device does not transmit or send the second receiving random basis set to the intermediary device. The second set of symbols may be retrieved by the intermediary device from a randomly generated set of symbols. The second intermediate set of symbols may be calculated based on discarding all the symbols from the second set of symbols transmitted over the second quantum channel except those symbols that were successfully or validly received by the second device.

In step 304, as an option, receiving from the intermediary device, a third intermediate set of symbols based on the intermediary device cryptographically combining the first and second intermediate sets of symbols. For example, the third intermediate set of symbols may be calculated by performing an exclusive OR (XOR) type operation between the first and second intermediate sets of symbols. In another example, the third intermediate set of symbols may be calculated by performing an one-time-pad (OTP) type operation between the first and second intermediate sets of symbols. The first device may decrypt the encrypted third intermediate set of symbols to retrieve the second intermediate set of symbols, where decrypting the third intermediate set of symbols is based on the first device deriving the first intermediate set of symbols based on the first receiving basis set and the first set of symbols transmitted to the intermediary device.

In step 306, securely exchanging with the second device at least first and second transmitting basis information and/or any other information derived from the exchanged first and second key information exchanged with the intermediary device. As well, depending on whether the first and second devices received the third intermediate set of symbols, there may be an agreement on whether the final key should be based on the first set of symbols, the second set of symbols or both first and second sets of symbols. For example, if the first device only received the third intermediate set of symbols, then the final shared key may be based on symbols chosen from the second set of symbols. For example, if the second device only received the third intermediate set of symbols, then the final shared key may be based on symbols chosen from the first set of symbols. For example, if the first and second devices received the third intermediate set of symbols, then the final shared key may be based on symbols chosen from either: a) the first set of symbols; b) the second set of symbols/the received second set of symbols; or c) both the first and second sets of symbols.

In step 308, determining with the second device a final shared key based on the exchanged information including first set of symbols, the second set of symbols/received second set of symbols and/or the third intermediate set of symbols.

Steps 306 and/or 308 may include the first and second devices agreeing on whether the final shared key is based on symbols from the first set of symbols, second set of symbols or both first and second sets of symbols depending on which of the first and second devices received the third intermediate set of symbols. Alternatively, as an example, this agreement may be pre-determined by the key exchange protocol version or type where the intermediary device may instead be directed, based on the key exchange protocol version/type, to send the third intermediate set of symbols always to the second device, or always to the first device, or both. Alternatively or additionally, as an example, the first and/or second devices may agree prior to performing the key exchange protocol on which of the first and second devices are to receive the third intermediate set of symbols, and thus can select appropriately from the first and/or second sets of symbols for determining the final shared key. Alternatively, the intermediary device may actually select or chose which of the first and second devices will receive the third intermediate set of symbols.

Figure 3B:
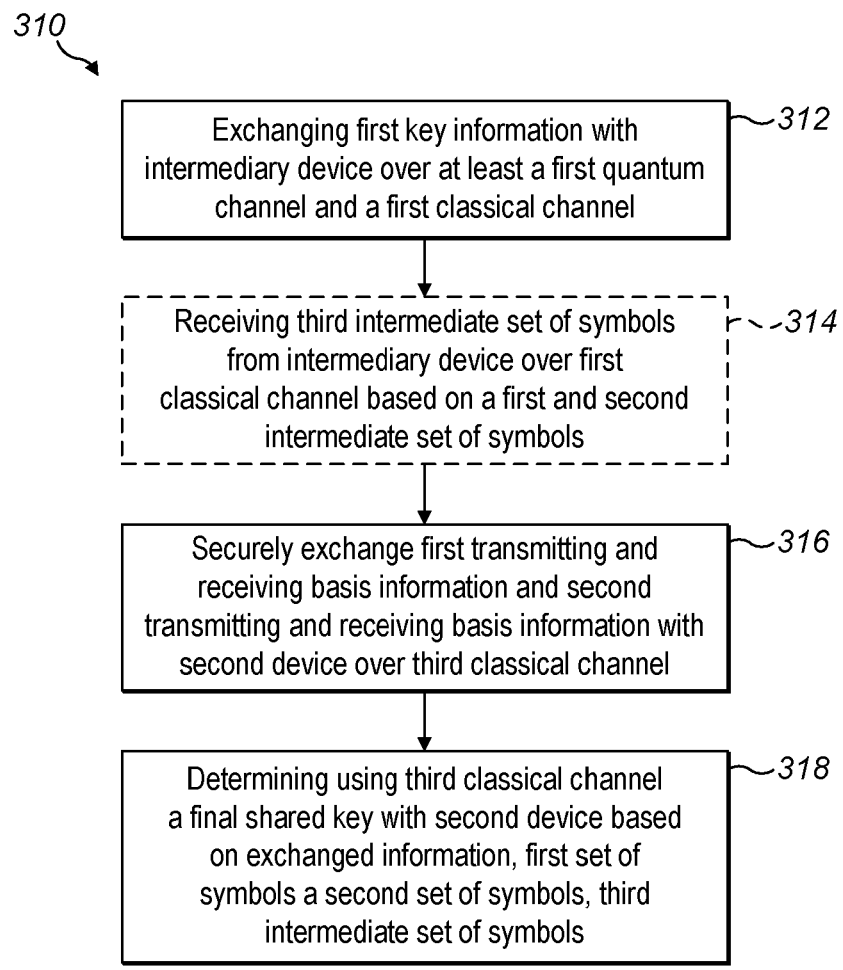
FIG. 3b is a flow diagram illustrating another example key exchange process performed by a first device according to the invention.

FIG. 3b is a flow diagram illustrating an example key exchange process 310 further modifying the steps performed by the first device for performing the key exchange process/protocol 300 as described with reference to FIG. 3a when exchanging a shared key between the first device and a second device according to the invention. The key exchange process 310 is based on the key exchange process performed by the key exchange system 100 of FIG. 1, key exchange process(es) 200/300 performed by the intermediary device of FIG. 2a and first device of FIG. 3a. The key exchange process 310 is performed by the first device with the intermediary device and second device and enables a shared key to be exchanged between the first device and the second device, where the intermediary device may be an untrusted device. In this example, the first device is at least connected to the intermediary device via a first quantum channel. The intermediary device is also connected to the first device via a first communication channel, which may be a non-quantum or classical communication channel. The intermediary device is at least connected to the second device via a second quantum channel. The intermediary device is also connected to the second device via a second communication channel, which may be a non-quantum or classical communication channel. The first device and second device may be connected together via a third communication channel, e.g. a non-quantum or classical communication channel. The intermediary device includes a quantum receiver for receiving quantum transmissions over the first quantum channel and quantum transmitter for transmitting quantum transmissions over the second quantum channel. The intermediary device also includes a classical transceiver for transmitting/receiving non-quantum transmissions or classical transmissions over the first and second communication channels to first and second devices, respectively. The first device includes a quantum transmitter for transmitting quantum information over the first quantum channel to the intermediary device. The second device includes a quantum receiver for receiving quantum information over second quantum channel to the intermediary device. The key exchange process 310 performed by the first device includes the following steps of:

In step 312, exchanging first key information with the intermediary device to enable the intermediary device to generate a first intermediate set of symbols, the first key information including data representative of a first set of symbols sent from the first device over the first quantum channel to the intermediary device and a first receiving random basis set used by the intermediary device when receiving said first set of symbols. The first receiving random basis set is transmitted to the first device over the first communication channel. Additionally, or as an option, the intermediary device generates the first intermediate set of symbols based on discarding all the received first set of symbols except those symbols of the first set of symbols with symbol positions from the received first set of symbols that were successfully or validly received by the intermediary device over the first quantum channel.

The second device also performs an exchange of second key information with the intermediary device that enables the intermediary device to generate a second intermediate set of symbols. The second key information including data representative of the second set of symbols transmitted to the second device over the second quantum channel and second transmitting random basis set used by the intermediary device when transmitting said second set of symbols. The second transmitting random basis set is transmitted to the second device over a second communication channel.

Additionally, or as an option, the intermediary device may generate the second intermediate set of symbols based on discarding all the transmitted second set of symbols except those symbols of the second set of symbols with symbol positions from the transmitted second set of symbols that were successfully or validly received by the second device over the second quantum channel. For example, a third intermediate set of symbols may be generated based on combining the first and second intermediate sets of symbols by cryptographically combining the first and second intermediate sets of symbols together, and then sending the third intermediate set of symbols to the second device over the second communication channel. The second device decrypts the encrypted third intermediate set of symbols to retrieve the first intermediate set of symbols, where decrypting the third intermediate set of symbols is based on the second device deriving the second intermediate set of symbols based on the second receiving basis set, second transmitting basis set and the received second set of symbols received from the intermediary device.

In another example, the third intermediate set of symbols may be generated based on one or more operations from the group of: generating the third intermediate set of symbols based on performing an XOR-type operation on the first intermediate set of symbols and the second intermediate set of symbols; generating the third intermediate set of symbols based on performing one time pad encryption operation(s) using data representative of, at least in part, the first intermediate set of symbols and the second intermediate set of symbols; and/or generating the third intermediate set of symbols based on performing any other type of reversible operation for obfuscating the first intermediate set of symbols with the second intermediate set of symbols. The second device decrypts the encrypted third intermediate set of symbols by performing the reciprocal XOR-type, OTP-type and other cryptographic operations performed by the intermediary device to retrieve the first intermediate set of symbols, where decrypting the third intermediate set of symbols is based on the second device deriving the second intermediate set of symbols based on the second receiving basis set, the second transmitting basis set and the received second set of symbols received from the intermediary device. Alternatively, the first device decrypts the encrypted third intermediate set of symbols performing the reciprocal XOR-type, OTP-type and other cryptographic operations performed by the intermediary device to retrieve the second intermediate set of symbols, where decrypting the third intermediate set of symbols is based on the first device deriving the first intermediate set of symbols based on the first receiving basis set and the first set of symbols transmitted to the intermediary device.

In step 314, as an option, receiving from the intermediary device over the first communication channel, a third intermediate set of symbols based on cryptographically combining the first and second intermediate sets of symbols. For example, the third intermediate set of symbols may be calculated by performing an exclusive OR (XOR) type operation between the first and second intermediate sets of symbols. In another example, the third intermediate set of symbols may be calculated by performing an one-time-pad (OTP) type operation between the first and second intermediate sets of symbols. If the third intermediate set of symbols is received by the first device, then the first device may decrypt the encrypted third intermediate set of symbols to retrieve the second intermediate set of symbols, where decrypting the third intermediate set of symbols is based on the first device deriving the first intermediate set of symbols based on the first receiving basis set and the first set of symbols transmitted to the intermediary device.

In step 316, securely exchanging over a third communication channel with the second device at least first and second transmitting basis information and/or first and second receiving basis information and/or any other information derived from the exchanged first and second key information exchanged with the intermediary device.

The first and second devices may securely communicate over the third communication channel using previously shared keys and/or cryptographic solutions such that the intermediary device is unable to intercept and/or decrypt the secure communications between the first and second devices. The third communication channel may be a non-quantum or classical channel. For added security, the third communication channel is a separate channel that bypasses the intermediary device minimising the risk the intermediary device will intercept and attempt to decrypt the secure communications thereon.

As well, depending on whether the first and second devices received the third intermediate set of symbols, there may be an agreement on whether the final key should be based on the first set of symbols, the second set of symbols (e.g. the received second set of symbols) or both first and second sets of symbols (e.g. the received second set of symbols). For example, if the first device only received the third intermediate set of symbols, then the final shared key may be based on symbols chosen from the received second set of symbols by the second device. For example, if the second device only received the third intermediate set of symbols, then the final shared key may be based on symbols chosen from the first set of symbols transmitted by the first device. For example, if the first and second devices received the third intermediate set of symbols, then the final shared key may be based on symbols chosen from either: a) the first set of symbols; b) the second set of symbols (e.g. received second set of symbols); or c) both the first and second sets of symbols (e.g. received second set of symbols).

In step 318, determining over the third communication channel with the second device a final shared key based on the exchanged information including first set of symbols, the second set of symbols (received second set of symbols) and/or the third intermediate set of symbols.

As described with steps 306 and 308 of process 300, steps 316 and/or 318 may include the first and second devices agreeing on whether the final shared key is based on symbols from the first set of symbols, second set of symbols (received second set of symbols) or both first and second sets of symbols (e.g. the received second set of symbols) depending on which of the first and second devices received the third intermediate set of symbols. The other options of selecting which of the first and/or second sets of symbols to based the final shared key on may also be used as described in relation to steps 306 and 308 with respect to FIG. 3a.

Figure 3C:
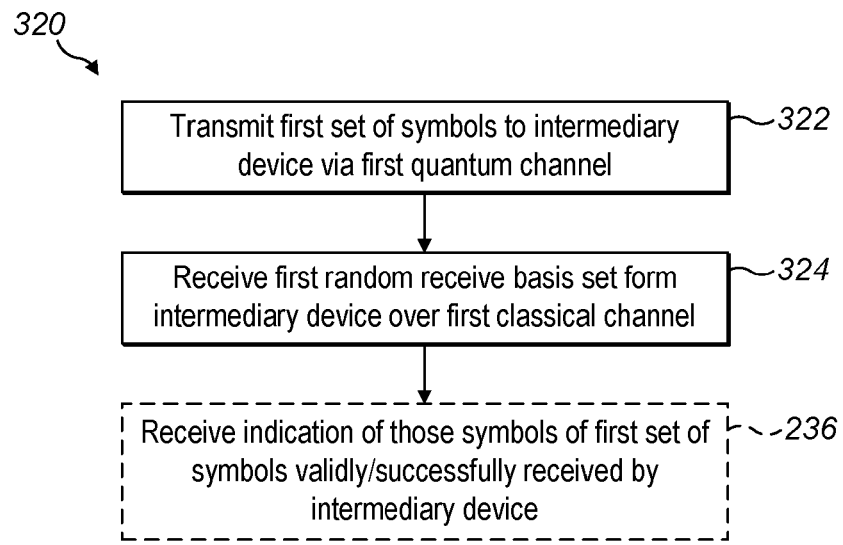
FIG. 3c is a flow diagram illustrating an example first key information exchange process performed between a first device and an intermediary device according to the invention.

FIG. 3c is a flow diagram illustrating an example first key information exchange process 320 for further modifying steps 302 and 312 of key exchange processes 300 and 310 performed by the first device of FIGS. 3a and 3b. The first key information exchange process 320 includes the following steps of:

In step 322, transmitting, by the first device, the first set of symbols over the first quantum channel to the intermediary device. Each symbol of the first set of symbols being transmitted using a basis state randomly selected from a set of bases, which forms the first transmitting random basis set. For each symbol of the first set of symbols being received, the intermediary device also uses a basis state randomly selected from a set of bases, which forms the first receiving random basis set.

In step 324, receiving, from the intermediary device over the first communication channel, the first receiving random basis set. The first receiving random basis set including data representative of the randomly selected bases used to receive each symbol of the first set of symbols. This may be used by the first device to derive the first intermediate set of symbols that is generated at the intermediary device from the received first set of symbols using the first random receiving basis set, and thus, if the third intermediate set of symbols is received by the first device, it may decrypt the third intermediate set of symbols using the first intermediate set of symbols to retrieve the second intermediate set of symbols therefrom.

In step 326, as an option receiving at the first device from the intermediary device, over the first communication channel, data representative of an indication of the symbol/bit positions of the symbols/bits in the first set of symbols received over the first quantum channel that were successfully or validly received by the intermediary device. This may also be used by the first device to further refine the derivation of the first intermediate set of symbols that is generated at the intermediary device from the successfully received symbols of the first set of symbols using the first random receiving basis set. Thus, if the third intermediate set of symbols is received by the first device, it may decrypt the third intermediate set of symbols using the first intermediate set of symbols to retrieve the second intermediate set of symbols therefrom.

Once the first device and second device have exchanged the first and second key information with the intermediary device in first and second key information exchange processes 320 and 420, the first device may securely exchange with the second device over the third communication channel data representative of first basis information based on the first random transmitting basis set, the first random transmitting basis set used by the first device to transmit the first set of symbols over the first quantum channel. The second device may also securely exchange with the first device over the third communication channel data representative of second basis information based on the second random receiving basis set, the second random receiving basis set used by the second device to receive the second set of symbols over the second quantum channel. Furthermore, the first basis information may also include the first random receiving basis set used by the intermediary device for receiving the first set of symbols transmitted by the first device over the first quantum channel. As well, the second basis information may also include the second random transmitting basis set used by the intermediary device for transmitting the second set of symbols to the second device over the second quantum channel.

Thus, in effect, as the first and second devices have the first and second basis information, and as the first and/or second devices also have the first and/or second intermediate set of symbols generated by the intermediary device from the received first and second sets of symbols, respectively, then the first and second devices may perform a reconciliation process using this data over the third communication channel to derive and/or agree on a final shared key there between.

The reconciliation process may include: a) performing symbol/bit sifting of the first and second sets of symbols in respect of the first and/or second intermediate sets of symbols derived at the first and/or second devices from the third intermediate set of symbols from which the first and second devices form first and second shared keys; b) performing error correction and/or privacy amplification on the first and second shared keys to agree upon a final set of symbols that are used to form the final shared key therebetween. Thus, the first and second devices use the third communication channel for determining the final shared key based on the first and second key information, the first set of symbols and/or the second set of symbols and the third intermediate set of symbols, which includes the first and second intermediate sets of symbols.

Figure 4A:
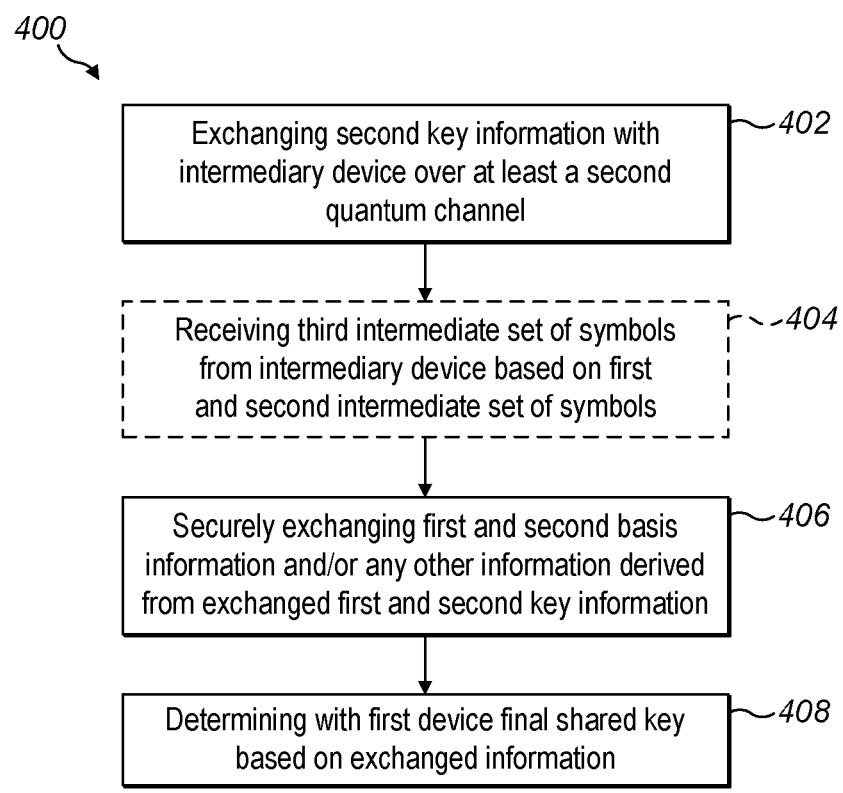
FIG. 4a is a flow diagram illustrating an example key exchange process performed by a second device according to the invention.

FIG. 4a is a flow diagram illustrating an example key exchange process 400 describing the steps performed by the second device for performing the key exchange process/protocol 100 as described with reference to FIG. 1 for exchanging a shared key between the first device and a second device whilst using an intermediary device according to the invention. The key exchange process 400 is based on the key exchange process performed by the key exchange system 100 of FIG. 1, but is from the point of view of the second device. The key exchange process 400 is performed by the second device and enables shared key exchange between the first device and the second device via the intermediary device. In this example, the first device is at least connected to the intermediary device via a first quantum channel. The second device is at least connected to the intermediary device via a second quantum channel. The intermediary device includes a quantum receiver for receiving quantum transmissions over the first quantum channel from the first second and quantum transmitter for transmitting quantum transmissions over the second quantum channel to the second device. The first device includes a quantum transmitter for transmitting quantum information over the first quantum channel to the intermediary device. The second device includes a quantum receiver for receiving quantum information over second quantum channel transmitted from the intermediary device. The key exchange process 400 performed by the second device includes the following steps of:

In step 402, exchanging second key information with the intermediary device to enable the intermediary device to generate a second intermediate set of symbols. The second key information including data representative of a second set of symbols transmitted to the second device on the second quantum channel. However, the second device also withholds from the intermediary device a second receiving random basis set used by the second device when receiving said second set of symbols transmitted over said second quantum channel. That is, the second device does not transmit or send the second receiving random basis set to the intermediary device. The second set of symbols may be retrieved by the intermediary device from a randomly generated set of symbols. The second intermediate set of symbols may be calculated by the intermediary device based on discarding all the symbols from the second set of symbols transmitted over the second quantum channel except those symbols that were successfully or validly received by the second device.

As well, the first device also exchanges first key information with the intermediary device to enable the intermediary device to generate a first intermediate set of symbols. The first key information including data representative of a first set of symbols transmitted from the first device over the first quantum channel to the intermediary device. However, the first device withholds from the intermediary device a first transmitting random basis set used by the first device for transmitting said first set of symbols over said first quantum channel. That is, the first device does not transmit or send the first transmitting random basis set to the intermediary device. The first set of symbols may be retrieved by the first device from a randomly generated set of symbols. The intermediary device may calculate/generate the first intermediate set of symbols based on discarding all the symbols from the first set of symbols received over the first quantum channel except those symbols that were successfully or validly received by the intermediary device.

In step 404, as an option, receiving from the intermediary device, a third intermediate set of symbols based on the intermediary device cryptographically combining the first and second intermediate sets of symbols. For example, the third intermediate set of symbols may be calculated by performing an exclusive OR (XOR) type operation between the first and second intermediate sets of symbols. In another example, the third intermediate set of symbols may be calculated by performing an one-time-pad (OTP) type operation between the first and second intermediate sets of symbols. The second device may decrypt the encrypted third intermediate set of symbols to retrieve the first intermediate set of symbols, where decrypting the third intermediate set of symbols is based on the second device deriving the second intermediate set of symbols based on the second transmitting basis set, the second receiving basis set and the received second set of symbols transmitted from the intermediary device.

In step 406, securely exchanging with the first device at least first and second transmitting basis information and/or any other information derived from the exchanged first and second key information exchanged with the intermediary device. As well, depending on whether or which of the second and first devices received the third intermediate set of symbols, there may be an agreement on whether the final key should be based on the first set of symbols, the second set of symbols (e.g. received second set of symbols) or both first and second sets of symbols (e.g. received second set of symbols). For example, if the second device only received the third intermediate set of symbols, then the final shared key may be based on symbols chosen from the first set of symbols. For example, if the first device only received the third intermediate set of symbols, then the final shared key may be based on symbols chosen from the second set of symbols (e.g. received second set of symbols). For example, if the first and second devices both received the third intermediate set of symbols, then the final shared key may be based on symbols chosen from either: a) the first set of symbols; b) the second set of symbols (e.g. received second set of symbols); or c) both the first and second sets of symbols (e.g. received second set of symbols).

In step 408, determining with the first device a final shared key based on the exchanged information including first set of symbols, the second set of symbols (e.g. received second set of symbols) and/or the third intermediate set of symbols.

Steps 406 and/or 408 may include the first and second devices agreeing on whether the final shared key is based on symbols from the first set of symbols, second set of symbols (e.g. received second set of symbols) or both first and second sets of symbols (e.g. received second set of symbols) depending on which of the first and second devices received the third intermediate set of symbols. Alternatively, as an example, this agreement may be pre-determined by the key exchange protocol version or type where the intermediary device may instead be directed, based on the key exchange protocol version/type, to send the third intermediate set of symbols always to the second device, or always to the first device, or both. Alternatively or additionally, as an example, the first and/or second devices may agree prior to performing the key exchange protocol on which of the first and second devices are to receive the third intermediate set of symbols, and thus can select appropriately from the first and/or second sets of symbols (e.g. received second set of symbols) for determining the final shared key. Alternatively, the intermediary device may actually select or chose which of the first and second devices will receive the third intermediate set of symbols.

Figure 4B:
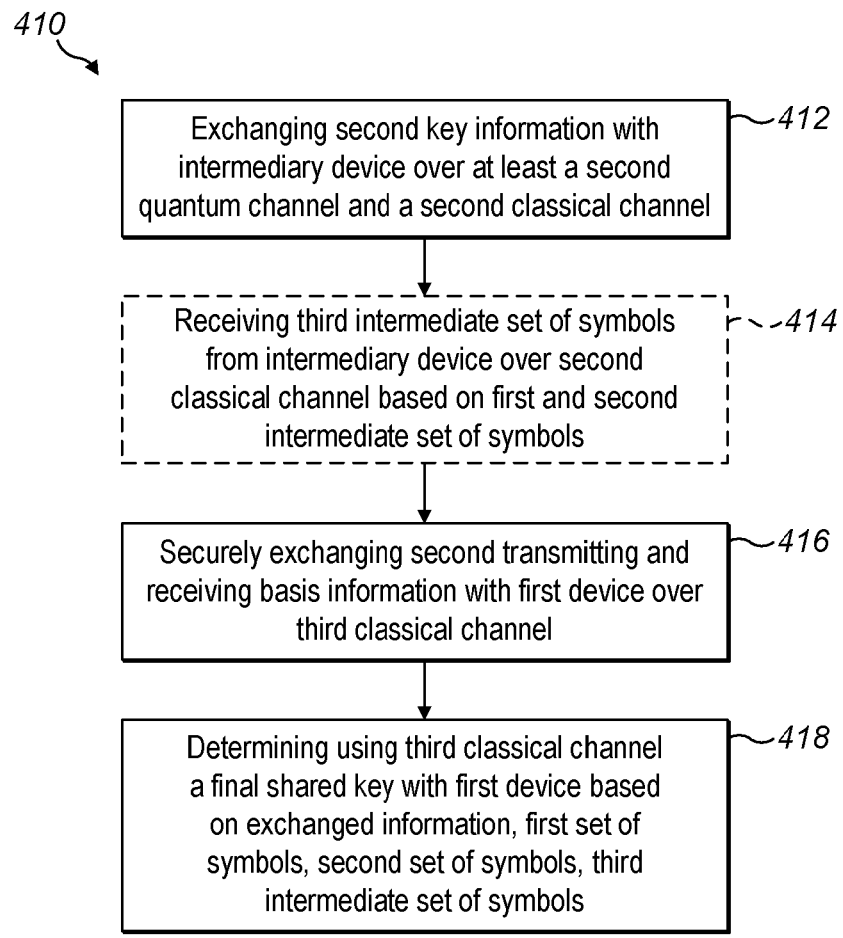
FIG. 4b is a flow diagram illustrating another example key exchange process performed by a second device according to the invention.

FIG. 4*b* is a flow diagram illustrating an example key exchange process 410 further modifying the steps performed by the second device for performing the key exchange process/protocol 400 as described with reference to FIG. 4*a* when exchanging a shared key between the first device and a second device according to the invention. The key exchange process 410 is based on the key exchange process performed by the key exchange system 100 of FIG. 1, key exchange process(es) 200/300/400 performed by the intermediary device of FIG. 2*a*, first device of FIG. 3*a*, and/or second device of FIG. 4*a*. The key exchange process 410 is performed by the second device with the intermediary device and first device and enables a shared key to be exchanged between the first device and the second device, where the intermediary device may be an untrusted device. In this example, the first device is at least connected to the intermediary device via a first quantum channel. The intermediary device is also connected to the first device via a first communication channel, which may be a non-quantum or classical communication channel. The intermediary device is at least connected to the second device via a second quantum channel. The intermediary device is also connected to the second device via a second communication channel, which may be a non-quantum or classical communication channel. The first device and second device may be connected together via a third communication channel, e.g. a non-quantum or classical communication channel. The intermediary device includes a quantum receiver for receiving quantum transmissions over the first quantum channel and a quantum transmitter for transmitting quantum transmissions over the second quantum channel. The intermediary device also includes a classical transceiver for transmitting/receiving non-quantum transmissions or classical transmissions over the first and second communication channels to first and second devices, respectively. The first device includes a quantum transmitter for transmitting quantum information over the first quantum channel to the intermediary device. The second device includes a quantum receiver for receiving quantum information over the second quantum channel from the intermediary device. The key exchange process 410 performed by the second device includes the following steps of:

In step 412, exchanging second key information with the intermediary device that enables the intermediary device to generate a second intermediate set of symbols. The second key information including data representative of the second set of symbols transmitted from the intermediary device over the second quantum channel and second transmitting random basis set used by the intermediary device when transmitting said second set of symbols. The second transmitting random basis set is transmitted to the second device over a second communication channel.

As well, the first device exchanges first key information with the intermediary device to enable the intermediary device to generate a first intermediate set of symbols, the first key information including data representative of a first set of symbols sent from the first device over the first quantum channel to the intermediary device and a first receiving random basis set used by the intermediary device when receiving said first set of symbols. The first receiving random basis set is transmitted to the first device over the first communication channel. Additionally, or as an option, the intermediary device generates the first intermediate set of symbols based on discarding all the received first set of symbols except those symbols of the first set of symbols with symbol positions from the received first set of symbols that were successfully or validly received by the intermediary device over the first quantum channel.

Additionally, or as an option, the intermediary device may generate the second intermediate set of symbols based on discarding all the transmitted second set of symbols except those symbols of the second set of symbols with symbol positions from the received second set of symbols that were successfully or validly received by the second device over the second quantum channel. This may involve the second device sending to the intermediary device over the second communication channel further key information including an indication of the bit/symbol positions of those bit/symbols of the second set of symbols that were validly and/or successfully received by the second device. Failing this, the second intermediate set of symbols may simply be all of the transmitted second set of symbols. For example, a third intermediate set of symbols may be generated based on combining the first and second intermediate sets of symbols by cryptographically combining the first and second intermediate sets of symbols together, and then sending the third intermediate set of symbols to the second device over the second communication channel. As an option, should the third intermediate set of symbols be sent to the second device, the second device decrypts the encrypted third intermediate set of symbols to retrieve the first intermediate set of symbols, where decrypting the third intermediate set of symbols is based on the second device deriving the second intermediate set of symbols based on the second receiving basis set, the second transmitting basis set and the received second set of symbols transmitted from the intermediary device over the second quantum channel.

In another example, the third intermediate set of symbols may be generated based on one or more operations from the group of: generating the third intermediate set of symbols based on performing an XOR-type operation on the first intermediate set of symbols and the second intermediate set of symbols; generating the third intermediate set of symbols based on performing one time pad encryption operation(s) using data representative of, at least in part, the first intermediate set of symbols and the second intermediate set of symbols; and/or generating the third intermediate set of symbols based on performing any other type of reversible operation for obfuscating the first intermediate set of symbols with the second intermediate set of symbols. As an option, should the third intermediate set of symbols be sent to the second device, the second device decrypts the encrypted third intermediate set of symbols by performing the reciprocal XOR-type, OTP-type and other cryptographic operations performed by the intermediary device to retrieve the first intermediate set of symbols, where decrypting the third intermediate set of symbols is based on the second device deriving the second intermediate set of symbols based on the second receiving basis set, the second transmitting basis set and the received second set of symbols transmitted from the intermediary device. Alternatively, as an option, should the third intermediate set of symbols be sent to the first device, the first device decrypts the encrypted third intermediate set of symbols performing the reciprocal XOR-type, OTP-type and other cryptographic operations performed by the intermediary device to retrieve the second intermediate set of symbols, where decrypting the third intermediate set of symbols is based on the first device deriving the first intermediate set of symbols based on the first receiving basis set and the first set of symbols transmitted to the intermediary device.

In step 414, as an option, receiving from the intermediary device over the second communication channel, a third intermediate set of symbols based on cryptographically combining the first and second intermediate sets of symbols. For example, the third intermediate set of symbols may be calculated by performing an exclusive OR (XOR) type operation between the first and second intermediate sets of symbols. In another example, the third intermediate set of symbols may be calculated by performing an one-time-pad (OTP) type operation between the first and second intermediate sets of symbols. If the third intermediate set of symbols is received by the second device, then the second device may decrypt the encrypted third intermediate set of symbols to retrieve the first intermediate set of symbols, where decrypting the third intermediate set of symbols is based on the second device deriving the second intermediate set of symbols based on the second receiving basis set, the second transmitting basis set, and the received second set of symbols transmitted from the intermediary device.

In step 416, securely exchanging over a third communication channel with the first device at least second and first transmitting basis information and/or second and first receiving basis information and/or any other information derived from the exchanged first and second key information exchanged with the intermediary device.

The first and second devices may securely communicate over the third communication channel using previously shared keys and/or cryptographic solutions such that the intermediary device is unable to intercept and/or decrypt the secure communications between the first and second devices. The third communication channel may be a non-quantum or classical channel. For added security, the third communication channel is a separate channel that bypasses the intermediary device minimising the risk the intermediary device will intercept and attempt to decrypt the secure communications thereon.

As well, depending on whether the first and second devices received the third intermediate set of symbols, there may be an agreement on whether the final key should be based on the first set of symbols, the second set of symbols (e.g. received second set of symbols) or both first and second sets of symbols (e.g. received second set of symbols). For example, if the first device only received the third intermediate set of symbols, then the final shared key may be based on symbols chosen from the received second set of symbols that the second device receives, which will include the second set of symbols transmitted from the intermediary device. For example, if the second device only received the third intermediate set of symbols, then the final shared key may be based on symbols chosen from the first set of symbols. For example, if the first and second devices received the third intermediate set of symbols, then the final shared key may be based on symbols chosen from either: a) the first set of symbols; b) the second set of symbols (e.g. received second set of symbols); or c) both the first and second sets of symbols (e.g. received second set of symbols).

In step 418, determining over the third communication channel with the first device a final shared key based on the exchanged information including first set of symbols, the second set of symbols (e.g. received second set of symbols) and/or the third intermediate set of symbols.

As described with steps 406 and 408 of process 400, steps 416 and/or 418 may include the first and second devices agreeing on whether the final shared key is based on symbols from the first set of symbols, second set of symbols (e.g. received second set of symbols) or both first and second sets of symbols (e.g. received second set of symbols) depending on which of the first and second devices received the third intermediate set of symbols. The other options of selecting which of the first and/or second sets of symbols to base the final shared key on may also be used as described in relation to steps 406 and 408 with respect to FIG. 4a.

Figure 4C:
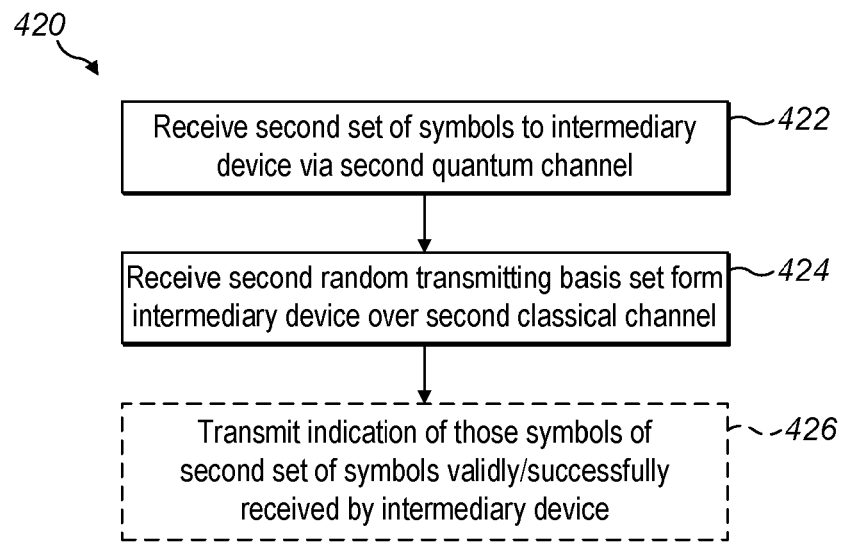
FIG. 4c is a flow diagram illustrating an example second key information exchange process performed between a second device and an intermediary device according to the invention.

FIG. 4c is a flow diagram illustrating an example second key information exchange process 420 for further modifying steps 402 and 412 of key exchange processes 400 and 410 performed by the second device of FIGS. 4a and 4b. The first key information exchange process 420 includes the following steps of:

In step 422, receiving, by the second device, the second set of symbols over the second quantum channel that were transmitted by the intermediary device. Each symbol of the second set of symbols being transmitted by the intermediary device using a basis state randomly selected from a set of bases, which forms the second transmitting random basis set. For each symbol of the second set of symbols being received, the second device also uses a basis state randomly selected from a set of bases, which forms the second receiving random basis set determined by the second device. The second receiving random basis set is withhold from the intermediary device.

In step 424, receiving, from the intermediary device over the second communication channel, the second transmitting random basis set. The second receiving transmitting basis set including data representative of the randomly selected bases used to transmit by the intermediary device each symbol of the second set of symbols. This may be used by the second device to derive the second intermediate set of symbols that is generated at the intermediary device from the transmitted second set of symbols using the second random transmitting basis set, which may simply be all of the second set of symbols. Optionally, the intermediary device may also use further key information from a received indication of bit/symbol positions of the symbols of the second set of symbols that the second device validly or successfully receives over the second quantum channel. Thus, if the third intermediate set of symbols is received by the second device, it may decrypt the third intermediate set of symbols using the derived second intermediate set of symbols to retrieve the first intermediate set of symbols therefrom.

In step 426, as an option transmitting from the second device to the intermediary device, over the second communication channel, data representative of an indication of the symbol/bit positions of the symbols/bits in the second set of symbols received over the second quantum channel that were successfully or validly received by the second device. This may also be used by the intermediary device to further refine the derivation of the second intermediate set of symbols that is generated at the intermediary device from the successfully received symbols of the second set of symbols using the second random transmitting basis set. As well, the second device can derive the second intermediate set of symbols based on the received second set of symbols, the second random transmitting basis (received from the intermediary device), the second random receiving basis (withheld from the intermediary device), and the indication of successfully received symbol/bit positions. Thus, if the third intermediate set of symbols is received by the second device, it may decrypt the third intermediate set of symbols using the derived second intermediate set of symbols to retrieve the first intermediate set of symbols therefrom.

Figure 4D:
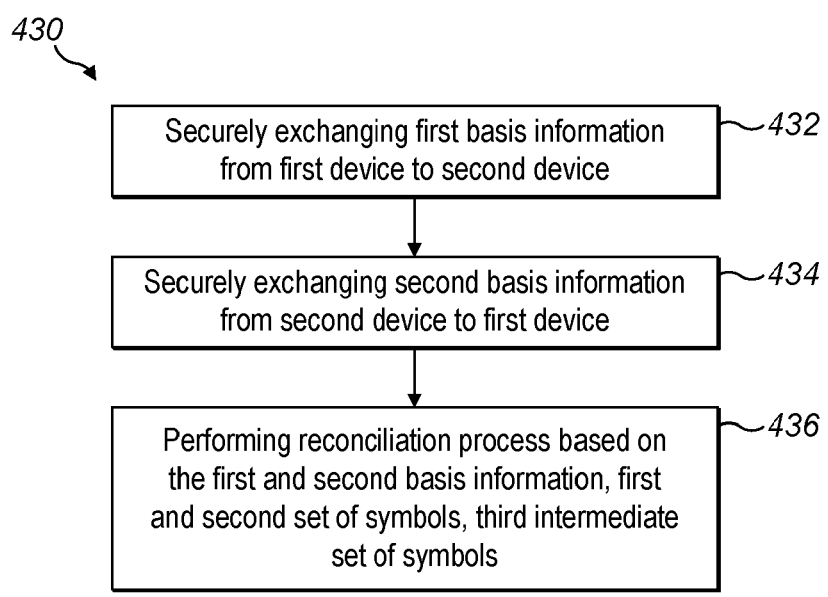
FIG. 4d is a flow diagram illustrating an example key exchange process performed between a second device and a first device according to the invention.

FIG. 4d is another flow diagram illustrating an example final shared key exchange process 430 for further modifying steps 306 and 308 of key exchange process 300, steps 316 and 318 of key exchange process 310, steps 406 and 408 of key exchange process 400, and/or steps 416 and/or 418 of key exchange process 410 for exchanging the necessary information between the first and second devices for determining a final shared key. Once the first device and second device have exchanged the first and second key information with the intermediary device in first and second key information exchange processes 320 and 420, first and second devices may perform a final shared key exchange that includes the exchange of information between the first and second devices may include exchanging basis information and reconciling a final shared key based on the exchanged basis information and/or the first set of symbols, second set of symbols/received second set of symbols, and/or third intermediate sets of symbols. The reconciliation may further include symbol/bit sifting, error detection, and/or privacy amplification on the final shared key symbols determined by each of the first and second devices. The final shared key exchange process 430 includes the following steps of:

In step 432, securely exchanging between the first and second devices over the third communication channel data representative of first basis information based on the first random transmitting basis set used by the first device to transmit the first set of symbols over the first quantum channel. Furthermore, the first basis information may also include the first random receiving basis set used by the intermediary device for receiving the first set of symbols transmitted by the first device over the first quantum channel.

In step 434, securely exchanging between the second device and first device over the third communication channel data representative of second basis information based on the second random receiving basis set used by the second device to receive the second set of symbols over the second quantum channel. As well, the second basis information may also include the second random transmitting basis set used by the intermediary device for transmitting the second set of symbols to the second device over the second quantum channel.

In step 436, performing a reconciliation process for determining a final shared key based on the fact that the first and second devices both now have the first and second basis information, and as the first and/or second devices also have the first and/or second intermediate set of symbols generated by the intermediary device from the received first set of symbols and transmitted second set of symbols, respectively. The reconciliation process uses this data over the third communication channel to derive and/or agree on a final shared key there between. The reconciliation process may include: a) performing symbol/bit sifting of the first and second sets of symbols in respect of the first and/or second intermediate sets of symbols derived at the first and/or second devices from the third intermediate set of symbols from which the first and second devices form first and second shared keys; b) performing error correction and/or privacy amplification on the first and second shared keys to agree upon a final set of symbols that are used to form the final shared key therebetween. Thus, the first and second devices use the third communication channel for determining the final shared key based on the first and second key information, the first set of symbols and/or the second set of symbols and the third intermediate set of symbols, which includes the first and second intermediate sets of symbols.

Figure 5:
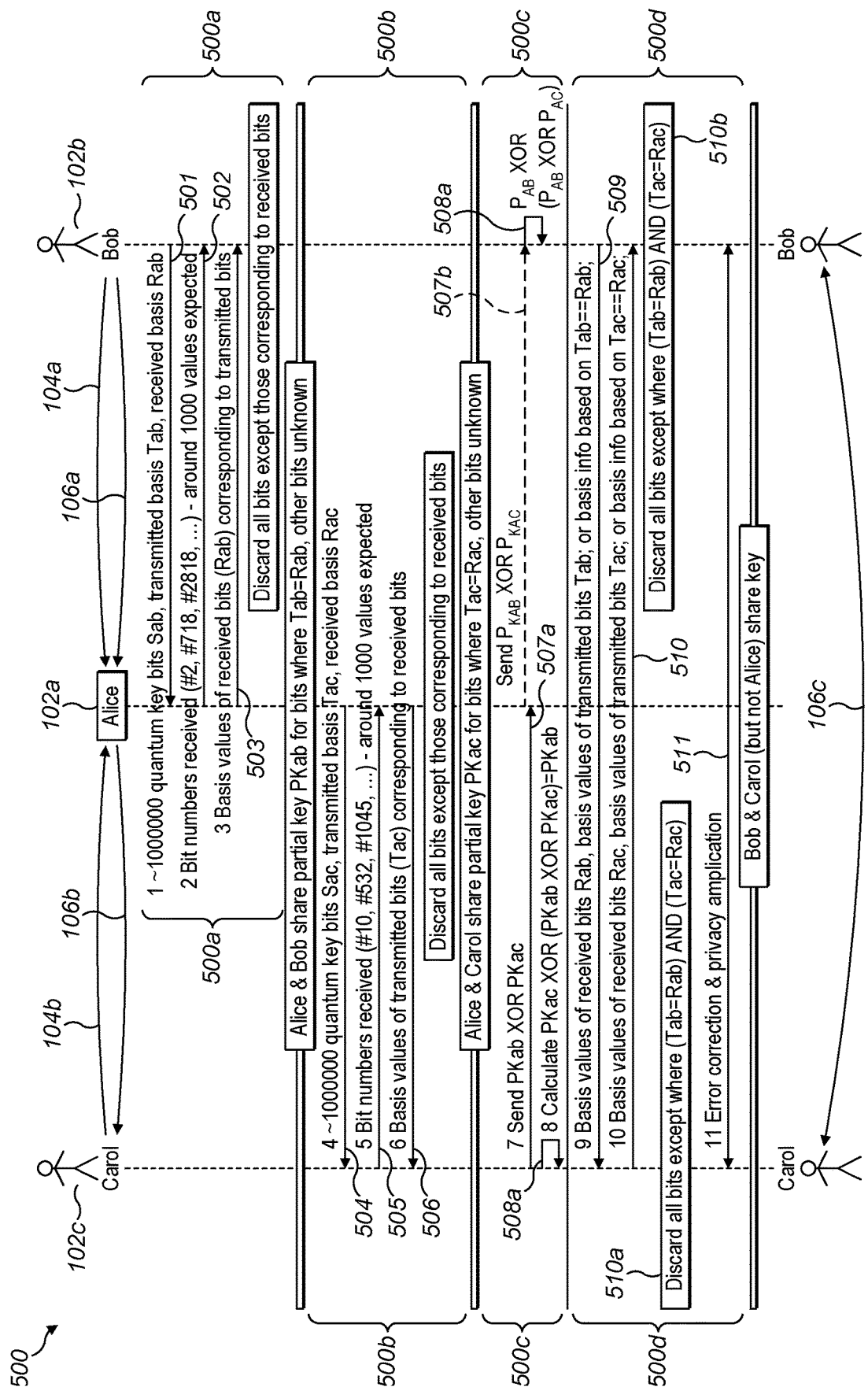
FIG. 5 is a flow diagram illustrating another example key exchange process performed between a second device and a first device using an intermediary device according to the invention.

FIG. 5 is a flow diagram illustrating another example of the key exchange process 500 using a QKD protocol, where the intermediary device 101a (e.g. Alice) may be an untrusted third party and is not able to derive the final shared key between the first and second endpoint devices 102b and 102c (e.g. Bob and Carol). The key exchange process 500 further modifies the key exchange process of QKD system 100 of FIG. 1 and the key exchange process(es) 200, 210, 230, 240, 300, 310, 320 and 400, 410, 420 and 430 of FIGS. 2a to 4d, modifications thereto, combinations thereof, and/or as herein described and/or as the application demands. For simplicity, the reference numerals of FIG. 1 are reused for similar or the same components/features for illustrating the key exchange process 500 of FIG. 5. The steps and/or features of the key exchange process of QKD system 100 of FIG. 1 and the key exchange process(es) 200, 210, 230, 240, 300, 310, 320 and 400, 410, 420 and 430 of FIGS. 2a to 4d may be further modified based on the steps and/or features of the key exchange process 500.

Referring to FIG. 5, in this example, the intermediary device 102a (e.g. Alice) is coupled to the first device (e.g. Bob 102b) via a first quantum channel 104a and a first bidirectional classical channel 106a. The intermediary device 102a has a quantum receiver for receiving quantum transmissions over the first quantum channel 104a. The first quantum channel may be configured to be a uni-directional quantum channel for quantum transmissions from the first device 102b to the intermediary device 102a. The first device 102b (e.g. Bob) has a quantum transmitter for transmitting quantum transmissions over the first quantum channel 104a to the intermediary device 102a. The intermediary device 102a also has a classical transceiver or communication interface for transmitting and/or receiving classical transmissions/communications over the first bidirectional classical channel 106a to/from the first device 102b. Similarly, the first device 102b has a classical transceiver or communication interface for also transmitting and/or receiving classical transmissions/communications over the first classical channel 106a to/from the intermediary device 102a.

Furthermore, the intermediary device 102a is also connected to the second device 102c (e.g. Carol) via a second quantum channel 104b and is configured for transmitting quantum transmissions to the second device 102c over the second quantum channel 104b via a quantum transmitter. The second quantum channel may be configured to be a uni-directional quantum channel for quantum transmissions from the intermediary device 102a to the second device 102b. The second device 102c (e.g. Carol) has a quantum receiver for receiving quantum transmissions over the second quantum channel 104b from the intermediary device 102a. The intermediary device 102a is also connected to the second device 102c (e.g. Carol) via a second bidirectional classical channel 106b and is configured for transmitting and/or receiving classical information over the second bidirectional classical channel 106b to/from the second device 102c. Similarly, the second device 102c has a classical transceiver or communication interface for also transmitting and/or receiving classical transmissions/communications over the second classical channel 106b to/from the intermediary device 102a. In addition, the first and second devices 102b and 102c may be connected with each other via a third classical channel 106c using their respecting classical transceivers/communication interfaces and the like. The first and second devices 102b and 102c may perform secure communications over the third classical channel 106c using encryption, authentication and the like such that the intermediary device 102a does not have access or is unable to eavesdrop or derive what is being transmitted between the first and second devices 102a and 102b and/or vice versa.

The key exchange process 500 may include the following key exchange subprocess(es) 500a, 500b, 500c and 500d. In the first key exchange subprocess 500a, the first device 102a (e.g. Bob) and the intermediary device 102a (e.g. Alice) share a first intermediate set of symbols, also known as a first partial key (e.g. first partial key PKab). In the second key exchange subprocess 500b, the second endpoint device 102c (e.g. Carol) and the intermediary device 102a (e.g. Alice) share a second intermediate set of symbols, also known as a second partial key (e.g. second partial key PKac). In the third key exchange subprocess 500c, the intermediary device 102a shares a third intermediate set of symbols with the second device 102c and/or the first device 102b, where the second device 102c and/or the first device 102b uses the previous exchanged key information with Alice 102a to retrieve the first intermediate set of symbols or the second intermediate set of symbols, respectively, from the third intermediate set of symbols for use in performing the fourth key exchange subprocess 500d. In the fourth key exchange subprocess 500d the first and second devices 102b and 102c (e.g. Bob and Carol), but not the intermediary device 102a (e.g. Alice) agree upon and share a final shared key based on the first set of symbols, the second set of symbols and/or the third intermediate set of symbols (e.g. the first and/or second intermediate set of symbols). The first and second devices 102b and 102c may use encrypted or secure communications therebetween when agreeing upon the shared final key over the third classical channel 106c. The encrypted or secure communications may be based on, without limitation, for example previously shared keys and the like. Thus, the key exchange process 500 includes the following steps from the first key exchange subprocess 500a, second key exchange subprocess 500b and third key exchange subprocess 500c and fourth key exchange subprocess 500d.

The first key exchange subprocess 500a of the key exchange process 500 includes the following steps of: In step 501, the first device 102b sends a first set of symbols (e.g. a random set of symbols or a QKD key and the like), denoted Sab (e.g. 1000000 quantum key bits/symbols, Sab), via its quantum transmitter over the first quantum channel 104a to the intermediary device 102a. The quantum transmitter of the first device 102b uses a first transmitted basis set, Tab, for sending the first set of symbols. The intermediary device 102a receives the quantum transmission of the first set of symbols using a first receiving basis set, Rab. For example, the first device 102b may include a controller that controls the use of a random bit generator at the first device 102b to generate the first set of symbols, which is a first set of random symbols. Alternatively or additionally, the first set of symbols may be based on random stream of symbols or QKD keys stored on the first device 102b for use in the key exchange process 500. Alternatively or additionally, or as an option, the first device 102b may have securely received (e.g. in a quantum-safe manner) one or more random symbols and/or QKD keys for use in performing key exchange protocol/process 500 when it is required to transmit a first set of random symbols or a QKD key (e.g. the first set of symbols) to the intermediary device 102a in step 501.

In step 502, the intermediary device 102a transmits over the first classical channel 106a to the first device 102b an indication of the symbols/bits of the first set of symbols (e.g. symbol/bit numbers received (#2, #718, #2818, . . . )—around 1000 values expected) that were validly received by the quantum receiver of intermediary device 102a using a receiving random basis set. In step 503, the intermediary device 102a sends over the first classical channel 106a a receiving random basis set including the basis values of the received symbols/bits, denoted Rab, that correspond to the received indications of the validly received bits. For example, the intermediary device 102a. It is noted, that the first device 102b does not reveal the first transmitting random basis set, denoted Tab, that is used by the quantum transmitter of the first device 102b to transmit the first set of symbols to the intermediary device 102a over the first quantum channel 104a. That is, the first device 102b withholds from the intermediary device 102a the first transmitted basis, denoted Tab, that is used by the quantum transmitter of the first device 102b to transmit the first set of symbols over the first quantum channel 104a to the intermediary device 102a. This means, at this point, the intermediary device 102a still only knows approximately 50% of the symbols/bits of the first set of symbols transmitted by the first device 102b. This is because the intermediary device 102a does not know the random transmitting basis set (or transmitted basis), Tab, and so has to randomly generate and guess the random receiving basis set, Rab, used for receiving the quantum transmissions of the first set of symbols transmitted from the first device 102b.

Thus, only the first device 102b has knowledge of: a) the first random transmitting basis set (e.g. first transmitted basis), Tab, used by the quantum transmitter of the first device 102b for transmitting the first set of symbols; b) the first random receiving basis set or first receiving basis values used by the quantum receiver of the intermediary device 102a for receiving the symbols/bits of the first set of symbols, which is denoted Rab; and c) the validly received symbols/bits of the first set of symbols received by the intermediary device 102a as indicated by the indication in step 502. The intermediary device 102a only has knowledge of: a) first random receiving basis set or first receiving basis values, Rab, used by the quantum receiver of the intermediary device 102a for receiving the first set of symbols over the first quantum channel 104a; and b) an indication of the validly received symbols/bits of the first set of symbols that were received by the intermediary device 102a.

The intermediary device 102a also determines a first intermediate set of symbols associated with the intermediary device 102a (e.g. first partial key PKab2) by discarding all symbols/bits of the received first set of symbols that were not validly received by the intermediary device 102a and retains only those bits/symbols of the received first set of symbols for those Rab(i) for each i-th validly received symbol/bit of the received first set of symbols by the intermediary device 102a, which is derivable from the indication in step 502. As an option, the first device 102b may also determine a first intermediate set of symbols associated with the first device 102b (e.g. first partial key PKab1) by discarding all symbols/bits of the first set of symbols except those where Tab(i)==Rab(i) for those validly received i-th symbols/bits of the received first set of symbols by the intermediary device 102a. Thus, the intermediary device 102a may only be able to derive or guess correctly approximately 50% of the first intermediate set of symbols associated with the first device 102b (e.g. first partial key PKab1) using the first intermediate set of symbols associated with the intermediary device 102a (first partial key PKab2).

The first key exchange subprocess 500a of key exchange process 500 is repeated but instead with the second device 102c and intermediary device 102a for a second set of symbols in a second key exchange subprocess 500b of the key exchange process 500. That is, the intermediary device 102a may also use a random bit generator (not shown) to generate a second set of symbols. In addition, the sender device/intermediary device 102a also sends the second random transmitting basis set used to transmit the second set of symbols by the quantum transmitter of the intermediary device 102a for transmission of the second random transmitting basis set over a second classical channel 106b to the second device 102c. The second device 102c does not reveal the second random receiving basis set that is used by the second device 102c to receive the second set of symbols transmitted by the intermediary device 102a over the second quantum channel 104b. Thus the transmitted second set of symbols may be referred to as a second partial key. This means the intermediary device 102a only knows approximately 50% of the bits of the second set of symbols that are received by the second device 102c.

For example, the second key exchange subprocess 500b of the key exchange process 500 includes the following steps of: In step 504, the intermediary device 102a sends a second set of symbols, denoted Sac (e.g. 1000000 quantum key bits/symbols, Sac), via the quantum transmitter of the intermediary device 102a over the second quantum channel 104b to the second device 102c using a second random transmitting basis set, Tac. The second device 102c receives the quantum transmission of the second set of symbols via their quantum receiver using a second random receiving basis set, Rac. For example, the intermediary device 102a may use a random bit generator (not shown) to generate the second set of symbols (generated random bit stream) for transmission over the second quantum channel 104b to the quantum receiver of the second device 102c. Alternatively or additionally, or as an option, the intermediary device 102a may have securely received (e.g. in a quantum-safe manner) one or more random sets of symbols/bits and/or one or more QKD keys for use in performing the key exchange protocol 500 for transmitting the second set of symbols to the second device 102c in step 504.

In step 505, the second device 102c transmits over the second classical channel 106b to the intermediary device 102a an indication of the symbols/bits of the second set of symbols (e.g. symbol/bit numbers received (#10, #532, #1045, . . . )—around 1000 values expected) that were validly received by the quantum receiver of second device 102c. In step 506, the intermediary device 102a sends over the second classical channel 106b the second random transmitting basis set including basis values of the transmitted symbols/bits, denoted Tac, that correspond to the received indications of the validly received bits. Thus, the intermediary device 102a transmits data representative of the second random transmitting basis, Tac, over the second classical channel 106b to the second device 102c. The second device 102c does not reveal the second random receiving basis set, denoted Rac, which is used by the quantum receiver of the second device 102c to receive the second set of symbols over the second quantum channel 104b from the intermediary device 102a. That is, second device 102c withholds from the intermediary device 102a the second random receiving basis set, denoted Rac, which is used by the quantum receiver of the second device 102c to receive the second set of symbols over the second quantum channel 104b from the intermediary device 102a. This means, at this point, the intermediary device 102a only knows approximately 50% of the symbols/bits of the second set of symbols received by the second device 102c. This is because the intermediary device 102a does not know the second random receiving basis. All the intermediary device 102a has done is to randomly generate the second random transmitting basis, Tac, for transmitting the quantum transmissions of the second set of symbols to the quantum receiver of the second device 102c.

Thus, only the second device 102c has knowledge of: a) the second random transmitting basis set, Tac, used by the quantum transmitter of the intermediary device 102a for transmitting the second set of symbols to the second device 102c; b) the second random receiving basis values used by the quantum receiver of the second device 102c for receiving the symbols/bits of the second set of symbols, which is denoted Rac, and which is withheld from the intermediary device 102a; and c) the validly received symbols/bits of the second set of symbols received by the second device 102c as indicated by the indication in step 505. The intermediary device 102a only has knowledge of: a) the second random transmitting basis set, Tac, used by the quantum transmitter of intermediary device 102a for transmitting the second set of symbols; b) an indication of the validly received symbols/bits of the second set of symbols that were received by the second device 102c. The intermediary device 102a determines a second intermediate set of symbols associated with the intermediary device 102a (e.g. second partial key PKac2) by discarding all symbols/bits of the transmitted second set of symbols that were not validly received by the second device 102c and retains only those bits/symbols of the transmitted second set of symbols for those Tac(i) for each i-th validly received symbol/bit of the received second set of symbols by the second device 102c, which is derivable from the received indication in step 505. As an option, the second device 102c may determine a second intermediate set of symbols associated with the second device 102c (e.g. second partial key PKac1) by discarding all symbols/bits of the received second set of symbols except those where Tac(i)=Rac(i) for that validly received i-th symbol/bit of the received second set of symbols transmitted by the intermediary device 102a. Thus, the intermediary device 102a may only be able to derive or guess correctly approximately 50% of the second intermediate set of symbols associated with the second device 102c (e.g. second partial key PKac1) using the second intermediate set of symbols associated with the intermediary device 102a (e.g. second partial key PKac2).

From the first key exchange subprocess 500a, the first device 102b and intermediary device 102a have determined their corresponding first intermediate sets of symbols (e.g. first partial key PKab1 and first partial key PKab2). Similarly, from the second key exchange subprocess 540b, the second device 102c and the intermediary device 102a have determined their corresponding second intermediate sets of symbols (e.g. second partial key PKac1 and second partial key PKac2). Although as described above, the first and second key exchange subprocess(es) 500a and 500b are performed sequentially one after the other, this is by way of example only and the invention is not so limited, it is to be appreciated by the skilled person that the first and second key exchange subprocess(es) 500a and 500b may be performed concurrently, simultaneously, in a different order and/or at different times and/or where one or more of the steps of each of the key exchange subprocess(es) 500a and 500b may even be interleaved with one or more steps of each of the other key exchange subprocess(es) 500b and 500a, respectively, and the like; combinations thereof, modifications thereto, as herein described and/or as the application demands.

In the third key exchange subprocess 500c, once the first intermediate set of symbols associated with the intermediary device and the second intermediate set of symbols associated with the intermediary device (e.g. first partial key PKab2 and second partial key PKac2) are determined by the intermediary device 102a, the intermediary device 102a then XORs these first and second intermediate sets of symbols (e.g. first and second partial keys PKab2 and PKac2) together to form a third intermediate set of symbols, where the third intermediate set of symbols is sent to the second device 102c over the second classical channel 106b or even to both parties over the corresponding classical channels 106a and 106b.

In any event, once the first and second key exchange subprocess(es) 500a and 500b have completed, the third key exchange subprocess 500c of the key exchange process 500 is performed based on the following steps of: In step 507a, the intermediary device 102a encrypts the first intermediate set of symbols associated with the intermediary device 102a (e.g. first partial key PKab2) by encrypting it with the second intermediate set of symbols associated with the intermediary device 102a (e.g. second partial key PKac2). For example, an XOR-type of operation or OTP type of operation may be used to combine the first intermediate set of symbols associated with the intermediary device 102a and the second intermediate set of symbols associated with the intermediary device 102a to form the encrypted first intermediate set of symbols associated with the intermediary device 102a (e.g. first partial key PKab2 XOR second partial key PKac2, or PKab2 XOR PKac2—also referred to as PKab XOR PKac), which is referred to as the third intermediate set of symbols. The third intermediate set of symbols is sent over the second classical channel 106b to the second device 102c. For example, when encrypting the first intermediate set of symbols associated with the intermediary device (e.g. second partial key PKab2), the intermediary device 102a may combine the first intermediate set of symbols associated with the intermediary device (e.g. first partial key PKab2) with the second intermediate set of symbols associated with the intermediary device 102a (e.g. second partial key PKac2)

using an XOR-type operation or a OTP operation and the like (e.g. if quantum bits are used, then the intermediary device 102a may send the third set of symbols based on PKab2 XOR PKac2 to the second device 102c).

In step 508a, the second device 102c receives the third intermediate set of symbols (e.g. PKab2 XOR PKac2) and decrypts the third intermediate set of symbols by first deriving the second intermediate set of symbols associated with the intermediary device 102a (e.g. second partial key PKac2), then using this to retrieve the first intermediate set of symbols associated with the intermediary device 102a (e.g. first partial key PKab2). The second device 102c is able to determine the second intermediate set of symbols associated with the intermediary device 102a (e.g. second partial key PKac2) that was determined and used by the intermediary device 102a because the second device 102c has knowledge of: a) the second random transmitting basis set, Tac, used by the quantum transmitter of the intermediary device 102a for transmitting the second set of symbols to the second device 102c; b) the second random receiving basis set including basis values used by the quantum receiver of the second device 102c for receiving the symbols/bits of the second set of symbols, which is denoted Rac; and c) the validly received symbols/bits of the second set of symbols received by the second device 102c as indicated by the indication in step 505. From this knowledge, the second device 102c can derive the second intermediate set of symbols associated with the intermediary device 102a (e.g. second partial key PKac2) that was used to encrypt the first intermediate set of symbols associated with the intermediary device 102a (e.g. first partial key PKab2). For example, the second device 102c calculates the first intermediate set of symbols associated with the intermediary device 102a (e.g. first partial key PKab2) by applying the calculated second intermediate set of symbols associated with the intermediary device 102a (e.g. second partial key PKac2) to the third intermediate set of symbols (e.g. PKab2 XOR PKac2 or OTP (PKab2, PKac2)). For example, if the first intermediate set of symbols associated with the intermediary device 102a (e.g. first partial key PKab2) were encrypted using an XOR type operation in step 507a, then the first intermediate set of symbols associated with the intermediary device 102a (e.g. first partial key PKab2) may be retrieved from the third intermediate set of symbols (e.g. PKab2 XOR PKac2) based on PKac2 XOR (PKab2 XOR PKac2)=PKab2. Thus, the first intermediate set of symbols associated with the intermediary device 102a (e.g. first partial key PKab2) has effectively been shared between the first device 102b, the second device 102c and the intermediary device 102a. However, at this point in the third key exchange process 500c, both the intermediary device 102a and the second device 102c do not know all of the values of the first set of symbols transmitted by the first device 102b or the first intermediate set of symbols associated with the first device 102b (e.g. first partial key PKab1), which was determined by the first device 102b using the first random receiving basis set/values, Rab. However, this is because the first device 102b has withheld the random transmitting basis set/values, Tab, used by the quantum transmitter of the first device 102b for transmitting the symbols/bits of the first set of symbols to the intermediary device 102a that resulted in the first intermediate set of symbols associated with the first device 102b (e.g. first partial key PKab1). Thus, the intermediary device 102a and second device 102c may only be able to derive or guess correctly approximately 50% of the first set of symbols or 50% of the intermediate set of symbols associated with the first device 102b (e.g. first partial key PKab1) when using only the first intermediate set of symbols associated with the intermediary device 102a (e.g. first partial key PKab2).

Additionally or alternatively, as an option, the intermediary device 102a may send the third intermediate set of symbols to the first device 102b. Thus, in step 507b, the intermediary device 102a encrypts the second intermediate set of symbols associated with the intermediary device 102a (e.g. second partial key PKac2) by encrypting it with the first intermediate set of symbols associated with the intermediary device 102a (e.g. first partial key PKab2). For example, an XOR-type of operation or OTP type of operation may be used to combine the first intermediate set of symbols associated with the intermediary device 102a and the second intermediate set of symbols associated with the intermediary device 102a to form the encrypted second intermediate set of symbols associated with the intermediary device 102a (e.g. first partial key PKab2 XOR second partial key PKac2, or PKab2 XOR PKac2—also referred to as PKab XOR PKac), which is referred to as the third intermediate set of symbols. The third intermediate set of symbols is sent over the second classical channel 106a to the first device 102b. For example, when encrypting the second intermediate set of symbols associated with the intermediary device (e.g. second partial key PKac2), the intermediary device 102a may combine the first intermediate set of symbols associated with the intermediary device (e.g. first partial key PKab2) with the second intermediate set of symbols associated with the intermediary device 102a (e.g. second partial key PKac2) using an XOR-type operation or a OTP operation and the like (e.g. if quantum bits are used, then the intermediary device 102a may send the third intermediate set of symbols based on, without limitation, for example PKab2 XOR PKac2 (or PKab XOR PKac) to the first device 102b).

In step 508b, the first device 102b receives the third intermediate set of symbols (e.g. PKab2 XOR PKac2) and decrypts the third intermediate set of symbols by first deriving the first intermediate set of symbols associated with the intermediary device 102a (e.g. first partial key PKab2), then using this to retrieve the second intermediate set of symbols associated with the intermediary device 102a (e.g. second partial key PKac2). The first device 102b is able to determine the first intermediate set of symbols associated with the intermediary device 102a (e.g. first partial key PKab2) that was determined and used by the intermediary device 102a because the first device 102b has knowledge of: a) the first random transmitting basis set, Tab, used by the quantum transmitter of the first device 102b for transmitting the first set of symbols to the intermediary device 102a; b) the first random receiving basis set including basis values used by the quantum receiver of the intermediary device 102a for receiving the symbols/bits of the first set of symbols, which is denoted Rac; and c) the validly received symbols/bits of the first set of symbols received by the intermediary device 102a as indicated by the indication in step 502. From this knowledge, the first device 102b can derive the first intermediate set of symbols associated with the intermediary device 102a (e.g. first partial key PKab2) that was used to encrypt the second intermediate set of symbols associated with the intermediary device 102a (e.g. second partial key PKac2). For example, the first device 102b calculates the second intermediate set of symbols associated with the intermediary device 102a (e.g. second partial key PKac2) by applying the calculated first intermediate set of symbols associated with the intermediary device 102a (e.g. first partial key PKab2) to the third intermediate set of symbols (e.g. PKab2 XOR PKac2 or OTP (PKab2, PKac2)). For example, if the second intermediate set of symbols associated with the intermediary device 102a (e.g. second partial key PKac2) were encrypted using an XOR type operation in step 507b, then the second intermediate set of symbols associated with the intermediary device 102a (e.g. second partial key PKac2) may be retrieved from the third intermediate set of symbols (e.g. PKab2 XOR PKac2) based on PKab2 XOR (PKab2 XOR PKac2)=PKac2. Thus, the second intermediate set of symbols associated with the intermediary device 102a (e.g. second partial key PKac2) has effectively been shared between the first device 102b, the second device 102c and the intermediary device 102a. However, at this point in the third key exchange process 500c, both the intermediary device 102a and the first device 102b do not know all of the values of the received second set of symbols received by the second device 102c or the second intermediate set of symbols associated with the second device 102c (e.g. second partial key PKac1), which was determined by the second device 102c using the second random receiving/transmitting basis set/values, Rac & Tac. However, this is because the second device 102c has withheld the second random receiving basis set/values, Rac, used by the quantum receiver of the second device 102c for receiving the symbols/bits of the second set of symbols transmitted by the intermediary device 102a that resulted in the second intermediate set of symbols associated with the second device 102c (e.g. second partial key PKac1). Thus, the intermediary device 102a and first device 102b may only be able to derive or guess correctly approximately 50% of the received second set of symbols or 50% of the intermediate set of symbols associated with the second device 102c (e.g. second partial key PKac1) when using only the second intermediate set of symbols associated with the intermediary device 102a (e.g. second partial key PKac2).

If only steps 507a and 508a of the third key exchange subprocess 500c are performed then the fourth key exchange subprocess 500d may determine the final shared key based on the first intermediate set of symbols associated with the intermediary device 102a (e.g. first partial key PKab2) and the first set of symbols or the first intermediate set of symbols associated with the first device 102b (e.g. first partial key PKab1). If only steps 507b and 508b of the third key exchange subprocess 500c are performed then the fourth key exchange subprocess 500d may determine the final shared key based on the second intermediate set of symbols associated with the intermediary device 102a (e.g. second partial key PKac2) and the received second set of symbols or the second intermediate set of symbols associated with the second device 102c (e.g. second partial key PKac1). Alternatively or additionally, if both steps 507a and 508a and steps 507b and 508b of the third key exchange subprocess 500c are performed then the fourth key exchange subprocess 500d may determine the final shared key based on either a) the first intermediate set of symbols associated with the intermediary device 102a (e.g. first partial key PKab2) and the first set of symbols or the first intermediate set of symbols associated with the first device 102b (e.g. first partial key PKab1); b) the second intermediate set of symbols associated with the intermediary device 102a (e.g. second partial key PKac2) and the received second set of symbols or the second intermediate set of symbols associated with the second device 102c (e.g. second partial key PKac1); or c) both a) and b). The advantage of doing option c), i.e. both a) and b) may be that a larger set of symbols can be used to determine the final shared key during the fourth key exchange subprocess 500d.

In the fourth key exchange subprocess 500d, the first and second devices 104b and 104c communicate using encrypted communications over the third channel 106c (e.g. using a previously shared key or agreed key that is unknown to the intermediary device 102a) to perform a reconciliation procedure for discovering the correctly-measured bases, generating a new raw key of about 25% of the original bits transmitted should the third intermediate set of symbols be transmitted only to one of the first or second devices 102b or 102c, (e.g. options a) or b) of the third key exchange subprocess 500c). Should the third intermediate set of symbols be transmitted to both the first and second devices 102b and 102c (e.g. option c) of the third key exchange subprocess 500c), then there is double the number of symbols for performing a reconciliation procedure for discovering the correctly measured bases, generating a new raw key of about 50% of the original bits transmitted in total (e.g. using the first and second set of symbols). The first and second devices 102b and 102c also perform error correction, symbol/bit sifting and/or privacy amplification and the like to generate and agree upon a final shared key, which becomes a precursor key negotiated between the first and second devices 102b and 104c. The first and second devices 102b and 102c may use the final shared key in secure communications therebetween and/or as the application demands. The final shared key is unknown to the intermediary device 102a because the random transmitting bases, Tab, and the random receiving bases, Rac, were withheld from the intermediary device 102a by the first and second devices 102b and 102a, respectively.

In the following example steps of the fourth key exchange subprocess 500d, it is assumed that during the third key exchange subprocess 500c the intermediary device 102a only sent the third intermediate set of symbols to the second device 102c over the second classical communication channel 106b. Thus, in step 509, the first and second devices 102b and 102c may perform secure or encrypted communications therebetween in which the first device 102b sends to the second device 102c first transmitting basis information and/or first receiving basis information. The first transmitting basis information includes, without limitation, for example the first random transmitting basis, Tab, which includes data representative of the basis values of the transmitted symbols/bits, Tab, used by the quantum transmitter of the first device 102b for transmitting the first set of symbols to the intermediary device 102a. The first random receiving basis information includes, without limitation, for example the first random receiving basis values of the received bits, Rab, used by the intermediary device 102a for receiving the first set of symbols over the first quantum channel 104a. For example, the first device 102b may send the first random transmitting basis (e.g. Tab) to the second device 102c over the third classical communications channel 106c. Encrypted communications may be used by the first and second devices 102b and 102c such that the intermediary device 102a is unable to decrypt the communications data transmitted therebetween over the third communications channel 106c. The third communications channel 106c may be a separate communications channel that bypasses the intermediary device 102a. As an example, the first and second devices 102b and 102c may perform secure or encrypted communications with each other using a previously shared key or agreed key/channel and the like such that the intermediary device 102a is unable to decrypt or derive the data representative of the basis values of the transmitted bits, Tab, which were withheld from the intermediary device 102a. Thus, only the second device 102c receives the first random transmitting basis values of the transmitted bits, Tab, of the first set of symbols. The first device 102b also sends the first random receiving basis, Rab, to the second device 102c over the third communication channel 106c. The second device 102c thus receives the first random receiving basis values of the received bits, Rab, used by the intermediary device 102a for receiving the first set of symbols over the first quantum channel 104a. The third classical communication channel 106c may be any other classical wireless or wired communication channel (e.g. PSTN, another telecommunications provider, mobile communications, and the like) enabling the first and second devices 102b and 102c to communicate securely and independently of the intermediary device 102a. Furthermore, the first and second devices 102b and 102c may perform encrypted communications or secure communications based on a previously agreed/shared key over the another or different classical communication channel, which further minimises any eavesdroppers from determining the first random transmitting basis transmitted basis, Tab, that is withheld from the intermediary device 102a by the first device 102b.

As an option, in step 509, rather than sending the actual basis values of the first random transmitting basis, Tab, and the first random receiving basis, Rab, as the transmitting/receiving basis information, the first device 102b may instead calculate a first transmitting basis flag array in which each i-th transmitting basis flag of the array is set based on whether the i-th basis value of the i-th transmitting symbol matches the i-th basis value of the i-th receiving symbol, e.g. checking that Tab(i) matches Rab(i) or not (i.e. Tab(i)==Rab(i)). If there is a match (e.g. Tab(i)=Rab(i)), then the i-th transmitting basis flag of the array is set to a binary '1' otherwise, if Tab(i)≠Rab(i) it is set to a binary '0'. Alternatively, if there is a match (e.g. Tab(i)=Rab(i)), then the i-th transmitting basis flag of the array is set to a binary '0' otherwise, if Tab(i)≠Rab(i) it is set to a binary '1'. Although the basis flag is described as having a value of a binary '1' or '0', this is by way of example only and the invention is not so limited, it is to be appreciated by the skilled person that the basis flag value may be set to any suitable type of value, number, or string that enables comparison/matching and/or logical operations to be performed between transmitting basis flag arrays and/or corresponding i-th basis flags of two or more transmitting basis flag arrays and the like. Thus, the first device 102b may send transmitting/receiving basis information that includes data representative of the first transmitting basis flag array, where the i-th transmitting basis flag in the array is set to '1' when Tab(i)=Rab(i) or i-th transmitting basis flag set to '0' when Tab(i)≠Rab(i).

In step 510, the first and second devices 102b and 102c may perform secure or encrypted communications therebetween in which the second device 102c sends to the first device 102b the second receiving basis information and/or second transmitting basis information. The second receiving basis information includes, without limitation, for example the second random receiving basis, Rac, which includes data representative of the basis values of the received symbols/bits, Rac, used by the quantum receiver of the second device 102c for receiving the second set of symbols transmitted by the intermediary device 102a. The second random transmitting basis information includes, without limitation, for example the second random transmitting basis values of the transmitted bits, Tac, used by the intermediary device 102a for transmitting the second set of symbols over the second quantum channel 104b. For example, the second device 102c may send the second random receiving basis (e.g. Rac) to the first device 102b over the third classical communications channel 106c. The second device 102c may also send the second random transmitting basis (e.g. Tac) to the first device 102b over the third classical communications channel 106c. Encrypted communications may be used by the first and second devices 102b and 102c such that the intermediary device 102a is unable to decrypt the communications data transmitted therebetween over the third communications channel 106c. The third communications channel 106c may be a separate communications channel that bypasses the intermediary device 102a. As an example, the first and second devices 102b and 102c may perform secure or encrypted communications with each other using a previously shared key or agreed key/channel and the like such that the intermediary device 102a is unable to decrypt or derive the data representative of the basis values of the received bits, Rac, which were withheld from the intermediary device 102a. Thus, only the first device 102b receives the second random receiving basis values, Rac, of the received bits of the second set of symbols. The second device 102c also sends the second random transmitting basis, Tac, to the first device 102b over the third communication channel 106c. The first device 102b thus receives the first random transmitting basis values, Tac, of the transmitted bits used by the intermediary device 102a for transmitting the second set of symbols over the second quantum channel 104b. The third classical communication channel 106c may be any other classical wireless or wired communication channel (e.g. PSTN, another telecommunications provider, mobile communications, and the like) enabling the first and second devices 102b and 102c to communicate securely and independently of the intermediary device 102a. Furthermore, the first and second devices 102b and 102c may perform encrypted communications or secure communications based on a previously agreed/shared key over the another or different classical communication channel, which further minimises any eavesdroppers from determining the second random receiving basis, Rac, which is withheld from the intermediary device 102a by the second device 102c.

As an option, in step 510, rather than sending the actual basis values of the second random transmitting basis, Tac, and the second random receiving basis, Rac, as the transmitting/receiving basis information, the second device 102c may instead calculate a second transmitting/receiving basis flag array in which each i-th transmitting/receiving basis flag of the array is set based on whether the i-th basis value of the i-th transmitting symbol matches the i-th basis value of the i-th receiving symbol, e.g. checking that Tac(i) matches Rac(i) or not (i.e. Tac(i)==Rac(i)). If there is a match (e.g. Tac(i)=Rac(i)), then the i-th transmitting/receiving basis flag in the array is set to, without limitation, for example a binary '1' otherwise, if Tac(i)≠Rac(i) it is set to, without limitation, for example a binary '0'. Alternatively, if there is a match (e.g. Tac(i)=Rac(i)), then the i-th transmitting/receiving basis flag in the array is set to, without limitation, for example a binary '0' otherwise, if Tac(i)≠Rac(i) it is set to, without limitation, for example a binary '1'. Although the basis flag is described as having a value of a binary '1' or '0', this is by way of example only and the invention is not so limited, it is to be appreciated by the skilled person that the basis flag value may be set to any suitable type of value, number or string that enables comparison/matching and/or logical operations to be performed between transmitting/receiving basis flag arrays and/or corresponding i-th basis flags of two or more transmitting/receiving basis flag arrays and the like. Thus, the second device 102c may send transmitting/receiving basis information that includes data representative of the second transmitting/receiving basis flag array, where the i-th transmitting basis flag in the array is set to '1' when Tac(i)=Rac(i) or i-th transmitting/receiving basis flag set to '0' when Tac(i)≠Rac(i).

At this stage of the fourth key exchange subprocess 500d, the first device 102b and the second device 102c have the following information: a) the basis values Tab and Rab; and b) the basis values Tac and Rac. Furthermore, the second device 102c has the following information: a) the first intermediate set of symbols associated with the intermediary device 102a (e.g. second partial key PKab2); and b) the second intermediate set of second partial key, PKac2, associated with the second device 102c. Thus, using this information along with error correction and privacy amplification, the first and second endpoint devices 104a and 104k may determine a final shared key. For example, in step 510b the first device 102b determines a first shared key, KS1, by discarding all symbols/bits of the first set of symbols except those symbols/bits of the first set of symbols where (Tab(i)==Rab(i) AND Tac(i)==Rac(i)) for those validly received i-th symbols/bits of the first set of symbols by the intermediary device 102a, which is derivable from the received indication in step 502. Similarly, in step 510a the second device 102c determines a second shared key, KS2, by discarding all symbols/bits of the first intermediate set of symbols associated with the intermediary device 102a (e.g. first partial key PKab2) except those symbols/bits of the first intermediate set of symbols associated with the intermediary device 102a (e.g. first partial key PKab2) where (Tab(i)==Rab(i) AND Tac(i)==Rac(i)) for that validly i-th received symbol/bit of the second set of symbols by the second device 102c, which is derivable from the received indication in step 505.

Alternatively, as an option, the first device 102b and the second device 102c may have the following transmitting/receiving basis information: a) the first transmitting basis flag array; and b) the second transmitting/receiving basis flag array. Furthermore, the second device 102c has the following information: a) the first intermediate set of symbols associated with the intermediary device 102a (e.g. second partial key PKab2); and b) the second intermediate set of second partial key, PKac2, associated with the second device 102c. Thus, using this information along with error correction and privacy amplification, the first and second endpoint devices 104a and 104k may determine a final shared key. For example, in step 510b the first device 102b may form a basis flag mask by performing a logical AND of the first transmitting basis flag array with the second transmitting/receiving basis flag array—thus XORing the basis flag mask with the first set of symbols (or the first intermediate set of symbols associated with the first device 102b) means that the remaining non-zero symbols may be used to form determines the first shared key, KS1. Alternatively, the first device 102b may determine a first shared key, KS1, by discarding all symbols/bits of the first set of symbols except those symbols/bits of the first set of symbols where the i-th basis flag value resulting from the logical AND of the first transmitting basis array and the second transmitting/receiving basis array is a binary '1' for those validly received i-th symbols/bits of the first set of symbols by the intermediary device 102a, which is derivable from the received indication in step 502. Similarly, in step 510a the second device 102c may form a basis flag mask by performing a logical AND of the first transmitting basis flag array with the second transmitting/receiving basis flag array—thus XORing the basis flag mask with the first intermediate set of symbols associated with the intermediary device 102b means that the remaining non-zero symbols may be used to form the second shared key, KS2. Alternatively, the second device 102c may determine a second shared key, KS2, by discarding all symbols/bits of the first intermediate set of symbols associated with the intermediary device 102a (e.g. first partial key PKab2) except those symbols/bits of the first intermediate set of symbols associated with the intermediary device 102a (e.g. first partial key PKab2) where the i-th basis flag value resulting from the logical AND of the first transmitting basis array and the second transmitting/receiving basis array is a binary '1' for that validly i-th received symbol/bit of the second set of symbols by the second device 102c, which is derivable from the received indication in step 505.

Thus, the first and second endpoint devices 104a and 104k may use encrypted communications to determine a first and second shared key, KS1 and KS2, respectively. In step 511, the first and second endpoint devices 104a and 104k perform using the third classical communication channel 106c error correction, bit sifting and/or privacy amplification on the first and second shared keys KS1 and KS2, respectively, to agree upon and/or form a final shared key KFbc. Thus, the first device 102b and second device 102c (e.g. Bob and Carol, respectively), but not the intermediary device 102a (e.g. Alice) have shared a final shared key, KFbc. Thus, the first and second devices 102b and 102c may use the final shared key, KFbc, in secure communications therebetween and/or any other useful cryptographic operation and the like.

Figure 6A:
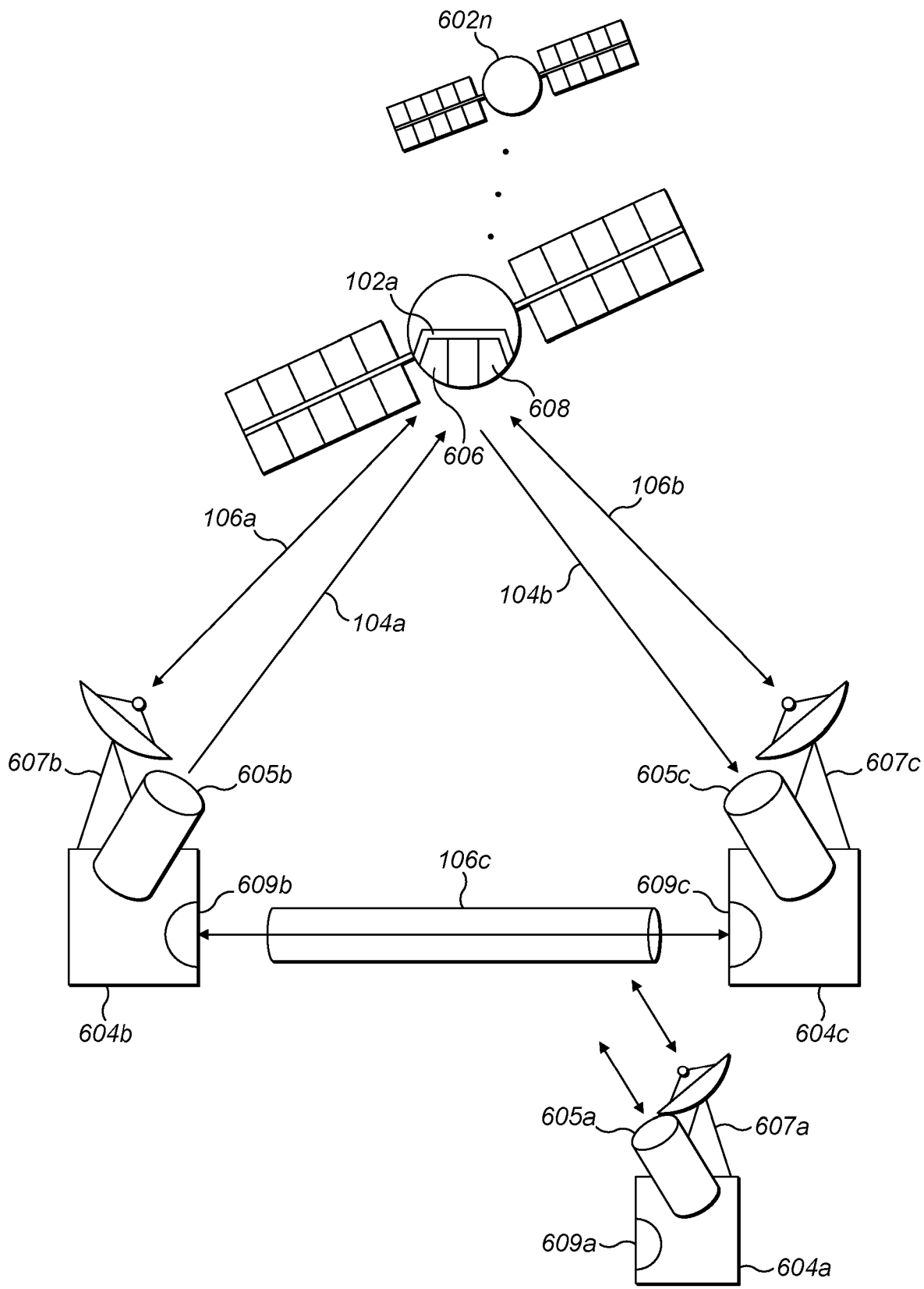
FIG. 6a is a schematic diagram illustrating an example QKD system according to the invention.

FIG. 6a is a schematic diagram of an example satellite QKD system 600 for implementing the key exchange process(es) 100, 200, 300, 400 and/or 500 as described with reference to FIGS. 1 to 5 according to the invention. For simplicity, reference numerals of FIG. 1 may be used for the same and/or similar components. In this example, the satellite QKD system 600 includes a plurality of satellites 602a to 602n and a plurality of ground receiving stations 604a-604c. Each of the satellites 602a-602n may include componentry, apparatus and/or functionality for implementing an intermediary device 102a configured to implement the key exchange process/protocol as described with reference to FIGS. 1 to 5, combinations thereof, modifications thereto, and/or as described herein. Furthermore, each of the ground receiving stations 604a-604c may include componentry, apparatus, and/or functionality for implementing the functionality associated with the first device 102b (e.g. Bob 102b) and/or the functionality associated with the second device 102c (e.g. Carol 102c) for performing the key exchange protocol as described with reference to FIGS. 1 to 5 combinations thereof, modifications thereto, and/or as described herein.

First ground transmitting station 604b and second ground receiving station 604c may require a shared key that is delivered by one of the satellites 602a of the plurality of satellites 602a-602n. The satellite 602a may include at least a quantum communication interface 606 (e.g. quantum receiver, transceiver or other communication device) for transmitting and/or receiving data/control signals over first and second quantum channels 104a and 104b to and/or from ground transmitting/receiving stations 604b and 604c. The satellite 602a may further include at least a non-quantum communication interface 608 (e.g. standard or classical communication interface) for transmitting and/or receiving data/control signals over first and second non-quantum (e.g. standard or classical) satellite communication channels to and/or from ground receiving stations 604b and 604c. The ground transmitting/receiving stations 604b and 604c may include, without limitation, for example at least a quantum communication interface 605b and 605c (e.g. a quantum transmitter, transceiver and/or communication device), respectively, for transmitting data/control signals to satellite and/or receiving data/control signals transmitted by the satellite 602a over quantum channels 104a and 104b, respectively. The ground transmitting/receiving stations 604b and 604c may further include, without limitation, for example a non-quantum communication interface/transceiver 607b and 607c, respectively, for receiving and/or transmitting data/control signals with satellite 602a over first and second non-quantum communication channels 106a and 106b. In addition, the ground transmitting/receiving stations 604b and 604c may further include, without limitation, for example further non-quantum communication interface(s) 609b and 609c for establishing a third non-quantum communication channel 106c and transmitting/receiving data/control signals over the third non-quantum communication channel 106c in a secure manner with each other.

The first and second quantum channel(s) 104a and 104b are required for the key exchange process/protocol as described with reference to FIGS. 1 to 5, and/or as described herein. In the satellite QKD system 600, the first and second quantum channel(s) 104a and 104b may be, without limitation, for example free-space optical quantum channels between the satellite 602a and the first and second transmitting/receiving ground stations 604b and 604c, respectively. The quantum communication interface 606 of the satellite 602a may be, without limitation, for example a satellite optical transceiver, satellite optical telescope transmitter/receiver, optical quantum transceiver, and/or any other quantum transceiver as the application demands. For receiving quantum information over quantum channel 104a, the quantum communication interface 606 may include, without limitation, for example at least an optical satellite transceiver, or optical satellite receiver telescope/transmitter telescope and the like, optical receiver telescope, laser receivers, beacon laser receivers, downlink laser receiver, downlink beacon laser receiver, weak coherent pulse receiver, and/or any suitable quantum transceiver configured for receiving photons emitted by the quantum communications interface of satellite, combinations thereof, modifications thereto and/or as the application demands. For transmitting quantum information over quantum channel 104b, the quantum communication interface 606 may include, without limitation, for example at least an optical satellite transceiver, or optical satellite transmitter telescope and the like, laser transmitters, beacon laser transmitters, downlink laser transmitter, downlink beacon laser transmitter, weak coherent pulse transmitter, and/or any suitable quantum transceiver configured for transmitting photons emitted by the quantum communications interface of satellite, combinations thereof, modifications thereto and/or as the application demands. The first and second non-quantum communications channels 106a and 106b may be, without limitation, for example satellite optical and/or satellite wireless communications channels between the satellite 602a and the first and second ground transmitting/receiving stations 604b and 604c. The quantum communication interfaces 605b of the first ground transmitting station 604b may include, without limitation, for example at least an optical satellite transceiver, or optical satellite receiver telescope/transmitter telescope and the like, optical receiver telescope, satellite optical telescope transmitter, lasers, beacon lasers, downlink lasers, downlink beacon lasers, weak coherent pulse sources, and/or corresponding optical laser transmitting components and the like, and/or any suitable quantum transceiver configured for transmitting photons to the quantum communications interface 606 of satellite 602a, combinations thereof, modifications thereto and/or as the application demands. The quantum communication interfaces 605c of the second ground receiving station 604c, respectively, may include, without limitation, for example at least an optical satellite transceiver, or optical satellite transmitter telescope and the like, laser transmitters, beacon laser transmitters, downlink laser transmitter, downlink beacon laser transmitter, weak coherent pulse transmitter, and/or any suitable quantum transceiver configured for transmitting photons emitted by the quantum communications interface of satellite, combinations thereof, modifications thereto and/or as the application demands.

The non-quantum communication interfaces 608 of the satellite may include, by way of example only but not limited to, wireless and/or radio satellite communications interfaces and/or optical satellite communication interfaces and the like. The non-quantum communication interfaces 605b and 605c of the ground transmitting/receiving stations 604b and 604c may include, by way of example only but not limited to, corresponding wireless and/or radio satellite communications interfaces and/or optical satellite communication interfaces in relation to the non-quantum communication interfaces 608 of the satellite 602a. The non-quantum communication interfaces 609b and 609c of the ground receiving stations 604b and 604c may include, by way of example only but not limited to, wireless and/or wired communications interface(s) configured for establishing a wireless and/or a wired communication channel 106c therebetween; fibre optic communications interfaces configured for establishing optical fibre communication channel 106c therebetween (e.g. optical fibre, dark fibre and the like); corresponding wireless and/or radio communications interfaces; optical communication interfaces and the like; and/or any other suitable non-quantum communication interface for communicating with each other as the application demands.

Thus, the satellite QKD system 600 may be configured to and/or operate to implement the key exchange process/protocols 100, 200, 300, 400, and/or 500 according to the invention as described in FIGS. 1 to 5 and/or combinations thereof, modifications thereto, and/or as herein described. For example, the key exchange process/protocol may be implemented by satellite QKD system 600 in which a shared key is required between ground transmitting/receiving stations 604b and 604c, in which the satellite 602a may operate as Alice 102a, the first ground transmitting station 604b may operate as Bob 102b, and the second ground receiving station 602c may operate as Carol 102c when performing the key exchange process/protocol according to the invention as described herein.

Although the example satellite QKD system 600 and QKD protocol according to the invention of FIG. 6a describes using satellite 602a as the intermediary device (e.g. Alice) 102a and the ground stations 604b (e.g. Bob) and 604c (e.g. Carol) as the first and second device 102b and 102c, respectively, this is described in FIG. 6a, by way of example only and the invention is not so limited, in another example, the intermediary device may be a ground station or device, the first device and second device may be satellites that require cryptographic keys/shared keys distributed from the ground station using the key exchange process/protocol according to the invention. The quantum communication interfaces of the satellites may be, without limitation, at least one of a optical satellite transceiver, or optical satellite receiver telescope/transmitter telescope and the like, optical receiver telescope, satellite optical telescope transmitter, lasers, beacon lasers, downlink lasers, downlink beacon lasers, weak coherent pulse sources, and/or corresponding optical laser transmitting components and the like, and/or any suitable quantum transceiver configured for transmitting photons to the quantum communications interface of each satellite, combinations thereof, modifications thereto and/or as the application demands. The first and second non-quantum communications channels 106a and 106b may be, without limitation, for example satellite optical and/or satellite wireless communications channels between the satellites and the ground receiving station. The quantum communication interface of the ground receiving station, respectively, may include, without limitation, for example at least a satellite optical transceiver, satellite optical telescope transmitter/receiver, optical quantum transceiver, and/or any other quantum transceiver as the application demands. For receiving quantum information over quantum channels 104a and 104b, the quantum communication interface of the ground receiving station may include, without limitation, for example at least an optical satellite transceiver, or optical satellite receiver telescope/transmitter telescope and the like, optical receiver telescope, laser receivers, beacon laser receivers, downlink laser receiver, downlink beacon laser receiver, weak coherent pulse receiver, and/or any suitable quantum transceiver configured for receiving photons emitted by the quantum communications interface of satellite, combinations thereof, modifications thereto and/or as the application demands. In this case, the first quantum communication channel 104a maybe a free-space optical quantum communication channel, the second quantum communication channel 104b may be a free-space optical quantum communication channel, and the first and second communication channels 106a and 106b are non-quantum satellite communications channels. The third communication channel 106c may be a satellite-to-satellite communication channel and the like. Thus, at least a pair of satellites as Bob 102b and Carol 102c may use the key exchange process/protocol with a ground receiving station as Alice 102a for exchanging a shared key therebetween such that the ground receiving station does not know the shared key.

FIG. 6b is a schematic diagram of an example terrestrial QKD system 610 for implementing the key exchange process/protocol according to the invention as described with reference to FIGS. 1 to 6a, combinations thereof, modifications thereto, as described herein and/or as the application demands. For simplicity, reference numerals of FIG. 1 may be used for the same and/or similar components. In this example, the terrestrial QKD system 610 includes an optical intermediary device 612a (e.g. Alice) and first and second optical devices 612b and 612c (e.g. Bob and Carol). The optical intermediary device 612a is communicatively coupled with the first and second optical devices 612b and 612c via, without limitation, for example corresponding optical fibre and/or optical fibre network(s) 614a and 614b, respectively. The optical intermediary device 612a is configured to establish and/or transmit/receive data over a first optical fibre quantum channel 104a with first optical device 612b. Similarly, the optical intermediary device 612a is configured to establish and/or transmit/receive data over a second optical fibre quantum channel 104b with second optical device 612b. In addition, the optical intermediary device 612a is configured to establish and/or transmit/receive data over a first optical fibre channel 106a with first optical device 612b. The optical intermediary device 612a is configured to establish and/or transmit/receive data over a second optical fibre channel 106b with second optical device 612b. Furthermore, the first and second optical devices 612b and 612c are configured to establish and/or transmit/receive data over a third communication channel 106c with each other. The third communication channel 106c may include, without limitation, for example a wired and/or wireless communication channel, an optical communication channel, an optical fibre communication channel and/or any other suitable non-quantum communication channel.

The optical intermediary device 612a may include componentry, apparatus and/or functionality for implementing, without limitation, for example intermediary device 102a configured to implement the key exchange process/protocol as described with reference to FIGS. 1 to 6a and/or any other intermediary device for implementing the key exchange process/protocol as described with reference to FIGS. 1 to 6a, combinations thereof, modifications thereto, and/or as described herein. Furthermore, each of the first and second optical devices 612b and 612c may include componentry, apparatus, and/or functionality for implementing the functionality associated with the first device 102b (e.g. Bob 102b) and/or the functionality associated with the second device 102c (e.g. Carol 102c) for performing the key exchange process/protocol as described with reference to FIGS. 1 to 6a, combinations thereof, modifications thereto, and/or as described herein.

Thus, the terrestrial QKD system 610 may be configured to and/or operate to implement the key exchange process/protocol according to the invention as described in FIGS. 1 to 6a and/or combinations thereof, modifications thereto, and/or as herein described. For example, the key exchange process/protocol may be implemented by terrestrial QKD system 610 in which a shared key is required between first and second optical devices 612b and 612c, in which the optical intermediary device 612a may operate as Alice 102a, the first optical device 612b may operate as Bob 102b, and the second optical device 612c may operate as Carol 102c when performing the key exchange process/protocol according to the invention as described herein. Quantum communications can be distance limited over optical fibre and/or optical free space channels, thus, the terrestrial QKD system 610 as laid out and illustrated in FIG. 6b maximises the distance or separation between the first and second devices 612b and 612c with the intermediary device 612a being in the middle, thus the distance between first and second devices 612b and 612c is effectively doubled whilst still being able to use quantum techniques/quantum channels for implementing the key exchange process/protocol according to the invention as described with reference to FIGS. 1 to 6b.

Alternatively or additionally, the key exchange process/protocol may be used, without limitation, for example in any type of terrestrial QKD system with a plurality of terrestrial network devices and a plurality of user devices in communication with each other. Each terrestrial network device includes components and/or apparatus with the functionality of an intermediary device 102a and each user device includes the functionality of the first and/or second devices 102b and 102c. For example, a first user device may include the key exchange process/protocol functionality of Bob 102b whilst a second user device includes the key exchange process/protocol functionality of Carol 102c. Alternatively or additionally, the first user device may include the key exchange process/protocol functionality of both Bob 102b and Carol 102c and the second user device may include the key exchange process/protocol functionality of both Bob 102b and Carol 102c. This is because the first user device may take on the role of Bob 102b and the second user device may take on the role of Carol 102c and/or vice versa during implementation of the QKD protocol according to the invention. Furthermore, the first and second user devices are configured to transmit/receive quantum information over a quantum channel to the terrestrial network device(s)/intermediary devices. In addition, the first and second user devices may be configured, without limitation, to receive and transmit data over one or more classical or non-quantum communication channels. For example, the first user device may be linked to the terrestrial network device by, without limitation, for example a fibre optic channel (e.g. over optical fibre and/or dark optical fibre), similarly the second user device may be linked to the terrestrial network device by, without limitation, for example another fibre optic channel (e.g. over optical fibre or dark optical fibre). Each of first user device may be configured to transmit data via, without limitation, for example a quantum optical fibre channel to terrestrial network devices/intermediary devices over an optical fibre, whilst using the optical fibre to receive and transmit data via a standard optical fibre communication channel. Each of second user device may be configured to receiver data via, without limitation, for example a quantum optical fibre channel to terrestrial network devices/intermediary devices over an optical fibre, whilst using the optical fibre to receive and transmit data via a standard optical fibre communication channel.

For example, the key exchange process/protocol may be used, without limitation, for example in a terrestrial QKD system in which the intermediary device may be a terrestrial communication apparatus, the first device and second device may also be terrestrial devices, where the first quantum communication channel is a free-space optic quantum communication channel, the second quantum communication channel is a free-space optic quantum communication channel, and the first and second communication channels are classical or standard terrestrial communications channels. Alternatively, the first and second communication channels may be any standard communications channels. The third communication channel may also be a standard communications channel and the like.

In another example, the key exchange process/protocol may be used, without limitation, for example in a terrestrial QKD system in which the intermediary device is a terrestrial communication apparatus, the first device and second device are terrestrial devices, where the first quantum communication channel is a free-space optic quantum communication channel, the second quantum communication channel is a fibre optic quantum communication channel, and the first and second communication channels are standard communications channels and/or terrestrial communications channels. The third communication channel may be a standard communications channel and the like.

Although the key exchange process/protocol may be described as being performed using a satellite QKD system 600 or a terrestrial system 610 as described with reference to FIGS. 6a and 6b and/or as described herein, this is by way of example only and the invention is not so limited, it is to be appreciated by the skilled person in the art that the key exchange process/protocol may be implemented on any type of apparatus or intermediary device in communication with at least a first communication device and a second communication device, as long as the intermediary device and the first and second communication devices are adapted to, capable of, or configured to communicate over one or more quantum communication channels and one or more non-quantum/classical communication channels and/or as the application demands for implementing the key exchange process/protocol as described with reference to FIGS. 1 to 6b, and/or according to the invention, combinations thereof, modifications thereof, and/or as described herein and/or as the application demands.

Figure 6C:
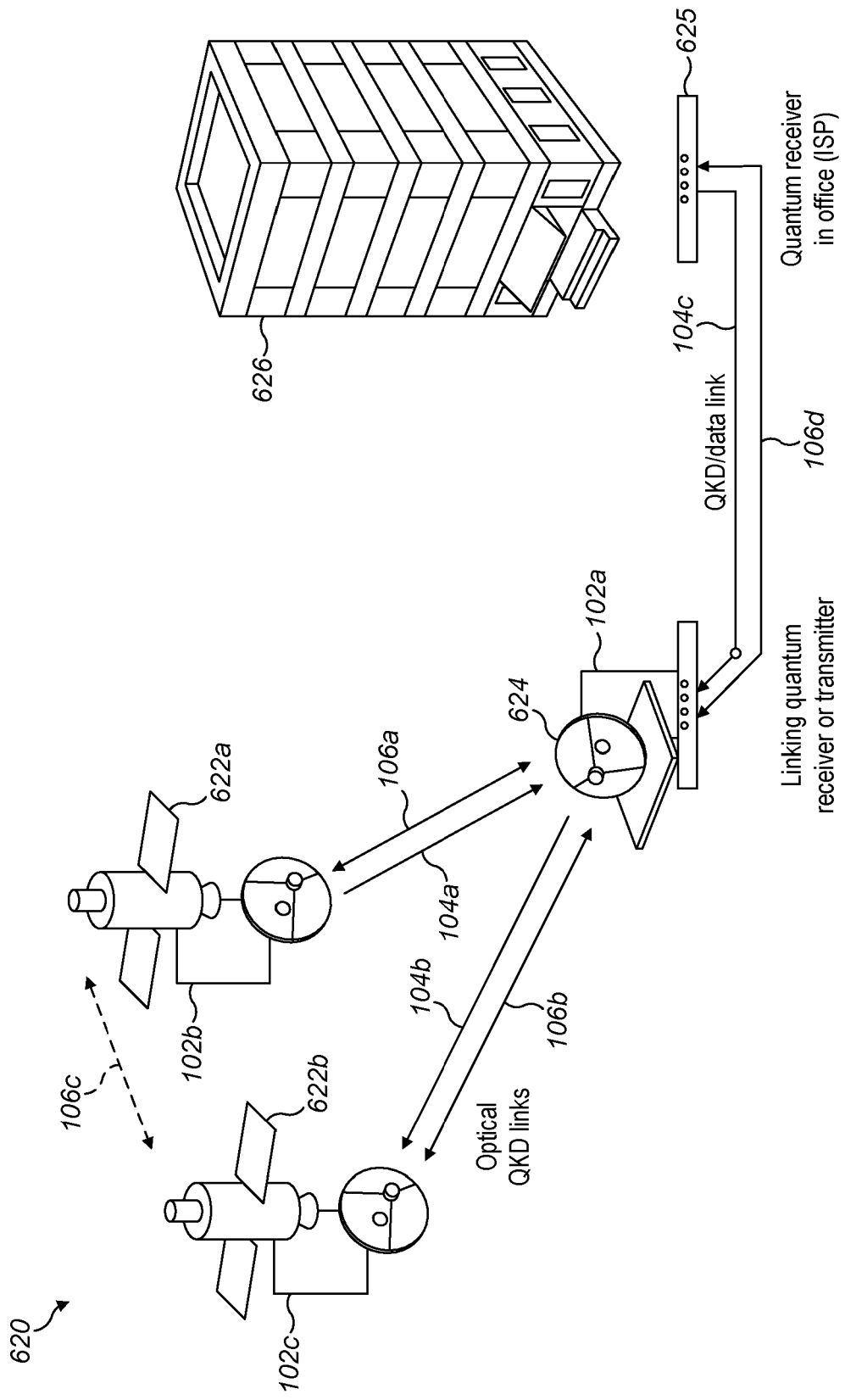
FIG. 6c is a schematic diagram illustrating a further example QKD system according to the invention.

FIG. 6c is a schematic diagram illustrating an example a satellite QKD system 620 in which first and second devices 102b and 102c (e.g. Bob and Carol) are located in corresponding satellites 622a and 622b and where the intermediary device 102a (e.g. Alice) is located in an satellite ground station 624 or optical ground receiver (OGR) endpoint device and the like. The satellite QKD system 620 may further modify the QKD systems 100, 500, 600 and/or 610 as described with reference to FIGS. 1 to 6b, modifications thereto, combinations thereof, and/or as herein described. For simplicity, the reference numerals used in FIG. 1 may be reused by way of example only for similar or the same components in relation to FIG. 6c. In this example, rather than having intermediary device 102a being implemented within satellites 622a-622b as described with reference to FIG. 6a, the intermediary device 102a is located in the ground station 624 with satellites 622a-622b having the functionality of the first and/or second devices 102b and 102c therein. Each of the satellites 622a-622b are connected to the ground station 624 via first and second quantum channels 104a and 104b, respectively. Each of the satellites 622a-622b are also connected to the ground station 624 via first and second non-quantum channels or classical channels 106a and 106b, respectively. There is a further satellite-to-satellite communication channel 106c communicatively connecting the satellites 622a-622b together. In this configuration, satellites 622a and 622b may use the key exchange process/protocol with the ground station 624 to establish a shared key therebetween that is unknown to the ground station 624. Furthermore, another endpoint device 625 with at least a quantum transmitter may be located in an office building 626, and may be connected to the ground station 624 via quantum channel 104c and non-quantum or classical channel 106d. The endpoint device 625 and a satellite 622a may also use the key exchange protocol/process according to the invention with ground station 624 to establish a shared key that is also unknown to the ground station 624. In this case, the third classical channel that is required for the final key exchange between the endpoint device 625 and the satellite 622a may be formed based on non-quantum channels 106a and 106d, where the communications therebetween may be encrypted to prevent the ground station 624 from receiving/deriving the withheld first random transmitting basis sets and second random receiving basis sets, Tab and Rac. The satellite QKD system 620 may perform the same or similar functionality as the QKD systems 100, 500, 600, 610 as described with reference to FIGS. 1 to 6b but where the intermediary device 102a is located within the ground station endpoint device 624.

Figure 6D:
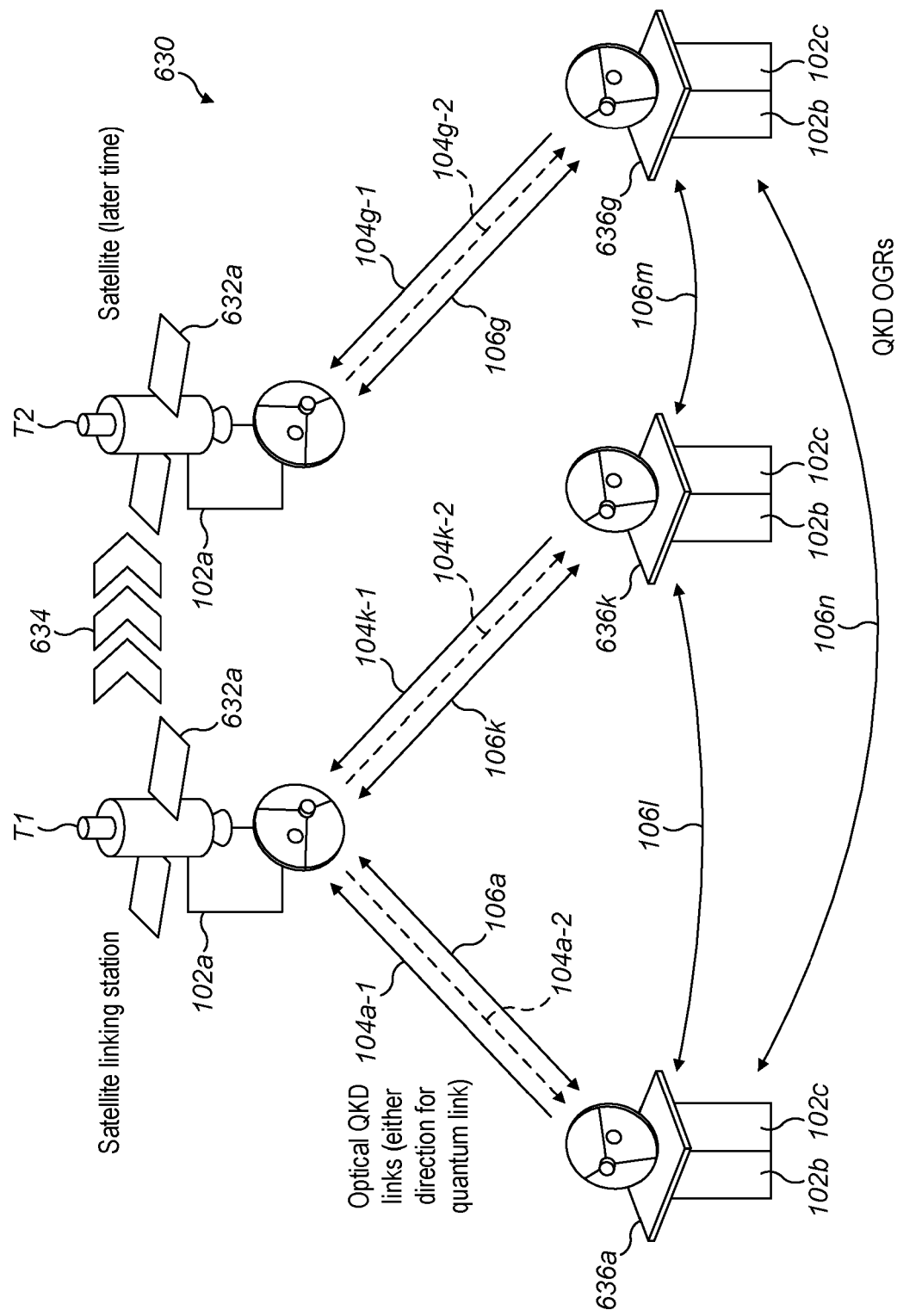
FIG. 6d is a schematic diagram illustrating yet a further example QKD system according to the invention.

FIG. 6d is a schematic diagram illustrating an example a satellite QKD system 630 in which the intermediary device 102a is located in a satellite 632a, where the satellite 632a tracks an orbital path 634 that passes over a plurality of endpoint devices 636a-636k and 636g. For simplicity, the reference numerals used in FIG. 1 may be reused by way of example only for similar or the same components in relation to FIG. 6d. In this example, the intermediary device 102a is implemented in satellites 632a as described with reference to FIG. 6a with endpoint devices 636a-636k and 636g connected to the satellite 632a via quantum channels 104a-1/104a-2, 104k-1/104k-2, and 104g-1/104k-2, respectively, and non-quantum or classical channels 106a, 106k, and 106g, respectively. For example, quantum channels 104a-1, 104k-1, and 104g-1 are quantum channels for transmitting quantum transmissions from corresponding endpoint devices to corresponding satellites. Quantum channels 104a-2, 104k-2, and 104g-2 are quantum channels for transmitting quantum transmissions from corresponding satellites to corresponding endpoint devices. Each of the endpoint devices 636a and 636k may be connected by a third classical communication channel 106l for performing secure communications therebetween. Each of the endpoint devices 636k and 636g may be connected by a third classical communication channel 106m for performing secure communications therebetween. Each of the endpoint devices 636a-636k and 636g may include the functionality of first device 102b and/or second device 102c as described with reference to FIGS. 1 to 6c. Thus, a pair of endpoint devices 636a and 636k may implement the key exchange process/protocol according to the invention with satellite 632a for establishing a shared key between the pair of endpoint devices 636a and 636k without the satellite 632a knowing said shared key. Another pair of endpoint devices 636k and 636g may also implement the key exchange process/protocol according to the invention with satellite 632a for establishing a shared key between the pair of endpoint devices 636k and 636g without the satellite 632a knowing said shared key.

FIG. 6d illustrates the same satellite 632a following or tracking an orbital path 634 and being used as a intermediary device 102a/station between multiple endpoint devices 636a and 636k. The endpoint devices 636a and 636k may be optical ground stations with optical quantum transmitters. At time point T1, the satellite 632a may be able to transmit to and/or receive from both endpoint devices 636a and 636k at about the same time via the non-quantum channels 106a-106k and the quantum channels 104a-1/104a-2 and 104k-1/104k-2. During this time T1, the satellite 632a may use the intermediary device 102a located therein to perform the key exchange process/protocol according to the invention with endpoint devices 636a and 636k for exchanging a shared key(s) therebetween. Thereafter, the endpoint devices 636a and 636k may perform secure communications therebetween using said exchanged shared key(s). Furthermore, as the satellite 632a tracks further along its orbital path 634 it may disconnect from the endpoint devices 636a and 636k at a later point in time T2 (e.g. the satellite 632a may have tracked out of range or over the horizon of the endpoint devices 636a and 636k) and so the intermediary device 102a of the satellite 632a may be used at time T2 to connect with another endpoint device 636g that is in range via its quantum channel and non-quantum/classical channels 104g-1/104g-2 and 106g, in which the intermediary device 102a of the satellite 632a may operate to perform a key exchange process/protocol according to the invention for exchanging shared key(s) with the endpoint device 636g (which may also be an OGR) and/or other endpoint devices (other OGRs) connected via corresponding quantum/non-quantum channels with satellite 632a, and/or performing the key exchange process/protocol according to the invention for exchanging shared key(s) between endpoint device 636g and endpoint devices 636a and/or 636k. In the latter case, it may take one or more orbits of the satellite 632a to perform a full key exchange between endpoint device 636g and endpoint devices 636a and/or 636k, because one or more of these endpoint devices is out of range of the satellite 632a.

In this example, the satellite 632a of the QKD switching system 630 tracks an orbital path 634 that passes over a plurality of endpoint devices 636a-636k and 636g. At a first point in time (e.g. time T1), the satellite 632a may be passing over endpoint devices 636a and 636k and be connected simultaneously to these endpoint devices 636a and 636k via the corresponding quantum channels 104a-1/104a-2 and 104k-1/104k-2 and classical channels 106a and 106k. While both endpoint devices 636a and 636k are connected to the satellite 632a via the corresponding quantum channels 104a-1/104a-2 and 104k-1/104k-2 and classical channels 106a and 106k the intermediary device 102a of the satellite 632a may be configured to perform the key exchange process/protocol according to the invention for exchanging a shared key (or if time permits a plurality of shared keys) between the endpoint devices 636a and 636k. Thereafter, the endpoint devices 636a and 636k may use the shared key(s) to securely communicate via classical channel 106l and/or classical channels 106a and 106k via satellite 632a. However, if the satellite 632a has already passed over and is out of range of the endpoint devices 636a and 636k and so cannot relay secure communications therebetween using the exchanged shared key(s), the endpoint devices 636a and 636k may establish a separate communication channel 106l that bypasses satellite 632a for performing secure communications thereon using the shared key(s) and the like. The separate communication channel 106l may be any wireless or wired communication channel that can be established between the endpoint devices 636a and 636k for performing secure communications therebetween using the shared key(s) and the like.

As the satellite 632a of the QKD system 630 continues tracks its orbital path 634 it may pass over endpoint device 636g at a second point in time (e.g. time T2). The satellite 632a may be passing over endpoint device 636g and other endpoint devices (not shown) and be connected simultaneously to these endpoint devices via corresponding quantum channels and classical channels and the like. While these endpoint devices 636g and the other endpoint devices are connected to the satellite 632a via their corresponding quantum channels and classical channels, the intermediary device 102a of satellite 632a may be configured to perform the key exchange process/protocol according to the invention for exchanging a shared key (or if time permits a plurality of shared keys) between the endpoint devices 636g and the other endpoint devices using their corresponding quantum channels and classical channels. Thereafter, the endpoint devices including endpoint device 636g may communicate via classical channels using the exchanged shared keys. The classical channels may be any wireless or wired communication channel that can be established between the endpoint devices and endpoint device 636g for performing secure communications therebetween using the shared key(s) and the like.

In another example, the intermediary device 102a of the satellite 632a may perform the key exchange process/protocol for exchanging shared keys between endpoint devices 636a or 636k and 636g (and/or other endpoint devices), where the satellite 632a may start the initial key exchange between endpoint devices 636a or 636k at time point T1. Thus, the satellite 632a and endpoint devices 636a or 636k may perform as much of the key exchange process/protocol according to the invention as possible with endpoint devices 636a and 636k before passing out of range of endpoint devices 636a and 636k and into range of endpoint device 636g. As the satellite 632a of the QKD system 630 continues along its orbital path 634 it will then pass over endpoint device 636g at the second point in time (e.g. time T2), where the satellite 632a is configured to continue to perform those steps of the key exchange process/protocol according to the invention that it can with endpoint device 636g for performing the exchange of one or more shared keys between endpoint devices 636*a* or 636*k* and 636*g*. Thus, depending on the steps of the key exchange process being performed, the satellite 632*a* may require one or more orbits to complete the key exchange process/protocol and securely ensure one or more shared keys are exchanged between endpoint devices 636*a* or 636*k* and 636*g*. Once completed, the endpoint devices 636*a*, 636*k* and 636*g* may may establish one or more communication links/channels 106*n* or 106*m* that bypass satellite 632*a* for performing the secure communications therebetween using the exchanged shared key(s) and the like. The separate communication links/channel 106*l*, 106*n*, 106*m* may be any wireless or wired communication channel that can be established between the endpoint devices and endpoint device 636*g* for performing secure communications therebetween using the shared key(s) and the like.

Figure 7A:
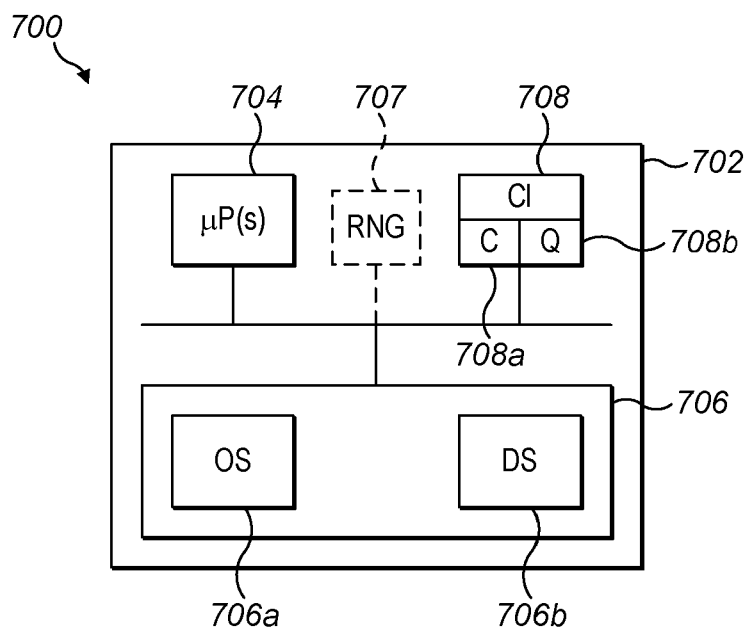
FIG. 7a is a schematic diagram illustrating an example computing system, device or apparatus for use in implementing one or more portions of an example key exchange process/protocol according to the invention.

FIG. 7*a* is a schematic diagram of an example computing system 700 for use in implementing and/or performing a key exchange process/protocol according to aspects of the invention. Computing system 700 may be used to implement one or more aspects of the systems, apparatus, methods, key exchange process(es)/protocol(s) and/or subprocess(es), intermediary device(s), first and second device(s), and/or use cases as described with reference to FIGS. 1 to 6*d*, combinations thereof, modifications thereto, as herein describe and/or as the application demands. Computing system 700 includes a computing device or apparatus 702 (e.g. intermediary device, first and/or second device(s)). The computing device or apparatus includes one or more processor unit(s) 704, memory unit 706 and a communication interface 708 including, without limitation, for example, a first communication interface 708*a* and/or a second quantum communication interface 708*b*, a random symbol/number generator 707 in which the one or more processor unit(s) 704 are connected to the memory unit 706, the communication interface 708 (e.g. the first communication interface 708*a* and the second quantum communication interface 708*b*), and the random symbol/number generator 707. The communications interface 708 may connect the computing device or apparatus 702 with one or more other computing devices and/or apparatus (e.g. intermediary device, first and/or second device(s)) (not shown) to establish, form and/or communicate over a first and/or second communication channels via the first communication interface 708*a* and/or establish, form and/or communicate over a first and/or second quantum channels via quantum communication interface 708*b*. The first communication interface 708*a* may connect to one or more communication networks, without limitation, for example one or more satellite networks, one or more telecommunication networks, one or more fibre optic networks and the like for implementing one or more aspects, features of the QKD system and/or key exchange process/protocol and/or subprocess(es) as described with reference to FIGS. 1 to 6*d* according to the invention as described herein, combinations thereof, modifications thereto as the application demands. The quantum communication interface 708*b* may connect over one or more quantum communication channel(s), without limitation, for example with one or more other devices, quantum communication network and/or the like for implementing one or more aspects, features of the QKD system and/or key exchange process(es)/protocol(s) and/or subprocess(es) as described with reference to FIGS. 1 to 6*d* according to the invention as described herein, combinations thereof, modifications thereto as the application demands. The memory unit 706 may store one or more program instructions, code or components such as, by way of example only but not limited to, an operating system 706*a* for operating computing device 702, and a data store 706*b* for storing computer program instructions, executable code, random symbols, first and second sets of symbols, QKD keys, random streams of symbols and the like, code and/or components associated with implementing the functionality and/or one or more function(s) or functionality associated with one or more QKD systems, one or more QKD protocol(s); one or more key exchange process(es) and/or subprocess(es), one or more intermediary devices, one or more first and/or second devices, one or more method(s) and/or process(es) of performing a key exchange process/protocol according to the invention, system(s)/platforms, combinations thereof, modifications there to, and/or as described herein with reference to at least any one of figure(s) 1 to 6*d*.

Figure 7B:
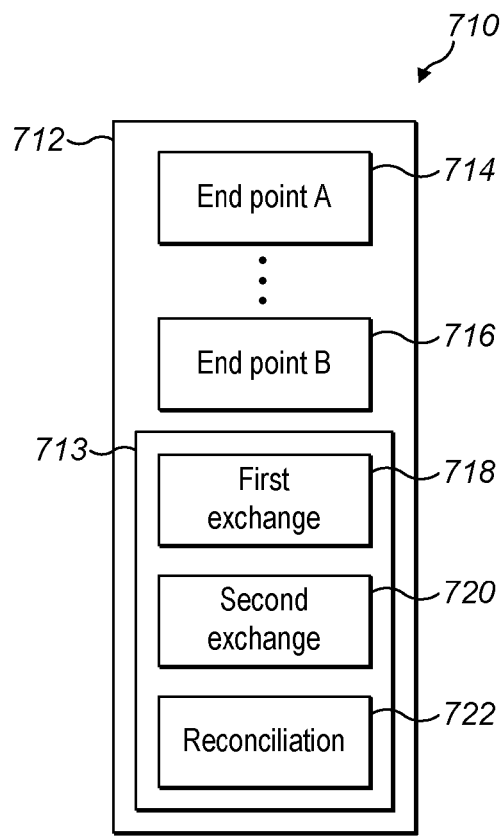
FIG. 7b is a schematic diagram illustrating an example QKD system for use in implementing an example key exchange process/protocol according to the invention Common reference numerals are used throughout the figures to indicate similar features.

FIG. 7*b* is a schematic diagram of another example QKD system 710 for facilitating and/or implementing the key exchange process/protocol and/or process(es) thereto according to the invention. The system 710 may include a plurality of computing devices or apparatus 712 that includes at least one intermediary device 713, at least one first device 714, at least one second device 716, and/or one or more of a plurality of devices including the functionality of a first and a second device that are configured to operate and/or implement the corresponding steps and/or functions of the key exchange process/protocol according to the invention for exchanging a shared key between at least one first device and at least one second device of the devices 714 to 716. The intermediary device 713 includes a first exchange component for exchanging a first partial key with a first device 714, a second exchange component for exchanging a second partial key with a second device 718, and a reconciliation component for exchanging a third intermediate set of symbols with the second and/or first devices 714 and/or 716. The system 710, apparatus 712, intermediary device 713, first device 714, second device 716 may be configured to implement the key exchange protocol/process(es) and/or subprocesses, aspects thereof and/or further include functionality associated with the QKD systems, intermediary device(s), first device(s) and/or second device(s), key exchange protocols/process(es), subprocess(es), systems, apparatus, one or more method(s) and/or process(es), combinations thereof, modifications thereto and/or as herein described with reference to any one of FIGS. 1 to 6*d*.

In the embodiment described above the server may comprise a single server or network of servers. In some examples the functionality of the server may be provided by a network of servers distributed across a geographical area, such as a worldwide distributed network of servers, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Application-Program-specific Integrated Circuits (ASICs), Application-Program-specific Standard Products (ASSPs), System-on-a-chip systems (SOCs), Complex Programmable Logic Devices (CPLDs), etc.

Although illustrated as a single system, it is to be understood that the computing device may be a distributed system. Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements. As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something". Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A computer-implemented method of key exchange between a first device and a second device, the method, performed by an intermediary device, comprising:
    generating a first intermediate set of symbols based on exchanging first key information with the first device, the first key information comprising data representative of a first set of symbols received from the first device on a first quantum channel, wherein the first device withholds from the intermediary device a first transmitting random basis set used by the first device for transmitting said first set of symbols over said first quantum channel;
    generating a second intermediate set of symbols based on exchanging second key information with the second device, the second key information comprising data representative of a second set of symbols transmitted to the second device on a second quantum channel, wherein the second device withholds from the intermediary device a second receiving random basis set used by the second device when receiving said second set of symbols over said second quantum channel; and
    sending, to one or more of the first device and second device, a third intermediate set of symbols based on combining the first and second intermediate sets of symbols, wherein each symbol in the first, second, and the third set of intermediate symbols is represented by one or more binary bits;
    wherein the first and second devices securely exchange at least first transmitting and second receiving basis information with each other for determining a final shared key based on the first set of symbols, the second set of symbols and the third intermediate set of symbols.

2. The computer-implemented method as claimed in claim 1, further comprising:
    generating the first intermediate set of symbols by exchanging the first key information with the first device, the first key information comprising data representative of the first set of symbols sent from the first device over the first quantum channel and a first receiving random basis set used by the intermediary device when receiving said first set of symbols, the first receiving random basis set transmitted to the first device over a first communication channel;
    generating the second intermediate set of symbols further comprising exchanging second key information with the second device, the second key information comprising data representative of the second set of symbols transmitted from the intermediary device over the second quantum channel and second transmitting random basis set used by the intermediary device when transmitting said second set of symbols, the second transmitting random basis set transmitted to the second device over a second communication channel; and
    sending, to one or more of the first device and second device over the corresponding communication channel(s), a third intermediate set of symbols based on combining the first and second intermediate sets of symbols;
    wherein the first and second devices securely exchange the first and second transmitting basis information and first and second receiving basis information with each other over a third communication channel therebetween for determining the final shared key based on the first set of symbols, the second set of symbols and the third intermediate set of symbols.

3. The computer-implemented method as claimed in claim 1, wherein generating the first intermediate set of symbols further comprises generating the first intermediate set of symbols based on discarding all the received first set of symbols except those symbols of the first set of symbols with symbol positions from the received first set of symbols that were successfully or validly received by the intermediary device.

4. The computer-implemented method as claimed in claim 1, wherein exchanging second key information with the second device further comprising:
    transmitting the second set of symbols over the second quantum channel to the second device, each symbol of the second set of symbols transmitted using a basis state randomly selected from the set of bases to form a second transmitting random basis set;
    transmitting the second transmitting random basis set over a second communication channel to the second device, the second transmitting random basis set comprising data representative of the randomly selected bases used to transmit each symbol of the second set of symbols; and
    receiving, from the second device over the second communication channel, data representative of the symbol positions of the symbols in the second set of symbols received by the second device over the second quantum channel that were successfully or validly received by the second device.

5. The computer-implemented method as claimed in claim 1, wherein generating the second intermediate set of symbols further comprises generating the second intermediate set of symbols based on discarding all the transmitted second set of symbols except those symbols of the second set of symbols with symbol positions from the transmitted second set of symbols that were successfully or validly received by the second device.

6. The computer-implemented method as claimed in claim 2, wherein the first and second devices perform error correction and/or privacy amplification in relation to the first and second shared keys over the third communication channel for determining the final shared key.

7. The computer-implemented method according to claim 1, wherein the first and second device perform error detection and/or correction on the first and second common sets of sifted bits or the first and second shared keys.

8. The computer-implemented method as claimed in claim 1, wherein the first set of symbols is a random set of symbols.

9. The computer-implemented method as claimed in claim 8, wherein the first set of symbols that are transmitted from the first device are randomly generated by the first device.

10. The computer-implemented method as claimed in claim 8, wherein the first set of symbols that are transmitted from the first device are retrieved from an entropy store of randomly generated symbols stored on the first device.

11. The computer-implemented method as claimed in claim 1, wherein the second set of symbols is a random set of symbols.

12. The computer-implemented method as claimed in claim 11, wherein the second set of symbols that are transmitted from the intermediary device are randomly generated by the intermediary device.

13. The computer-implemented method as claimed in claim 11, wherein the second set of symbols that are transmitted from the intermediary device are retrieved from an entropy store of randomly generated symbols stored on the intermediary device.

14. The computer-implemented method as claimed in claim 1, wherein generating the first intermediate set of symbols occurs simultaneously to or at the same time.

15. The computer-implemented method according to claim 2, wherein the first and second devices use encryption for communications over the third communication channel.

16. The computer-implemented method according to claim 2, wherein the first and second devices authenticate each other using communications over the third communication channel.

17. The computer-implemented method according to claim 1, wherein the set of bases comprises at least two bases, each basis comprising at least two basis states, wherein the at least two basis states of each basis are orthogonal and the at least two basis states of said each basis are non-orthogonal to the at least two basis states of another basis of the set of bases.

18. The computer-implemented method as claimed in claim 1, wherein one or both of the first and second quantum channels are based on one or more types of quantum communication channels from the group of:
   optical quantum communications;
   free-space optical quantum communications;
   optical fibre quantum communications; and
   optical laser quantum communications.

19. An intermediary device comprising a processor unit, a memory unit, and a communication interface, the processor unit connected to the memory unit and the communication interface, wherein the processor unit, memory unit and communication interface are adapted to implement a computer-implemented method of key exchange between a first device and a second device, the intermediary device configured to:
   generate a first intermediate set of symbols based on exchanging first key information with the first device, the first key information comprising data representative of a first set of symbols received from the first device on a first quantum channel, wherein the first device withholds from the intermediary device a first transmitting random basis set used by the first device for transmitting said first set of symbols over said first quantum channel;
   generate a second intermediate set of symbols based on exchanging second key information with the second device, the second key information comprising data representative of a second set of symbols transmitted to the second device on a second quantum channel, wherein the second device withholds from the intermediary device a second receiving random basis set used by the second device when receiving said second set of symbols over said second quantum channel; and
   send, to one or more of the first device and second device, a third intermediate set of symbols based on combining the first and second intermediate sets of symbols, wherein each symbol in the first, second, and the third set of intermediate symbols is represented by one or more binary bits;
   wherein the first and second devices securely exchange at least first transmitting and second receiving basis information with each other for determining a final shared key based on the first set of symbols, the second set of symbols and the third intermediate set of symbols.

20. A non-transitory computer-readable storage medium comprising computer code or instructions stored thereon, which when executed on a processor, causes the processor to implement a computer-implemented method of key exchange between a first device and a second device, the method, performed by an intermediary device, comprising:
   generating a first intermediate set of symbols based on exchanging first key information with the first device, the first key information comprising data representative of a first set of symbols received from the first device on a first quantum channel, wherein the first device withholds from the intermediary device a first transmitting random basis set used by the first device for transmitting said first set of symbols over said first quantum channel;
   generating a second intermediate set of symbols based on exchanging second key information with the second device, the second key information comprising data representative of a second set of symbols transmitted to the second device on a second quantum channel, wherein the second device withholds from the intermediary device a second receiving random basis set used by the second device when receiving said second set of symbols over said second quantum channel; and
   sending, to one or more of the first device and second device, a third intermediate set of symbols based on combining the first and second intermediate sets of symbols, wherein each symbol in the first, second, and the third set of intermediate symbols is represented by one or more binary bits;
   wherein the first and second devices securely exchange at least first transmitting and second receiving basis information with each other for determining a final shared key based on the first set of symbols, the second set of symbols and the third intermediate set of symbols.

\* \* \* \* \*